United States Patent
Takashima et al.

(10) Patent No.: US 9,336,969 B2
(45) Date of Patent: May 10, 2016

(54) PRESS DETECTION SENSOR, INPUT DEVICE AND ELECTRONIC APPARATUS

(75) Inventors: Kouichiro Takashima, Tokyo (JP); Shun Kayama, Saitama (JP); Yukiko Shimizu, Saitama (JP); Tsutomu Takahashi, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 685 days.

(21) Appl. No.: 12/323,133

(22) Filed: Nov. 25, 2008

(65) Prior Publication Data

US 2009/0140996 A1   Jun. 4, 2009

(30) Foreign Application Priority Data

Nov. 29, 2007   (JP) .................................. 2007-309451

(51) Int. Cl.
*G06F 3/041* (2006.01)
*H01H 13/785* (2006.01)
(Continued)

(52) U.S. Cl.
CPC ........... *H01H 13/785* (2013.01); *G06F 1/1626* (2013.01); *G06F 1/1643* (2013.01); *G06F 3/016* (2013.01); *G06F 3/0338* (2013.01); *G06F 3/045* (2013.01); *G06F 3/0414* (2013.01); *G06F 3/0416* (2013.01); *G06F 3/0488* (2013.01);
(Continued)

(58) Field of Classification Search
CPC ................ G06F 1/1626; G06F 1/1643; G06F 2203/04105; G06F 2203/04106; G06F 2203/04809; G06F 3/016; G06F 3/0338; G06F 3/0414; G06F 3/0416; G06F 3/045; G06F 3/0488; H01H 13/785; H01H 2201/036; H01H 2231/022; H01H 3/142
See application file for complete search history.

(56) References Cited

U.S. PATENT DOCUMENTS 3,657,475 A    4/1972  Peronneau et al.
3,699,294 A *  10/1972 Sudduth ........................ 200/243
(Continued)

FOREIGN PATENT DOCUMENTS

EP     1 014 295     6/2000
EP     1 418 491     5/2004
(Continued)

OTHER PUBLICATIONS

Partial European Search Report issued Aug. 19, 2011, corresponding to European Appln. No. 08253814.1.
(Continued)

*Primary Examiner* — Latanya Bibbins
(74) *Attorney, Agent, or Firm* — K&L Gates LLP

(57) ABSTRACT

A press detection sensor contains a base member having predetermined length and width and also having a predetermined shape, a first conductor having predetermined length and being arranged on the base member, and a second conductor that is arranged on the base member with the second conductor being faced to the first conductor. The press detection sensor also contains a conductive contact body that is arranged between the first conductor and the second conductor. The conductive contact body connects the first and second conductors electrically in response to an external force. The press detection sensor further contains a covering member that includes the contact body on the inside thereof. The covering member covers a top of the base member which includes the first and second conductors. The covering member contains at least one of flexibility and elasticity.

15 Claims, 32 Drawing Sheets

(51) Int. Cl.
*G06F 1/16* (2006.01)
*G06F 3/01* (2006.01)
*G06F 3/0338* (2013.01)
*G06F 3/045* (2006.01)
*G06F 3/0488* (2013.01)
*H01H 3/14* (2006.01)

(52) U.S. Cl.
CPC ............... *G06F 2203/04105* (2013.01); *G06F 2203/04106* (2013.01); *G06F 2203/04809* (2013.01); *H01H 3/142* (2013.01); *H01H 2201/036* (2013.01); *H01H 2231/022* (2013.01)

(56) References Cited

U.S. PATENT DOCUMENTS

| | | | | |
|---|---|---|---|---|
| 4,545,023 | A * | 10/1985 | Mizzi | 708/143 |
| 4,558,757 | A | 12/1985 | Mori et al. | |
| 6,531,951 | B2 * | 3/2003 | Serban et al. | 338/47 |
| 2002/0171629 | A1 | 11/2002 | Archibald et al. | |
| 2004/0061687 | A1 | 4/2004 | Kent et al. | |
| 2006/0131156 | A1 * | 6/2006 | Voelckers | 200/512 |
| 2006/0238517 | A1 * | 10/2006 | King et al. | 345/173 |
| 2007/0097073 | A1 * | 5/2007 | Takashima et al. | 345/156 |
| 2007/0139390 | A1 | 6/2007 | Chen | |

FOREIGN PATENT DOCUMENTS

| | | |
|---|---|---|
| JP | 07319623 | 12/1995 |
| JP | 09-017276 | 1/1997 |
| JP | 2002-048658 | 2/2002 |
| JP | 2005-332063 | 11/2008 |
| WO | 2007/091600 A1 | 8/2007 |

OTHER PUBLICATIONS

Anonymous, "Improved touchscreen products," document No. 42853. (1 page).

European Patent Office, European Search Report, issued in connection with European Patent Application No. 08253814, dated Nov. 28, 2011. (5 pages).

Japanese Office Action issued Mar. 21, 2012, for corresponding Japanese Appln. No. 2007-309451.

Refuse-assessment issued in connection with Japanese Patent Application No. 2007-309451, dated Feb. 5, 2013. (3 pages).

* cited by examiner

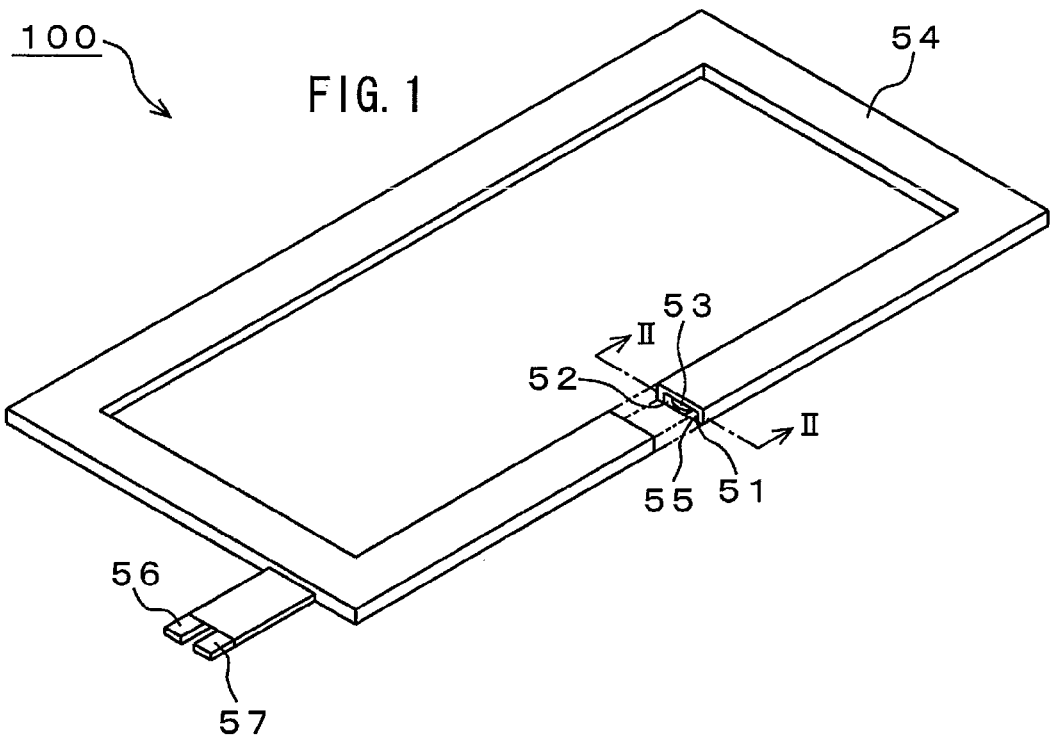
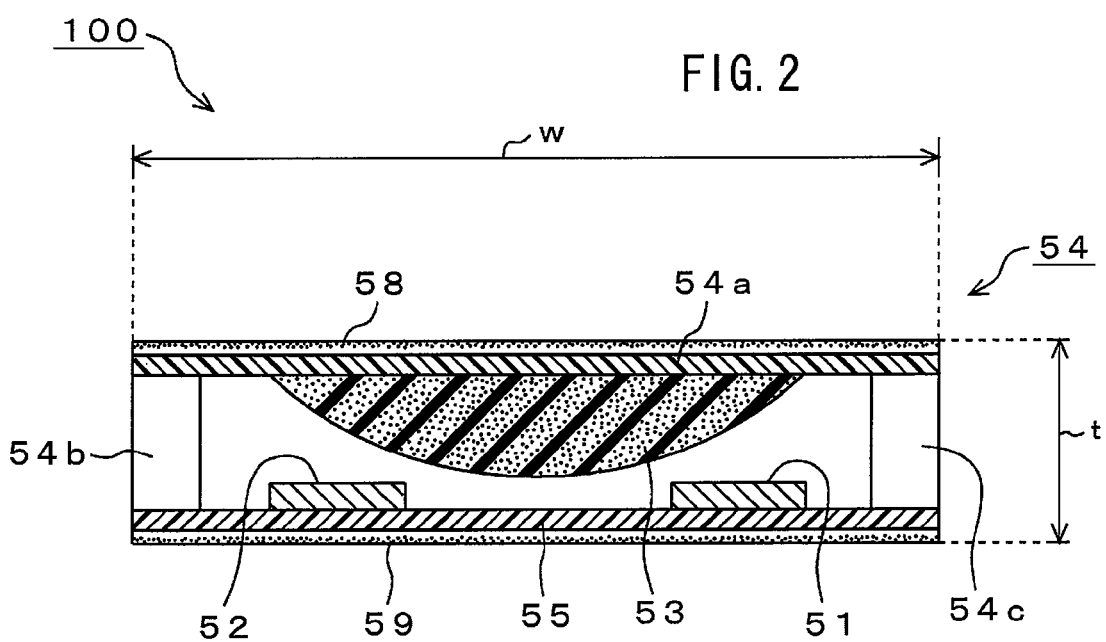

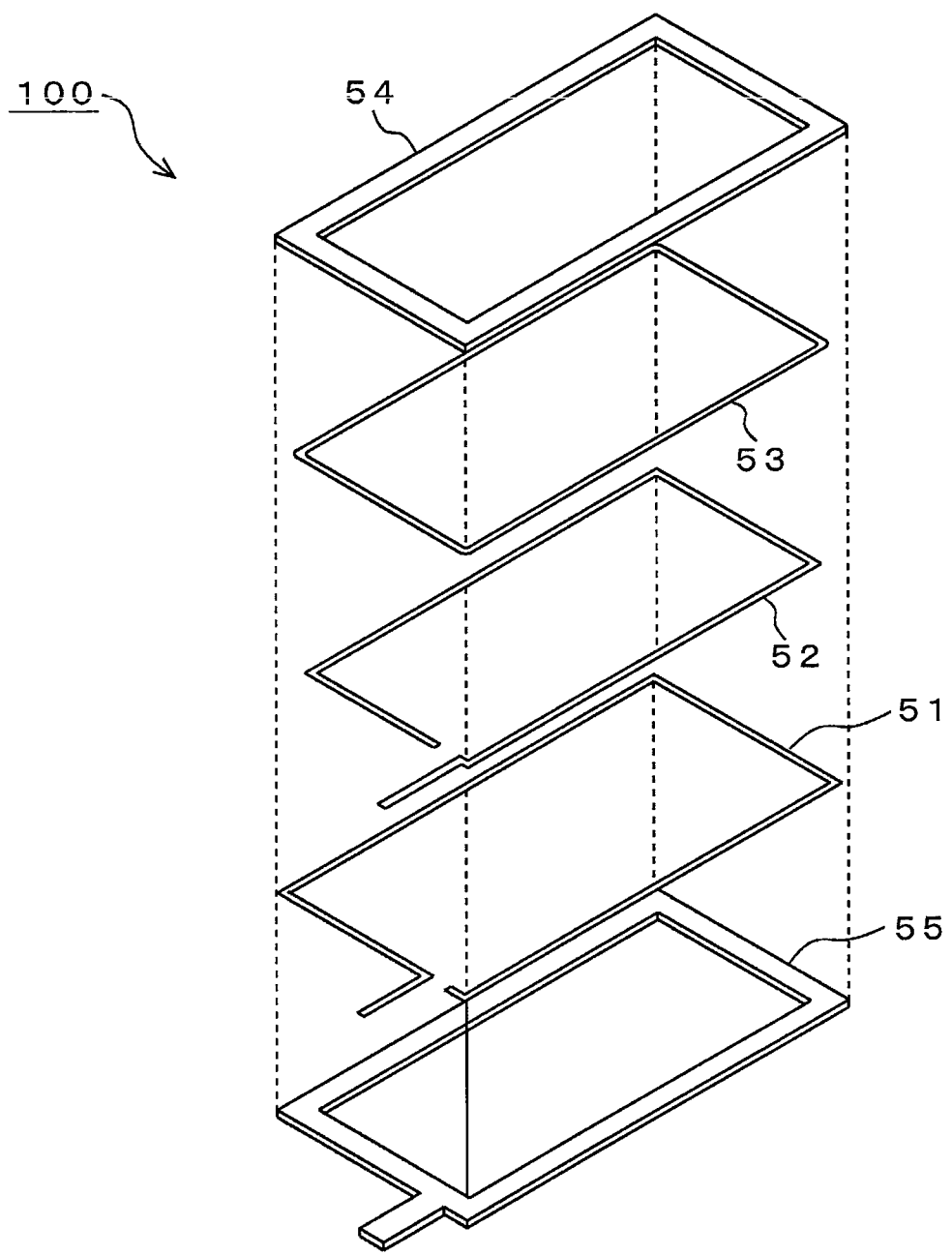

FIG. 5
| PRESSED STATE | DEFORMED STATE OF CONTACT BODY | RESISTANCE VALUE |
|---|---|---|
| IN CASE OF PUSHING DOWN POINT A WEAKLY | 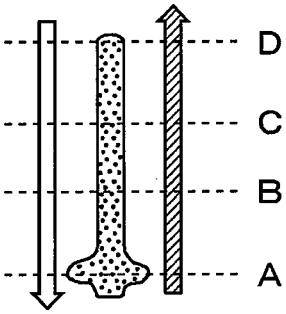 | R(I) |
| IN CASE OF PUSHING DOWN POINT A STRONGLY | 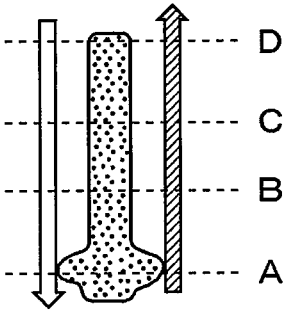 | R(II) |
| IN CASE OF PUSHING DOWN POINT E WEAKLY | 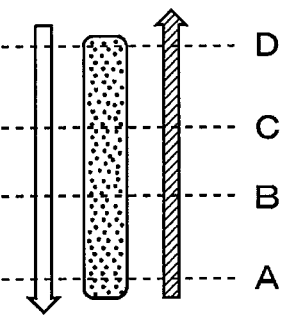 | R(I) |
| IN CASE OF PUSHING DOWN POINT E STRONGLY | 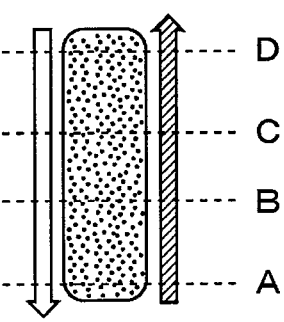 | R(II) |
R(I) > R(II)

FIG. 6
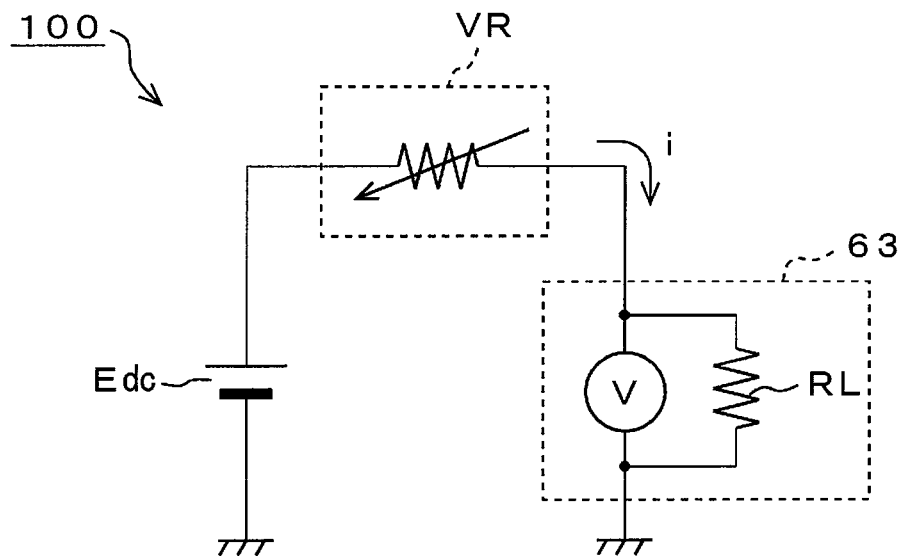
FIG. 7A FIG. 7B
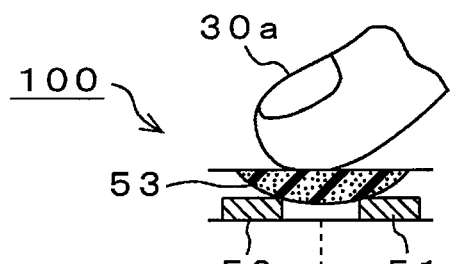 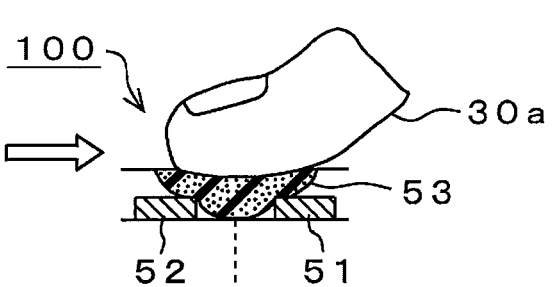
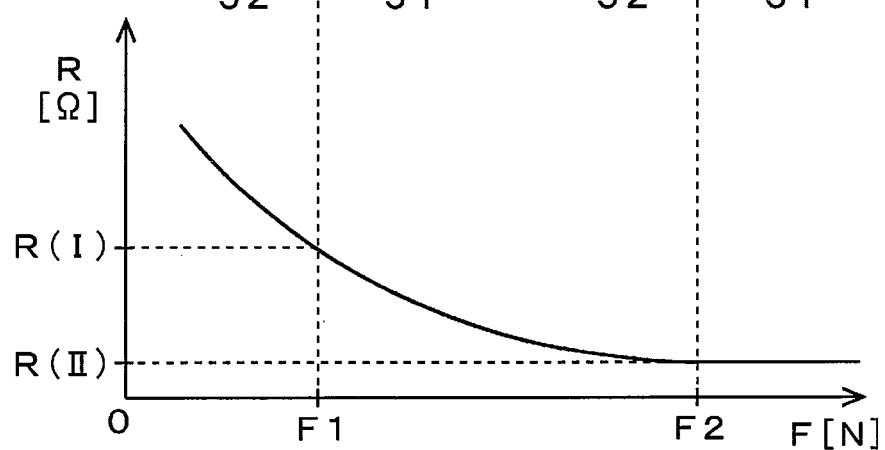
FIG. 7C

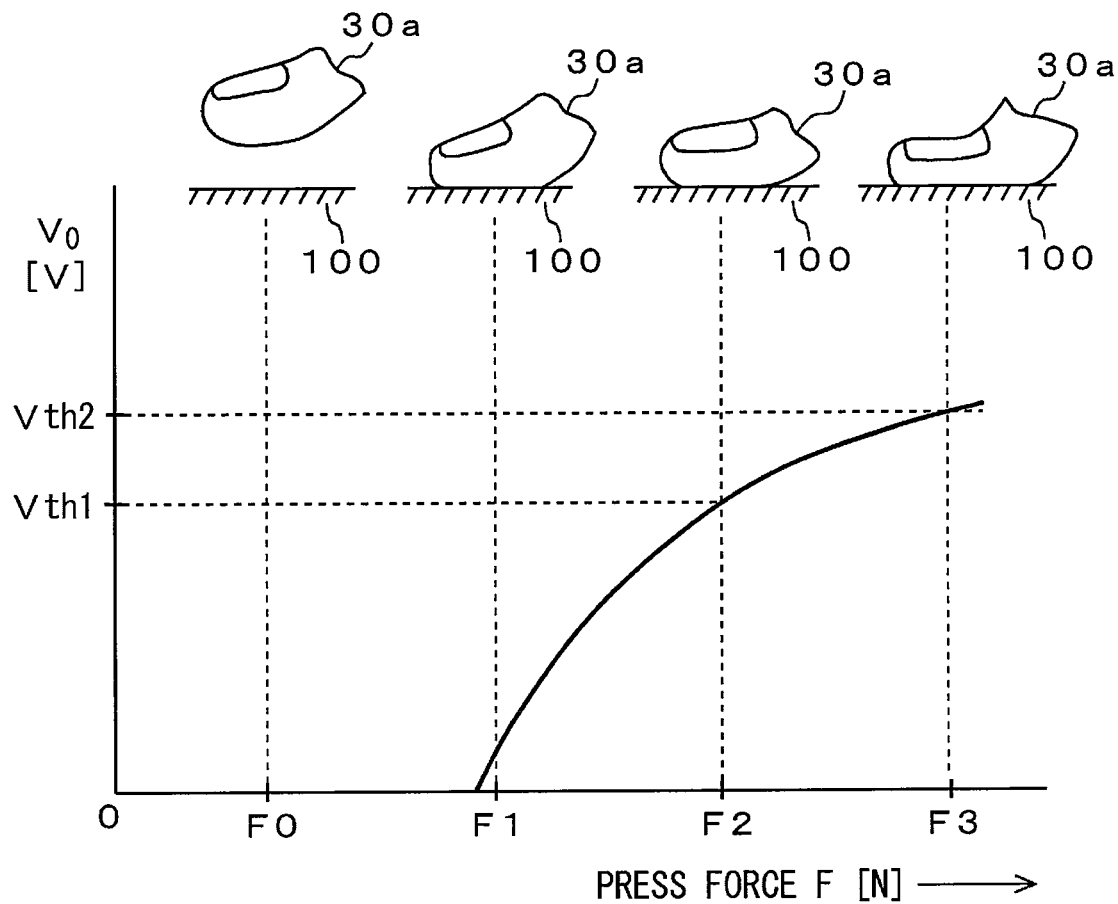

PRESS DETECTION SENSOR, INPUT DEVICE AND ELECTRONIC APPARATUS

CROSS REFERENCES TO RELATED APPLICATIONS

The present application claims priority to Japanese Patent Application JP 2007-309451 filed in the Japanese Patent Office on Nov. 29, 2007, the entire contents of which being incorporated herein by reference.

BACKGROUND

The present application relates to a press detection sensor, an input device and an electronic apparatus, which are preferably applicable to a mobile phone, an information processing apparatus, an information mobile terminal or the like that inputs information by executing a slide operation and a press operation of an input detection surface on a display unit.

In recent years, a user (operator) has often used a digital camera equipped with various kinds of operation modes to shoot a subject and has often taken various kinds of contents in a mobile phone or an information mobile terminal such as a Personal Digital Assistants (PDA) to utilize them. These digital camera, mobile terminal device and the like have their input devices. An input unit such as a key board and a JOG dial, a touch panel formed by combining a display unit, and the like has been often used for the input device.

Further, there are disclosed an input device that can input information by moving a finger of the user or the like physically on a touch panel on a display unit (with a detection function in XY-directions) and an input device that can input information by pushing down an operation surface with a user's finger (with a detection function in Z-direction).

Japanese Patent Application Publication No. 2005-332063 has disclosed on page 4 and FIG. 3 thereof the input device with this kind of detection function in Z-direction, in which a touch-sensitive function is provided. This input device has a resistive touch panel on a display unit of a liquid crystal display device or the like and a pressure detection system on the downward side of the display unit. The pressure detection system includes four pressure detection sensors provided at the four corners on the downward side of the display unit and a driver IC which processes the pressure detection signals thereof.

According to the pressure detection system, in case of detecting the pressure in Z-direction, the four pressure detection sensors supporting the display unit detect the pressure when a user's finger or the like pushes the touch panel down from the top thereof and output four kinds of pressure detection signals to the driver IC. The driver IC calculates the four kinds of pressure detection signals and obtains an average value among the four pressure detection sensors to be compared with a preset threshold level, which can obtain an input device provided with a detection function in Z-direction in addition to a detection function in X and Y directions.

SUMMARY

According to an electronic apparatus include the input device with a detection function in Z-direction as disclosed in Japanese Patent Application Publication No. 2005-332063, there is employed a laminated structure in which a display unit of a liquid crystal display device or the like, a surface operation member of a touch panel or the like, an upper portion housing and the like are combined in multiple stages on the four pressure detection sensors. Consequently, the pressure detection system is complicated and the pressure detection sensors mount those members so that an unstable load having nothing to do with the input operation will be not added thereon from those members. More specifically, it is difficult to mount the above-mentioned members with high accuracy.

Further, a constitution is employed in which the pressure detection sensors are arranged under the display unit and the display unit is supported by only the pressure detection sensors from a view point of the pressure detecting principle. A mechanical gap may be secured on the periphery of the display unit. For this reason, any moisture and dust may invade therethrough into the inside of the electronic apparatus.

Also, the exclusive driver IC for calculating four kinds of pressure detection signals outputted from the above-mentioned four pressure detection sensors is provided, which results in a cost increase of the pressure detection system.

It is, thus, desirable to provide a press detection sensor, an input device and an electronic apparatus in which it is possible to detect a press reliably in response to an external force at a pressed position and it is possible to prevent dust, water and the like from invading thereinto.

According to an embodiment, there is provided a press detection sensor. The press detection sensor contains a base member having predetermined length and width and also having a predetermined shape, a first conductor having predetermined length and being arranged on the base member, and a second conductor that is arranged on the base member with the second conductor being faced to the first conductor. The press detection sensor also contains a conductive contact body that is arranged between the first conductor and the second conductor. The conductive contact body connects the first and second conductors electrically in response to an external force. The press detection sensor further contains a covering member that includes the contact body on the inside thereof. The covering member covers a top of the base member which includes the first and second conductors. The covering member contains flexibility and/or elasticity.

According to the embodiment, of the press detection sensor, when executing a press operation, it is possible to detect the press reliably in response to the external force at a position at which the contact body connects the first and second conductors electrically. Thus, it is also possible to provide a frame shaped press detection sensor or the like having a thin and simple structure while employing an air-tight structure that can prevent dust, water or the like from invading.

According to another embodiment, there is provided an input device that inputs information in response to a press operation of an operation body. The input device contains a display-and-detection unit that displays the input information and contains an input detection surface. The display-and-detection unit detects a contact position of the operation body in the input detection surface. The input device also contains a press detection unit that detects a press by the operation body. The press detection unit is provided on a periphery of the display unit. The press detection unit includes a base member having predetermined length and width and also having a predetermined shape, a first conductor having predetermined length and being arranged on the base member, and a second conductor that is arranged on the base member with the second conductor being faced to the first conductor. The press detection unit also includes a conductive contact body that is arranged between the first conductor and the second conductor. The conductive contact body connects the first and second conductors electrically in response to an external force. The press detection unit further includes a covering member that includes the contact body on the inside thereof. The covering member covers a top of the base member which includes the first and second conductors. The covering member contains flexibility and/or elasticity. Further, the display-and-detection unit may contain a display subunit that displays the input information and a detection subunit that contains an input detection surface on the display subunit, the detection subunit detecting a contact position of the operation body in the input detection surface.

In the embodiment of the input device, there is provided the embodiment of the press detection sensor, so that when inputting the information in response to the press operation by the operation body into the input detection surface on the display unit, it is possible not only to reliably detect information relative to a position at which the first and second conductors are connected electrically in response to the external force but also to reliably detect a press corresponding to a period of time when the contact body connects the first and second conductors electrically in response to the external force. Thus, it is possible to provide the input device mounted with the frame shaped press detection sensor or the like having a thin and simple structure while employing an air-tight structure that can prevent dust, water or the like from invading thereinto.

According to further embodiment, there is provided an electronic apparatus that is provided with an input device which inputs information in response to a press operation of an operation body. The input device contains a display unit that displays the input information, a detection unit that includes an input detection surface on the display unit and a press detection unit that detects a press by the operation body. The detection unit detects a contact position of the operation body in the input detection surface. The press detection unit is provided on a periphery of the display unit. The press detection unit includes a base member having predetermined length and width and also having a predetermined shape, a first conductor having predetermined length and being arranged on the base member, a second conductor that is arranged on the base member with the second conductor being faced to the first conductor. The press detection unit also includes a conductive contact body that is arranged between the first conductor and the second conductor. The conductive contact body connects the first and second conductors electrically in response to an external force. The press detection unit further includes a covering member that includes the contact body on the inside thereof. The covering member covers a top of the base member which includes the first and second conductors. The covering member contains flexibility and/or elasticity.

In the embodiment of the electronic apparatus, there is provided the embodiment of the input device, so that when inputting information in response to the press operation by the operation body into the input detection surface on the display unit, it is possible not only to reliably detect information relative to a position at which the first and second conductors are connected electrically in response to the external force but also to reliably detect a press corresponding to a period of time when the contact body connects the first and second conductors electrically in response to the external force. Thus, it is possible to provide the electronic apparatus with the input device mounted with the frame shaped press detection sensor or the like having a thin and simple structure while employing an air-tight structure that can prevent dust, water or the like from invading thereinto.

The concluding portion of this specification particularly points out and directly claims the subject matter. However, those skilled in the art will best understand both the organization and method of operation of the application, together with further advantages and objects thereof, by reading the remaining portions of the specification in view of the accompanying drawing(s) wherein like reference characters refer to like elements.

Additional features and advantages are described herein, and will be apparent from the following Detailed Description and the figures.

BRIEF DESCRIPTION OF THE FIGURES

FIG. 1 is a perspective view of a press detection sensor 100 as a first embodiment for showing a configuration thereof;

FIG. 2 is a cross-section view of one side of the press detection sensor 100 for showing a configuration thereof;

FIG. 3 is an exploded perspective view of the press detection sensor 100 for showing an assembled example thereof;

FIG. 5 is a table showing operation examples of the press detection sensor 100;

FIG. 6 is a circuit diagram showing a detection circuit example of the press detection sensor 100;

FIGS. 7A and 7B are conceptional diagrams showing pushdown states of the elastic electric conductor 53 and FIG. 7C is a graph showing an example of change in a resistance value between the electrode patterns 51 and 52;

FIGS. 8A to 8D are conceptional diagrams showing pushdown operation examples of the press detection sensor 100 and FIG. 8E is a graph showing an output characteristic example of the press detection sensor 100;

DETAILED DESCRIPTION

Figure 4A:
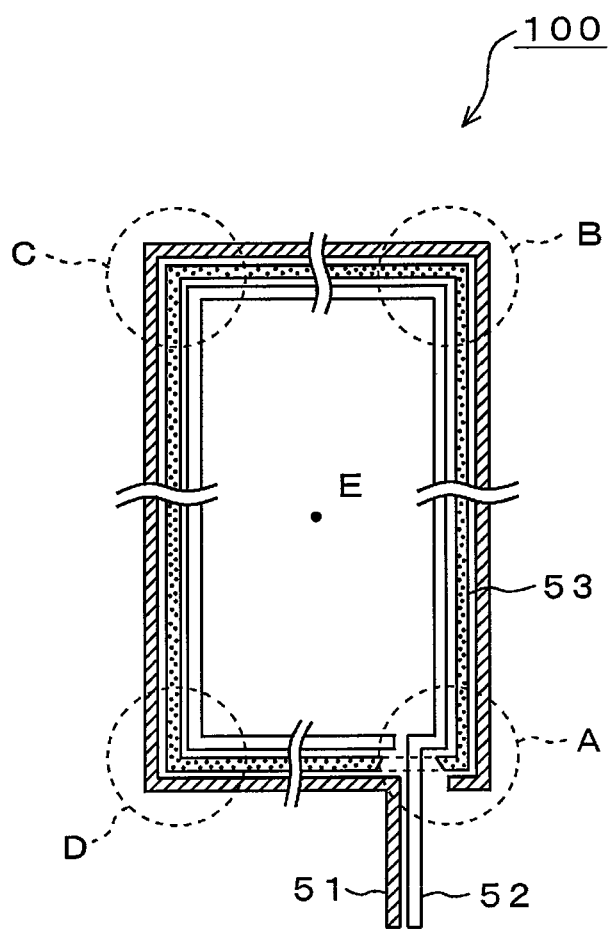
FIG. 4A is a schematic diagram for showing an arrangement example of electrode patterns 51, 52 and an elastic electric conductor 53.

An embodiment of the press detection sensor, the input device and the electronic apparatus with reference to the drawings is described as follows.

Embodiment 1

FIG. 1 shows a configuration of a press detection sensor 100 as a first embodiment. The press detection sensor 100 shown in FIG. 1 contains electrode patterns 51, 52, an elastic electric conductor 53, a cover sheet 54 and a base sheet 55. The base sheet 55 constitutes one example of a base member and has predetermined length and width and also has a predetermined shape. The base sheet 55 has an insulation property and has, for example, a frame shape that is formed around an opened space provided in the middle thereof. The reason why the press detection sensor 100 has a frame shape is because, if an input device is constituted, a display unit such as a liquid crystal display device is incorporated into the opened space provided in the middle thereof and a display surface of the display unit is used as an operation surface.

The electrode pattern 51 constitutes one example of a first conductor, has a predetermined length, and is arranged on the base sheet 55. The electrode pattern 52 constitutes one example of a second conductor and arranged on the base sheet 55 with the electrode pattern 52 being faced to the electrode pattern 51. The elastic electric conductor 53 constituting one example of a conductive contact body is arranged between the electrode pattern 51 and the electrode pattern 52. The elastic electric conductor 53 connects the electrode pattern 51 and the electrode pattern 52 electrically in response to an external force. For the elastic electric conductor 53, there is used, for example, a conductive rubber member.

The cover sheet 54 constitutes one example of a covering member, includes the elastic electric conductor 53 on the inside thereof, and covers a top of the base sheet 55 which includes the electrode pattern 51 and the electrode pattern 52. The cover sheet 54 has flexibility and/or elasticity. In this embodiment, the elastic electric conductor 53 and the cover sheet 54 may be made of a same material. For example, the elastic electric conductor 53 and the cover sheet 54 can be molded by using the same die, thereby enabling a process of manufacturing the press detection sensor 100 to be simplified.

In this embodiment, one terminal of the electrode pattern 51 is connected to a first terminal 56, one terminal of the electrode pattern 52 is connected to a second terminal 57 and both of the other terminals of the electrode patterns 51 and 52 are opened. Also, the base sheet 55 on which the electrode pattern 51 and the electrode pattern 52 are arranged has a frame shape.

FIG. 2 shows a configuration of one side of the press detection sensor 100. In FIG. 2, supposing that a width of the base sheet 55 is w, the width w is around 3 mm to 5 mm. Supposing that a thickness of the press detection sensor 100 is t, the thickness t is around 0.5 mm to 1.5 mm. Polyimide-based and sheet-shaped resin material having a thickness of around 0.05 mm to 0.3 mm. is used for the base sheet 55.

On the base sheet 55, the electrode pattern 51 and the electrode pattern 52 are arranged in parallel with them keeping a predetermined distance. For the electrode pattern 51 and the electrode pattern 52, a copper (Cu) foil, a nickel silver foil, a bronze foil or a brass foil is used.

The cover sheet 54 contains, for example, an upper portion base sheet 54a, an inside space sheet 54b and an outside space sheet 54c. The inside space sheet 54b and the outside space sheet 54c are provided on both the sides of the base sheet 55 and have functions of spacers between the upper portion base sheet 54a and the base sheet 55. These spacers are provided so that a space is secured (formed) inside a region surrounded by the cover sheet 54 on the base sheet 55. For the upper portion base sheet 54a, polyimide-based and sheet-shaped resin material having a thickness of around 0.05 mm to 0.3 mm. is used.

In this embodiment, under (on the rear surface of) the upper portion base sheet 54a, the elastic electric conductor 53 is hung down. When pressing the upper portion base sheet 54a, the elastic electric conductor 53 contacts the electrode pattern 51 and the electrode pattern 52 on the base sheet 55 and maintains the conduction state therebetween. For the elastic electric conductor 53, electric conductive rubber having a thickness of around 0.05 mm to 0.5 m is used.

When a user pushes down the upper portion base sheet 54a weakly, the elastic electric conductor 53 weakly touches an edge of the electrode pattern 51 and an edge of the electrode pattern 52. When the user pushes down the upper portion base sheet 54a strongly, the elastic electric conductor 53 enters into a space between the electrode pattern 51 and the electrode pattern 52. In this case, contact resistance becomes considerably low as compared with a case in which the patterns are touched weakly.

Here, when the upper portion base sheet 54a is not pressed, the electrode pattern 51 and the electrode pattern 52 on the base sheet 55 are away from each other so that an electrical insulation state is maintained therebetween. In this embodiment, it is allowed to mold the elastic electric conductor 53, the upper portion base sheet 54a, the inside space sheet 54b and the outside space sheet 54c by using the same conductive rubber member.

At the upper portion of the upper portion base sheet 54a, for example, an adhesive sheet 58 is provided and is used when the upper portion base sheet 54a adheres to an upper component part. For the adhesive sheet 58, an acrylic-based adhesive agent is used. The thickness thereof is around 25 μm to 300 μm. The adhesive sheet 58 may be omitted if no upper component part is layered.

With respect to the upper component part to be layered, a surface plate such as a touch-sensitive input sheet, which is described in Japanese Patent Application No. 2007-308089, is illustrated. The touch-sensitive input sheet is referred to as a sheet in which protrusion blocks having cylindrical shapes or conical shapes in order to present concavity and convexity feeling are distributed so as to be provided standingly in the vertical direction with respect to a sheet surface of base sheet which forms base material.

At the lower portion of the base sheet 55, an adhesive sheet 59 is provided and is used when the base sheet 55 adheres to a lower component part. With respect to the lower component part, a housing of an electronic apparatus, a substrate, a display panel or the like is illustrated. For the adhesive sheet 59, an acrylic-based adhesive agent is used. The thickness thereof is around 25 μm to 300 μm. The adhesive sheet 59 may be omitted if no lower component part is arranged.

FIG. 3 shows an assembled example of the press detection sensor 100. In connection with the press detection sensor 100 shown in FIG. 3, the frame shaped base sheet 55 is prepared. For the base sheet 55, a polyimide-based and sheet-shaped resin material having thickness of around 0.05 mm to 0.3 mm is used.

Next, the electrode pattern 51 and the electrode pattern 52 are arranged on the base sheet 55 with a predetermined space therebetween. Resist material is coated on a whole surface of a board for the base sheet 55, which attaches copper foil on one side of the board, the resist material is exposed and developed through a reticle by which the frame shaped electrode pattern 51 and the frame shaped electrode pattern 52 are drawn and then, the unnecessary copper foil pattern is removed from the one-side-copper-foil-attached board using a resist film as a mask with the board soaking in an etching solution. For the electrode pattern 51 and the electrode pattern 52, a nickel silver foil, a bronze foil or a brass foil is used in addition to the copper foil.

On the other hand, the elastic electric conductor 53 is attached to the cover sheet 54. It is allowed to employ a method in which the cover sheet 54 is formed so as to have a sectional shape like a letter of C and the elastic electric conductor 53 with a square ring shape is adhered to the cover sheet 54, or it is allowed to employ a method in which a die including a core and a cavity by which the cover sheet 54 and the elastic electric conductor 53 are modeled is made and then, the cover sheet 54 and the elastic electric conductor 53 are subject to solid casting by sealing an electric conductive rubber resin into this die. Thereafter, the cover sheet 54 with the elastic electric conductor 53 is thermally bonded so that the cover sheet 54 can cover the base sheet 55. The temperature condition at that time is set to around 100° C. to 120° C. Thus, the press detection sensor 100 shown in FIG. 1 is completed.

Figure 4B:
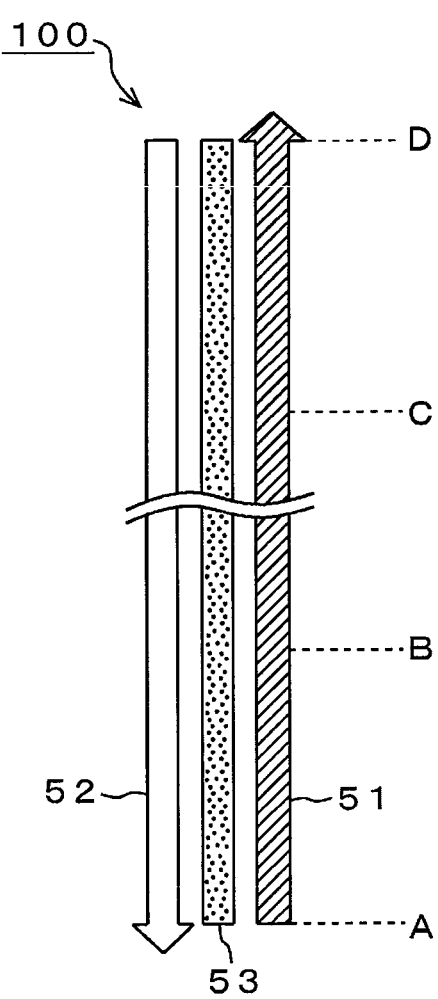
FIG. 4B is a schematic diagram of the electrode patterns 51, 52 and the elastic electric conductor 53 in a case where they are extended.
Figure 4C:
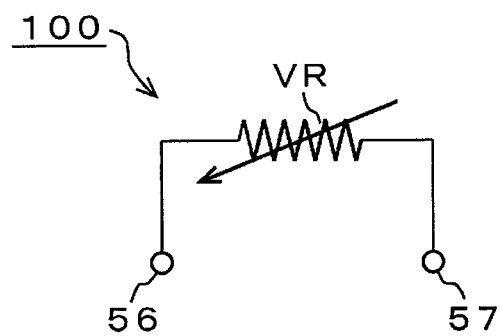
FIG. 4C is a diagram showing an equivalent circuit thereof.

The following will describe an operation example of the press detection sensor 100. FIG. 4A shows an arrangement example of electrode patterns 51, 52 and an elastic electric conductor 53, FIG. 4B schematically shows the electrode patterns 51, 52 and the elastic electric conductor 53 in a case where they are extended, and FIG. 4C shows an equivalent circuit thereof. FIG. 5 shows operation examples of the press detection sensor 100.

In this embodiment, supposing that four corners of each of the frame shaped electrode pattern 51, the frame shaped electrode pattern 52 and the frame shaped elastic electric conductor 53 are respectively set to points A, B, C, and D and further, supposing that the gravity center region of the points A, B, C, and D is set to a point E, behaviors of the electrode pattern 51, the electrode pattern 52 and the elastic electric conductor 53 are shown when pushing down the points A, B, C, D, and E respectively with respective amounts of press.

According to the arrangement example of the electrode pattern 51, the electrode pattern 52 and the elastic electric conductor 53 shown in FIG. 4A, the electrode pattern 51, shown by diagonal lines, having a frame shape is arranged at the outside, the electrode pattern 52, shown by an outline, having a frame shape is arranged at the inside, and the elastic electric conductor 53, shown by dots, having a frame shape is arranged between the electrode pattern 51 and the electrode pattern 52.

FIG. 4B schematically shows the frame shaped electrode pattern 51, the frame shaped electrode pattern 52 and the frame shaped elastic electric conductor 53 when they are linearly extended. According to an extended example of the electrode pattern 51, the electrode pattern 52 and the elastic electric conductor 53, the electrode pattern 52 is arranged on the left side, the elastic electric conductor 53 is arranged in the center region and the electrode pattern 51 is arranged on the right side.

According to the equivalent circuit example shown in FIG. 4C, the press detection sensor 100 may constitute a variable resistor VR whose resistance value between the electrode pattern 51 and the electrode pattern 52 varies depending on the pressed state of the elastic electric conductor 53.

For example, in the table shown in FIG. 5, when the point A is pushed down weakly, the elastic electric conductor 53 contacts over the electrode pattern 51 and the electrode pattern 52 and makes the electrode pattern 51 and the electrode pattern 52 conductive. The resistance value at that time is R (I). When the point A is pushed down strongly, the elastic electric conductor 53 contacts the electrode pattern 51 and the electrode pattern 52 with the elastic electric conductor 53 entering into a space between the electrode pattern 51 and the electrode pattern 52 and makes the electrode pattern 51 and the electrode pattern 52 conductive. The resistance value at that time is R (II). Also with respect to other points B, C and D, the resistance value R(I) is obtained when each point is pushed down weakly and the resistance value R(II) is obtained when each point is pushed down strongly.

Also, when the point E is pushed down weakly, the elastic electric conductor 53 contacts over the electrode pattern 51 and the electrode pattern 52 and makes the electrode pattern 51 and the electrode pattern 52 conductive. The resistance value at that time is R (I), which is similar to that of a case in which the point A, B, C or D is pushed down weakly. When the point E is pushed down strongly, the elastic electric conductor 53 contacts the electrode pattern 51 and the electrode pattern 52 with the elastic electric conductor 53 entering into a space between the electrode pattern 51 and the electrode pattern 52 and makes the electrode pattern 51 and the electrode pattern 52 conductive. The resistance value at that time is R (II), which is similar to that of a case in which the point A, B, C or D is pushed down strongly. Thus, the resistance value R(I) when the point A, B, C, D or E is pushed down weakly and the resistance value R(II) when the point A, B, C, D or E is pushed down strongly have a relationship of R(I)>R(II).

Owing to such a relation, it has been found that the press detection sensor 100 can detect the press force F only by reading out the resistance values R(I), R(II) without depending on the pressed position and without using the driver IC.

FIG. 6 shows a detection circuit example of the press detection sensor 100. According to the detection circuit example of the press detection sensor 100 shown in FIG. 6, a direct current power supply Edc and a voltage detection circuit are connected in series with respect to the electrode pattern 51 and the electrode pattern 52. A voltage meter and a load resistance RL constitutes the voltage detection circuit 63.

In this detection circuit, when pushing down the elastic electric conductor 53, an electric current "i" flown out from the direct current power supply Edc flows into the load resistance RL through a variable resistor VR composed of the electrode pattern 51, the electrode pattern 52 and the elastic electric conductor 53. A voltage drop VL occurs across the load resistance RL. The voltage drop VL becomes an analog voltage depending on the pressed state of the elastic electric conductor 53. By detecting this analog voltage, it becomes possible to detect the press force F (detection principle).

FIGS. 7A and 7B show pressed states of the elastic electric conductor 53 and FIG. 7C shows an example of change in a resistance value between the electrode patterns 51 and 52. The vertical axis shown in FIG. 7C denotes a resistance value [Ω] between the electrode patterns 51 and 52 when pushing down the elastic electric conductor 53. The horizontal axis shown in FIG. 7C denotes the press force F [N] when pushing down the elastic electric conductor 53.

According to the example of change in a resistance value between the electrode patterns 51 and 52 in this embodiment, as shown in FIG. 7A, the resistance value R(I) is obtained when the elastic electric conductor 53 is pushed down depending on a press force F1 by an operator's finger 30a or the like. Similarly, when pushing down the elastic electric conductor 53 depending on a press force F2, the resistance value R (II) is obtained. It has been found that the resistance value change curve indicates a characteristic having such an inclination that the more the press force increases, the more the resistance value decreases exponentially.

FIGS. 8A to 8D show pushdown operation examples of the press detection sensor 100 and FIG. 8E shows an output characteristic example of the press detection sensor 100. The vertical axis shown in FIG. 8E denotes an output voltage Vo [V] when pushing down the press detection sensor 100. The horizontal axis shown in FIG. 8E denotes a press force F [N] when pushing down the press detection sensor 100.

In this embodiment, it has been found that the output characteristic curve of the press detection sensor 100 indicates a characteristic in which the more the press force F increases, the more the output voltage increases exponentially and becomes saturated. When setting a threshold voltage for judgment with respect to such an output characteristic curve, it becomes possible to judge the press force F from the output voltage Vo. In this embodiment, two judgment threshold voltages Vth1 and Vth2 are set (Vth1<Vth2).

When the finger 30a does not contact with the press detection sensor 100 as shown in FIG. 8A, in other words, on an occasion of non-operation, naturally, F0=0 is true for the press force F. When operating the press detection sensor 100 and in a case in which the finger 30a contacts with the press detection sensor 100 weakly as shown in FIG. 8B, an output voltage Vo equal to or less than the judgment threshold voltage Vth1 is detected, so that it becomes possible to judge a fact that the press force F thereof is approximately F1.

When the finger 30a contacts with the press detection sensor 100 strongly as shown in FIG. 8C, for example, in a case in which an output voltage Vo is detected which exceeds the judgment threshold voltage Vth1 and is equal to or less than the judgment threshold voltage Tth2, it becomes possible to judge a fact that the press force F is approximately F2. Further, when the finger 30a contacts the press detection sensor 100 more strongly as shown in FIG. 8D, for example, in a case in which the output voltage Vo is detected which exceeds the judgment threshold voltage Vth2, it is possible to judge a fact that the press force F is approximately F3.

In this manner, according to the press detection sensor 100 as the first embodiment, the cover sheet 54 for covering a top of the base sheet 55 including the electrode pattern 51 and the electrode pattern 52, the cover sheet 54 having on the inside thereof the elastic electric conductor 53 which electrically connects the electrode pattern 51 and the electrode pattern 52 on the base sheet 55 having predetermined length and width and also having a predetermined shape, is provided and the cover sheet 54 is designed to have flexibility and/or elasticity.

Consequently, when executing a pushdown operation, it becomes possible to reliably detect a press force F (pressdown force) at a position where the elastic electric conductor 53 connects the electrode pattern 51 and the electrode pattern 52 electrically. This enables to be provided the frame shaped press detection sensor 100 with a thin and simple structure while employing an air-tight structure that can prevent dust, water or the like from invading thereinto. Thus, the press detection sensor 100 is a sensor which can be provided by such a very simple system that only reads the resistance value of the single variable resistor VR.

Figure 9A:
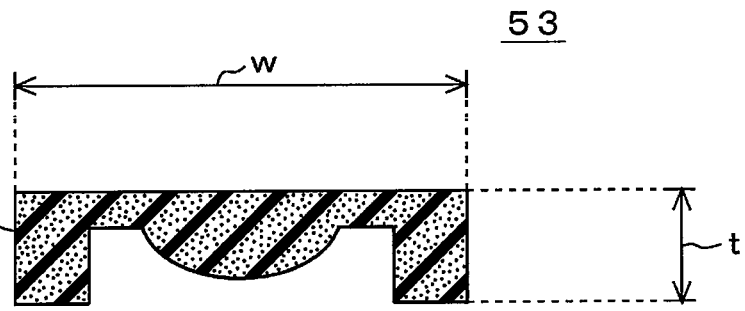
FIGS. 9A through 9C are cross-sectional views of the elastic electric conductor 53 for showing shape examples of cross sections of other configurations thereof.
Figure 9B:
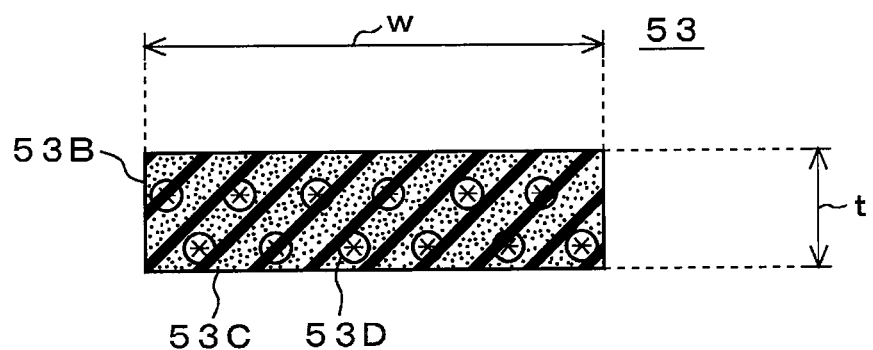
Figure 9C:
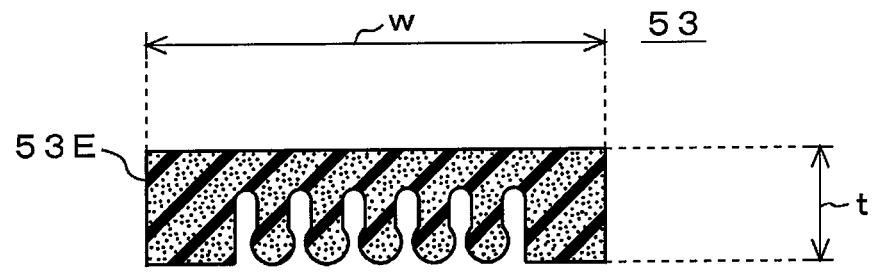

The following will describe other configurations of the press detection sensor 100. FIGS. 9A through 9C show shape examples of cross sections of other configurations of the elastic electric conductor 53. An elastic electric conductor 53A shown in FIG. 9A has an M-shaped cross-section. The elastic electric conductor 53A is a conductor molded into an almost M-shaped one by integrating the elastic electric conductor 53, the upper portion base sheet 54a, the inside space sheet 54b and the outside space sheet 54c, which have been explained in the first embodiment. For the raw material thereof, a conductive rubber member such as a silicon rubber is used. The elastic electric conductor 53A has width "w" and thickness "t". In this embodiment, the elastic electric conductor 53A is arranged on the base sheet 55 of the press detection sensor 100 with the M-shaped region of the elastic electric conductor 53A being provided along a frame outer direction (longitudinal direction) of the base sheet 55. When constituting the elastic electric conductor 53A in this manner, the formation process of the press detection sensor 100 becomes simplified and the elastic electric conductor 53A has flexibility and/or elasticity. When pushing down the elastic electric conductor 53A, a space formed in the M-shaped cross-section thereof will absorb the deformation.

An elastic electric conductor 53B shown in FIG. 9B has a rectangular shaped cross-section. The elastic electric conductor 53B is a conductor molded into a rectangular shape by integrating the elastic electric conductor 53, the upper portion base sheet 54a, the inside space sheet 54b and the outside space sheet 54c, which have been explained in the first embodiment. For example, the elastic electric conductor 53B contains conductive particles (hereinafter, referred to as electric conductive particles 53D) mixed into the rubber member 53C. The elastic electric conductor 53B has width "w" and thickness "t". When constituting the elastic electric conductor 53B in this manner, the elastic electric conductor 53B has flexibility and/or elasticity. When the elastic electric conductor 53B is deformed, the electric conductive particles 53D make the electrode patterns 51, 52 conductive. The contact resistance formed by the electrode patterns 51, 52 and the electric conductive particles 533 will decrease.

An elastic electric conductor 53E shown in FIG. 9C has a comb-shaped cross-section. The elastic electric conductor 53E is a conductor molded into a comb-shaped one by integrating the elastic electric conductor 53, the upper portion base sheet 54a, the inside space sheet 54b and the outside space sheet 54c, which have been explained in the first embodiment. For the raw material thereof, a conductive rubber member is used. The tips of the comb-shaped region of the elastic electric conductor 53E are processed into, for example, spherical shape ones in order to improve the contact with the electrode pattern 51A and the electrode pattern 52A, which will be shown in FIG. 10.

Figure 10:
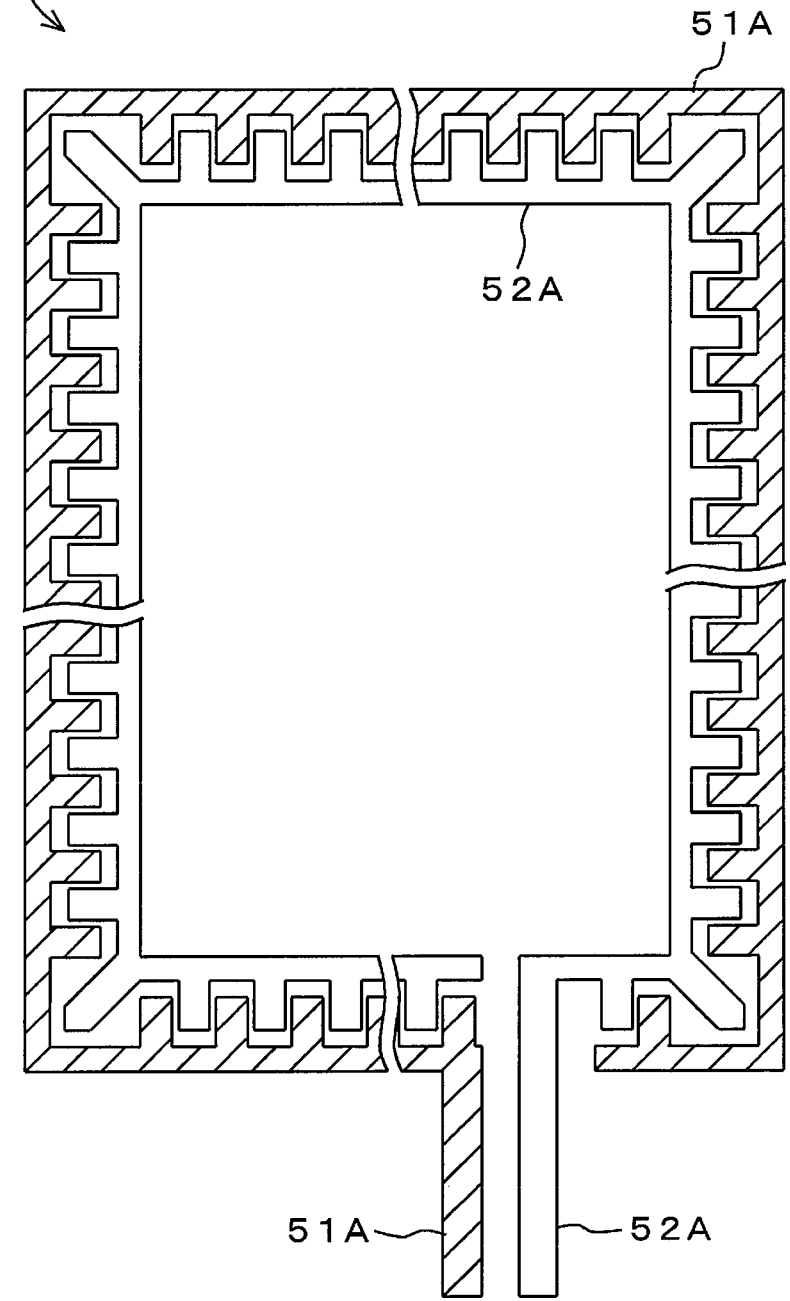
FIG. 10 is a plan view of electrode patterns 51A and 52A for showing a configuration thereof.

In this embodiment, the elastic electric conductor 53E is arranged on the base sheet 55 of the press detection sensor 100A, which will be shown in FIG. 10, with the comb-shaped region is provided along the frame outer direction (longitudinal direction) of the base sheet 55. The elastic electric conductor 53E has width "w" and thickness "t". When constituting the elastic electric conductor 53E in this manner, the elastic electric conductor 53E has flexibility and/or elasticity. When pushing down the elastic electric conductor 53E, a plurality of space portions in the comb-shaped cross-section thereof will absorb the deformation. Also, the elastic electric conductor 53E shows a unique movement on the electrode pattern 51A and the electrode pattern 52A as compared with the elastic electric conductor 53A. For example, owing to a fact that any tips of the comb-shaped region of the elastic electric conductor 53E contact with the electrode pattern 51A and the electrode pattern 52A, the contact surface thereof increases and the resistance value decreases.

FIG. 10 shows a configuration of the electrode patterns 51A and 52A. In this embodiment, the press detection sensor 100A is constituted by combining the elastic electric conductor 53E having the comb-shaped cross-section shown in FIG. 9C.

According to the configuration of the press detection sensor 100A shown in FIG. 10, the electrode pattern 51A and the electrode pattern 52A are made by patterning them on a base sheet, which is not shown, in a configuration of being notched in plain comb shapes. In this embodiment, the comb-shaped region of the electrode pattern 51A or the electrode pattern 52A is made by patterning it into a rectangular shape, so that the rectangular shaped region of the electrode pattern 51A and the rectangular shaped region of the electrode pattern 52A are combined in a nested state.

When constituting the press detection sensor 100A in this manner, not only the distance by which the electrode pattern 51A and the electrode pattern 52A face each other can be increased apparently as compared with a case in which the patterns are parallelly provided linearly such as the electrode patterns 51 and 52 but also the area through which the elastic electric conductor 53E contacts with the electrode pattern 51A and the electrode pattern 52A can be increased as compared with the first embodiment. This enables a detailed contact state to be detected among the electrode pattern 51A, the electrode pattern 52a and the elastic electric conductor 53E.

It should be noted that any combinations of the electrode pattern 51, the electrode pattern 52 and the elastic electric conductor 53 can be set and selected freely and any combinations of the electrode pattern 51A, the electrode pattern 52A and the elastic electric conductor 53E can be set and selected freely.

Embodiment 2

Figure 11:
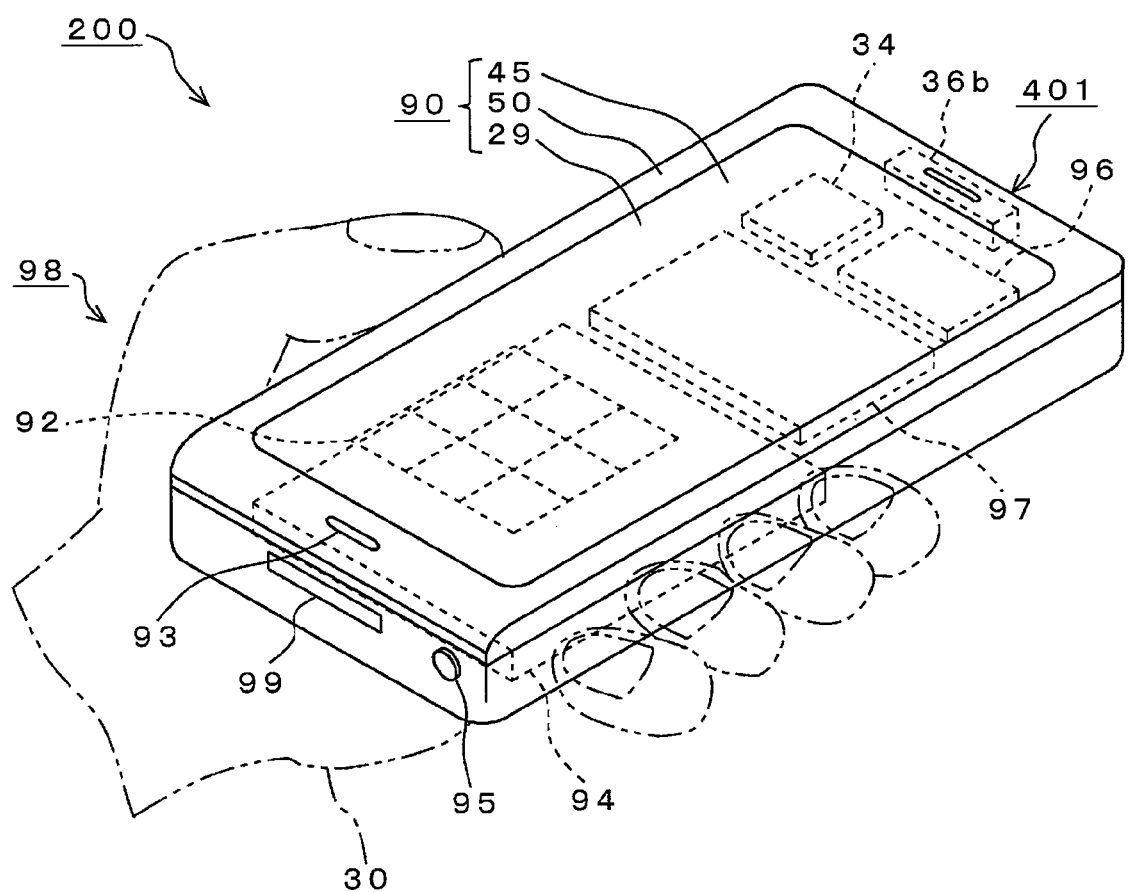
FIG. 11 is a perspective view of a mobile phone 200 with a touch-sensitive input function as a second embodiment of the application for showing a configuration thereof, in which the mobile phone 200 is provided with an embodiment of an input device.

FIG. 11 shows a configuration of a mobile phone 200 with a touch-sensitive input function as a second embodiment in which the mobile phone 200 is provided with an embodiment of an input device.

The mobile phone 200 shown in FIG. 11 constitutes one example of an electronic apparatus. The mobile phone 200 is an electronic apparatus with the touch-sensitive input function, which presents sense of touch to an operation body (operator) when executing an information input operation, and is provided with an input device 90 with a press detection function relating to the embodiment. The mobile phone 200 performs various kinds of data processing including sound and image processing, in addition to the telephone processing.

The mobile phone 200 includes a non-folding type housing 401 having an operation surface and the input device 90 with press detection and touch-sensitive input function. The input device 90 is a device that inputs information in response to a press operation by the operation body onto an input detection surface on a display screen thereof. The housing 401 includes an upper operation frame body (cabinet) 41 and a lower housing 42 (case). The lower housing 42 forms a box body with a bottom plate.

The input device 90 is fitted together the upper operation frame body 41 and inputs three dimensional information in X, Y, Z directions depending on the sliding and/or press operations by the operator's finger 30a or the like. The input device 90 contains, for example, a display unit 29, an input detection unit 45 and a press detection unit 50. On the display unit 29, input information such as an icon image is displayed. The input detection unit 45 is provided on the display unit 29 having the operation surface and detects the slide position of the finger 30a of the operator 30 or the like. For the input detection unit 45, a resistive-film type touch panel, for example, is used. In this embodiment, as the press detection unit 50, the press detection sensor 100 or 100A explained as the first embodiment relating is provided (see FIG. 12).

A very small sized speaker 36b with an actuator function is provided on an upward middle portion of the front surface of the upper operation frame body 41 and concurrently functions as a receiver for phone call (phone receiver) and an actuator for presenting sense of touch. The speaker 36b receives an audio signal and a 200 Hz vibration control signal for presenting the sense of touch.

In this embodiment, with respect to the display unit 29, A display region thereof is divided into two parts. Any input information of a plurality of button icons or the like is displayed on the display region of the upper part thereof and an operation panel 98 is displayed on the display region of the lower part thereof. In this embodiment, when the icon image for the input operation displayed on the display unit 29 is operated by the finger, it is constituted so as to present clicking sound (cyber switch operation sound) from the speaker 36b and at the same time, so as to present the sense of touch to the operator's finger touching the display screen.

In this embodiment, the operation panel 98 displayed on the display unit 29 includes a plurality of push button switches 92. For example, the push button switches 92 are constituted by numeral keys of "0" to "9", symbol keys of "*", "#" and the like, hook buttons of "ON", "OFF" and the like, and a menu key or the like. A camera 34 is mounted on the back surface of the display unit 29 and is operated so as to shoot a subject image. A microphone 93 for phone call is mounted on a downward portion of the upper surface of the upper operation frame body 41, and functions as a telephone transmitter.

It should be noted that a connector 99 such as a USB terminal is arranged on a side surface of the lower housing 42 and can execute a communication process to an external. A module type antenna 96 is mounted on the inside of lower housing 42, a speaker for loud sound, which is not shown, is provided at the inner periphery thereof and is constituted so as to sound-emit the incoming melody or the sound (music) or the like which is added to image data. A circuit board 97 is provided on the inside of the lower housing 42. Further, a battery 94 is built in the housing and the power is supplied to the circuit board 97, the display unit 29 and the like.

Figure 12:
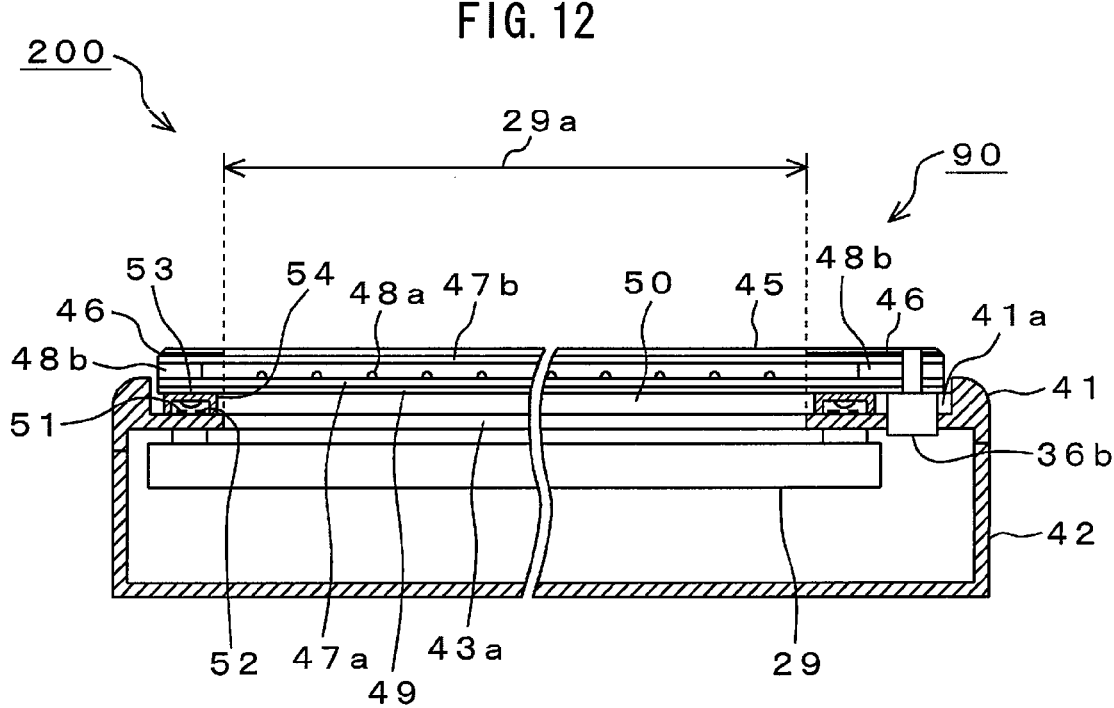
FIG. 12 is a cross-sectional view of the mobile phone 200 for showing an internal configuration thereof.

FIG. 12 shows an internal configuration of the mobile phone 200. The mobile phone 200 shown in FIG. 12 is mounted so that the upper operation frame body 41 forming a lid can be fitted into the lower housing 42 forming a box body with a bottom plate.

In this embodiment, the upper operation frame body 41 is provided with a concave portion (step-shaped portion) 41a for mounting a component part. In the concave portion 41a, an opening portion 43a for a display window portion is opened. A display area 29a of the display unit 29 is set by the opening portion 43a. The display unit 29 is mounted, for example, on the rear surface of the upper operation frame body 41 with the peripheral portion thereof and is mounted so as to be hung down in the lower housing 42. This enables the display unit 29 to be arranged in the lower housing 42 with the display screen thereof facing upward, thereby displaying the input information. For the display unit 29, a color liquid crystal display device having thickness of around 1.65 mm. is used.

In this embodiment, the press detection unit 50 as explained in the first embodiment is mounted on the step-shaped surface of the concave portion 41a of the upper operation frame body 41. The press detection unit 50 includes the frame shaped base sheet 55 having predetermined length and width and also forming an opening portion in the center region thereof, the electrode pattern 51 having predetermined length and being arranged on the base sheet 55, the electrode pattern 52 that is arranged on the base sheet 55 with it being faced to the electrode pattern 51, and the elastic electric conductor 53 that is arranged between the electrode pattern 51 and the electrode pattern 52. The cover sheet 54 including the elastic electric conductor 53 on the inside thereof is provided so that the cover sheet 54 covers the top of the base sheet 55 which includes the electrode pattern 51 and the electrode pattern 52. The cover sheet 54 has flexibility and/or elasticity.

The press detection unit 50 is, for example, adhered to the step-shaped surface of the concave portion 41a through an adhesive agent. The press detection unit 50 is set so as to form a frame shape on the periphery of the display unit 29, connects the electrode pattern 51 and the electrode pattern 52 electrically in response to the press force F of the operation body and detects the press force F of the operation body. The inside opening portion of the press detection unit 50 corresponds to the display area 29a. The press detection unit 50 also has a coupling function of the upper and lower members.

The input detection unit 45 is provided at the upper portion of the press detection unit 50. The input detection unit 45 is provided at the upper portion of the display unit 29 and on the frame shaped press detection unit 50. The input detection unit 45 is, for example, adhered to the frame shaped region of the press detection unit 50 through an adhesive agent. The input detection unit 45 has an input detection surface on the display unit 29 and detects the contact position of the operation body on the input detection surface.

For the input detection unit 45, a touch panel in which a front surface plate and a resistive film are incorporated having thickness of around 1.1 mm to 1.5 mm is used. For the touch panel forming the input detection unit 45, a touch panel is used, which includes, for example, an electric conductive film 47a for a resistive film that is provided on a base sheet 49, spacers 48a, 48b that is provided on the electric conductive film 47a, and an electric conductive film 47b for resistive film selection that is provided at the upper portion of these spacers 48a, 48b. In a predetermined region of the electric conductive film 47b, a black silk print 46 is applied, which enables display light to be shut off. A space occurs between the display unit 29 and the input detection unit 45, and it is allowed to fill up this space with a transparent member as disclosed in Japanese Patent Application Publication No. 2004-77887.

Also, it is satisfactory if, for example, a touch-sensitive input sheet for icon touch, which is described in Japanese Patent Application No. 2007-308089 is used for the front surface plate. Here, the touch-sensitive input sheet means a touch sheet by which an input operation accompanied by a concavity and convexity feeling is available when touching the icon image displayed on the display unit 29 by a finger or the like. It is needless to say that the operator's finger 30a is not limited and any input operation using an operation body such as a pen and a stylus is allowed.

Figure 13:
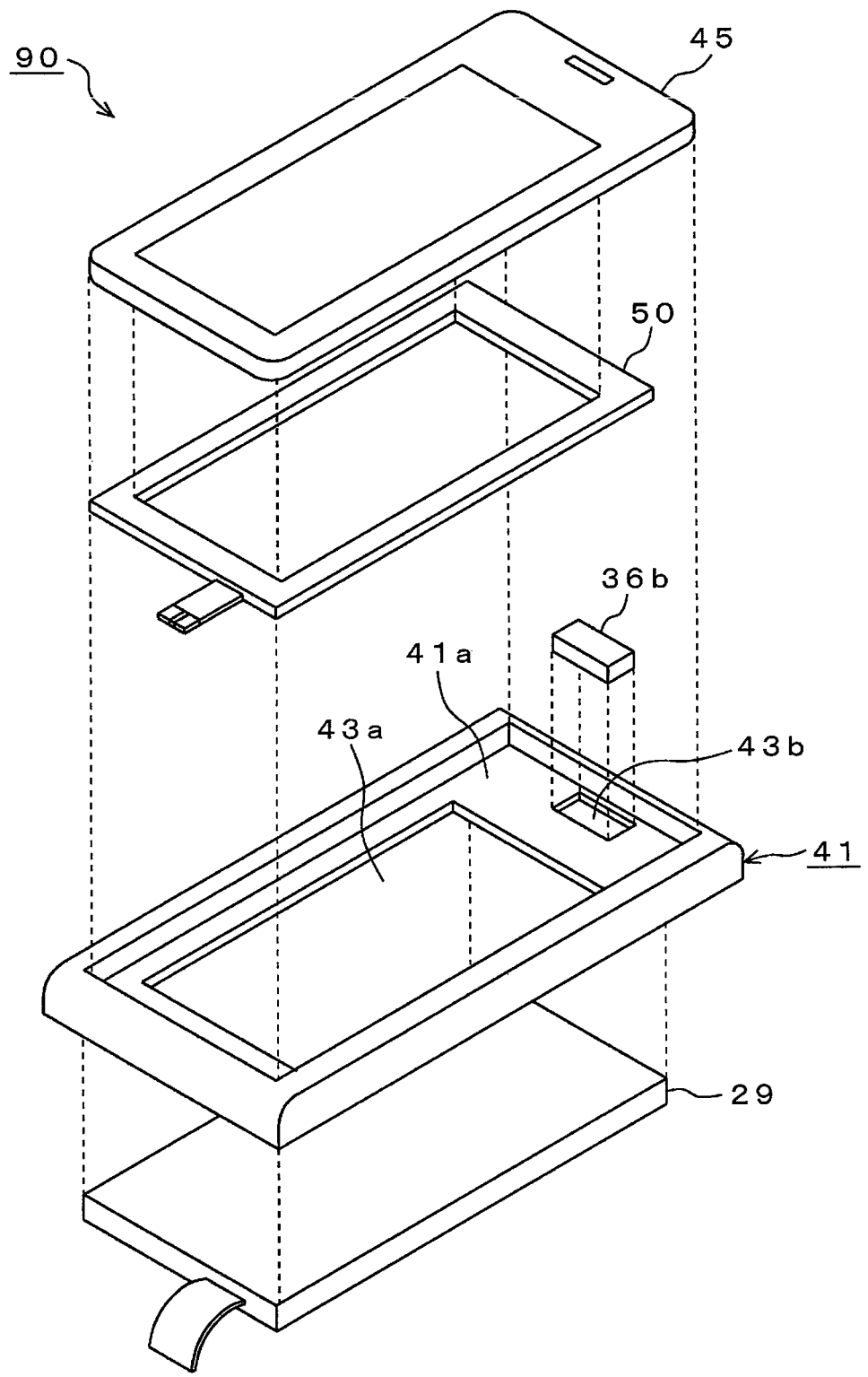
FIG. 13 is an exploded perspective view of an input device 90 for showing an assembled example thereof.

FIG. 13 shows an assembled example of the input device 90. According to the input device 90 shown in FIG. 13, there are prepared the display unit 29, the speaker 36b with actuator function, the upper operation frame body 41, the input detection unit 45 and the press detection unit 50. As the upper operation frame body 41, a frame body formed by injection die molding is used. For example, a die including a core and a cavity, in which the opening portion 43a for the display window and the opening portion 43b for attachment of the speaker 36b are molded, is made and the upper operation frame body 41 is molded into one body by sealing an ABC resin or the like into this die.

First, the press detection unit 50 is mounted on the upper operation frame body 41. For example, an adhesive agent is coated in a frame shape on the step-shaped surface of the concave portion 41a thereof. Thereafter, the press detection unit 50 is position-aligned with respect to the concave portion 41a and the press detection unit 50 is adhered so as to be fallen into the concave portion 41a thereof. For the press detection unit 50, the detection unit explained in the first embodiment is used.

Then, the input detection unit 45 is mounted on the press detection unit 50. For example, an adhesive agent is coated on the frame shaped region of the press detection unit 50. Thereafter, the input detection unit 45 is position-aligned with respect to the concave portion 41a and the input detection unit 45 is adhered on the press detection unit 50 so as to be fallen into the concave portion 41a thereof. For the input detection unit 45, a touch panel in which a front surface plate and a resistive film are incorporated is used.

Next, the speaker 36b with actuator function is mounted on the input detection unit 45. For example, the speaker 36b is arranged at a predetermined position of the input detection unit 45 through the opening portion 43b of the upper operation frame body 41 and is fixed through an adhesive agent. Further, the display unit 29 is mounted on the rear side of the upper operation frame body 41. For example, an adhesive agent is coated on the rear surface of the upper operation frame body 41 along the periphery portion of the opening portion 43a thereof. Thereafter, the display area 29a of the display unit 29 is position-aligned corresponding to the opening portion 43a and the display unit 29 is fixed on the rear surface side of the upper operation frame body 41 at the periphery portion of the opening portion 43a thereof by adhesion and/or by screw fixation with the display unit 29 being hung down. For the display unit 29, a color liquid crystal display device is used.

On the other hand, the lower housing 42, which is not shown, is prepared. For the lower housing 42, a housing mounted with the circuit board, the connector and the like, which are not shown, is used. For example, a die including a core and a cavity, by which the opening portion for a connector and the opening portion for the battery exchange, which are not shown, are modeled is made and the lower housing 42 is molded into one body by sealing an ABC resin or the like into this die. In the lower housing 42, a circuit board, a memory and the like are mounted. Then, when engaging the lower housing 42 with the upper operation frame body 41 including the touch panel in which the front surface plate and the resistive film are incorporated and the press detection unit 50 so to be fitted, the mobile phone 200 with the input device as shown in FIG. 12 is completed.

Figure 14:
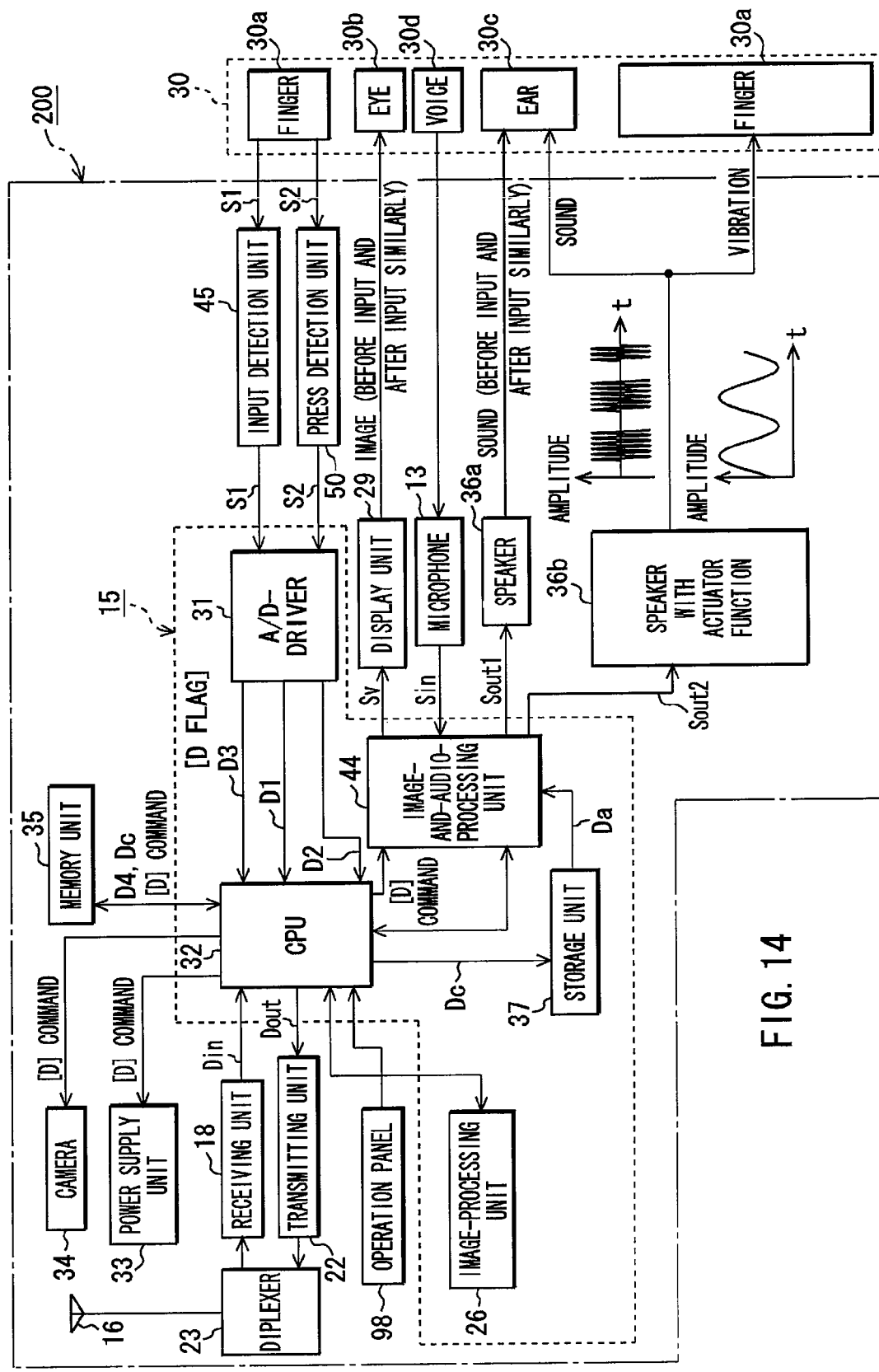
FIG. 14 is a block diagram of the mobile phone 200 with a touch-sensitive input function for showing an inside configuration thereof.

The following will describe an internal configuration and a touch-sensitive feedback input method of the mobile phone 200 with a touch-sensitive input function. FIG. 14 shows an internal configuration of the mobile phone 200 with the touch-sensitive input function.

The mobile phone 200 shown in FIG. 14 is constituted by allowing respective function blocks to be mounted on the circuit board 97 of the lower housing 42. It should be noted that the components shown in FIG. 14 corresponding to the respective components shown in FIG. 11 to FIG. 13 are shown by the same numeral numerals as those shown in FIG. 11 to FIG. 13. The mobile phone 200 includes a control unit 15, a receiving unit 18, a transmitting unit 22, an antenna diplexer 23, an input detection unit 45, the press detection unit 50, the speaker 36b with actuator function, the display unit 29, a microphone 13, a power supply unit 33, a camera 34, a memory unit 35 and an operation panel 98 on an image screen.

With respect to the input detection unit 45 shown in FIG. 14, an input device in which a front surface plate and a resistive film are incorporated has been explained in FIG. 11 to FIG. 13, but everything is available only if the input device is a device in which cursoring and selection functions can be distinguished. For example, an input device such as an electrostatic-capacity type, a surface acoustic wave method (SAW), an optical method, and a tact switch of a multi stage system is available therefor. Preferably, an input device having a constitution in which position information can be applied to the control unit 15 is available therefor. The above-mentioned input detection unit 45 detects the slide position of the finger 30a of the operator 30 and outputs at least a position detection signal S1 to an A/D-driver 31.

In this embodiment, the press detection unit 50 is provided other than the input detection unit 45, detects a press-down amount by the finger 30a of the operator 30 at the slide position, and outputs a press detection signal S2 for obtaining the press force F (input amount) to the A/D-driver 31. The press detection signal S2 is constituted by an analog output voltage Vo showing a change in the resistance value of the variable resistor VR of the press detection unit 50.

The control unit 15 includes the A/D-driver 31, a CPU 32, an image-processing unit 26, an image-and-audio-processing unit 44, and a storage unit 37. The A/D-driver 31 receives the position detection signal S1 from the input detection unit 45 and also receives the press detection signal S2 from the press detection unit 50. The A/D-driver 31 converts an analog signal composed of the position detection signal S1 and the press detection signal S2 to digital data in order to distinguish the function of the cursoring and the function of the icon selection. Further, the A/D-driver 31 calculates this digital data, detects which is the cursoring input or the icon selection information, and supplies flag data D3 by which the cursoring input or the icon selection is distinguished, the position information D1 or the press detection information D2 to the CPU 32. These calculations may be executed in the CPU 32.

The A/D-driver 31 is connected with the CPU 32. The CPU 32 controls the whole mobile phone based on a system program. The memory unit 35 stores system program data for controlling the whole mobile phone. A RAM, which is not shown, is used as a work memory. The CPU 32 reads the system program data out of the memory unit 35 when turning the power ON, expands the system program data in the RAM, turns on the system, and controls the whole mobile phone. For example, the CPU 32 receives the input information D1 to D3 from the A/D driver 31, supplies predetermined instruction data D to the devices such as the power supply unit 33, the camera 34, the memory unit 35, the storage unit 37, and the image-and-audio-processing unit 44, takes-in the reception data from the receiving unit 21, and transfers the transmission data to the transmitting unit 22.

In this embodiment, the CPU 32 compares the press detection information D2 obtained from the press detection unit 50 and two judgment threshold voltages Vth1 and Vth2 which become preset press judgment references and controls the storage unit 37 so as to vibrate the speaker 36b with actuator function based on the comparison result thereof.

For example, when the sense of touch propagated from the input detection surface at the pressed position of the input detection unit 45 are assumed to be A and B, a sense of touch #a is obtained by changing the input detection surface in response to the press force F of the operator's finger 30a in the pressed position thereof from a low frequency and also small amplitude vibration pattern to a high frequency and also large amplitude vibration pattern. Also, a sense of touch #b is obtained by changing the input detection surface in response to the press force F of the operator's finger 30a at the pressed position thereof from a high frequency and also large amplitude vibration pattern to a low frequency and also small amplitude vibration pattern.

For example, the CPU 32 controls the storage unit 37 such that the sense of touch #a is started up when the press detection unit 50 detects the press detection information D2 which exceeds the judgment threshold voltage Vth2 and thereafter, the sense of touch #b is to be started up when the press detection information D2 less than the judgment threshold voltage Vth1 is detected. By doing in this manner, it is possible to generate different vibration patterns in conformity with "press force" by the operator's finger 30a or the like.

The CPU 32 is connected with the storage unit 37 in which vibration control data Da is generated based on the control information Dc from the CPU 32. The vibration control data Da includes output waveform data composed of a sinusoidal waveform. The storage unit 37 is connected with the image-and-audio processing unit 44. The image-and-audio-processing unit 44 is connected with the speaker 36a and the speaker 36b with actuator function. The speaker 36b vibrates based on the respective items of the vibration control data Da.

In this embodiment, the memory unit 35 stores the judgment threshold voltages Vth1 and Vth2 corresponding to each application. For example, the judgment threshold voltages Vth1, Vth2 are stored beforehand in a ROM or the like provided in the memory unit 35 as trigger parameter. The CPU 32 expands the press detection information D2 in the RAM, which is not shown or the like and compares the predetermined judgment threshold voltages Vth1, Vth2 with the information of the output voltage Vo of the press detection unit 50 obtained from the press detection information D2. As shown in FIG. 8A, when the finger 30a does not contact with the press detection unit 50, specifically at a time of the non-operation, the press force F is set to zero (F0=0), naturally.

When operating the press detection unit 50, when the finger 30a contacts the press detection unit 50 weakly as shown in FIG. 8B, the output voltage Vo that is equal to or less than the judgment threshold voltage Vth1 is detected, so that it is possible to judge a fact that the press force F is approximately F1. Also, when the finger 30a contacts the press detection unit 50 strongly as shown in FIG. 8C, for example, when the output voltage Vo exceeding the judgment threshold voltage Vth1 and being equal to or less than the judgment threshold voltage Tth2 is detected, it is possible to judge a fact that the press force F is approximately F2. Further, when the finger 30a contacts the press detection unit 50 more strongly as shown in FIG. 8D, for example, when the output voltage Vo exceeding the judgment threshold voltage Vth2 is detected, it is possible to judge a fact that the press force F is approximately F3.

In this embodiment, it is constituted with respect to the press judgment reference such that "first press judgment reference=100 [gf]" is set corresponding to the judgment threshold voltage Vth2 and the input detection surface vibrates based on a vibration pattern for obtaining sense of touch like a classic switch. Also, it is constituted such that "second press judgment reference=20 [gf]" is set corresponding to the judgment threshold voltage Vth1 and the input detection surface vibrates based on a vibration pattern for obtaining sense of touch like a cyber switch.

The CPU 32 is connected with the image-processing unit 26, other than the storage unit 37, in which the display information D4 for displaying the button icon or the like three-dimensionally is image-processed. The image-processed display information D4 is supplied to the display unit 29.

The operator 30 feels vibration for every button icon as the sense of touch by receiving vibration to the finger 30a thereof. Also, it is constituted such that each function is judged by the sense of sight depending on the eyes of the operator for the display contents of the display unit 29 and by the sense of hearing depending on the ears of the operator for the sound release from the speakers 36a, 36b or the like. The above-mentioned CPU 32 is connected with the operation panel 98 (function) constituted by images of the ten-key or the like on the display screen, which is used for example, when a telephone number of the partner is inputted manually. The display unit 29 may display a received picture based on an image signal Sv other than the above-mentioned icon selection screen.

Also, the antenna 16 shown in FIG. 14 is connected with the antenna diplexer 23 and receives a radio wave of the partner from a base station or the like when receiving calls. The antenna diplexer 23 is connected with the receiving unit 18 which receives the reception data introduced from the antenna 16, demodulates the image and audio or the like, and outputs the demodulated image and audio data Din to the CPU 32 or the like. The receiving unit 18 is connected through the CPU 32 with the image-and-audio-processing unit 44 which outputs an audio signal Sout by digital-analog-converting digital audio data and/or outputs an image signal Sv by digital-analog-converting digital image data.

The image-and-audio-processing unit 44 is connected with the speaker 36a for a big sound which constitutes a receiver. The speaker 36a outputs sounds of a receiving sound, an incoming melody and the like when receiving calls. The speaker 36b performs the actuator function, receives an audio signal Sout1, and magnifies the talking voice 30d of the partner or the like. This image-and-audio-processing unit 44 is connected with the microphone 13 constituting a telephone transmitter other than the speakers 36a, 36b and outputs an audio signal Sin by sound-collecting the operator's voice. The image-and-audio-processing unit 44 outputs digital audio data by analog-to-digital converting the analog audio signal Sin for being transmitted to the partner and/or outputs digital image data by analog-digital converting the analog image signal Sv.

In this manner, it is constituted such that each function is judged by the sense of sight depending on the operator's eyes 30b for the display contents of the display unit 29 and by the sense of hearing depending on the operator's ears 30c for the sound release from the speakers 36a, 36b or the like.

The CPU 32 is connected other than the receiving unit 18 with the transmitting unit 22 in which the image and audio data Dout or the like for transmitting to the partner is modulated and the modulated transmission data is supplied to the antenna 16 through the antenna diplexer 23. the antenna 16 radiates a radio wave received from the antenna diplexer 23 toward a base station or the like.

The above-mentioned CPU 32 is connected other than the transmitting unit 22 with the camera 34 which shoots a subject and transmits, for example, still image information or moving image information to the partner through the transmitting unit 22. The power supply unit 33 includes the battery 94 which supplies a DC power to the receiving unit 18, the transmitting unit 22, the display unit 29, the CPU 32, the input detection unit 45, the speaker 36b with actuator function, the camera 34 and the memory unit 35.

Figure 15:
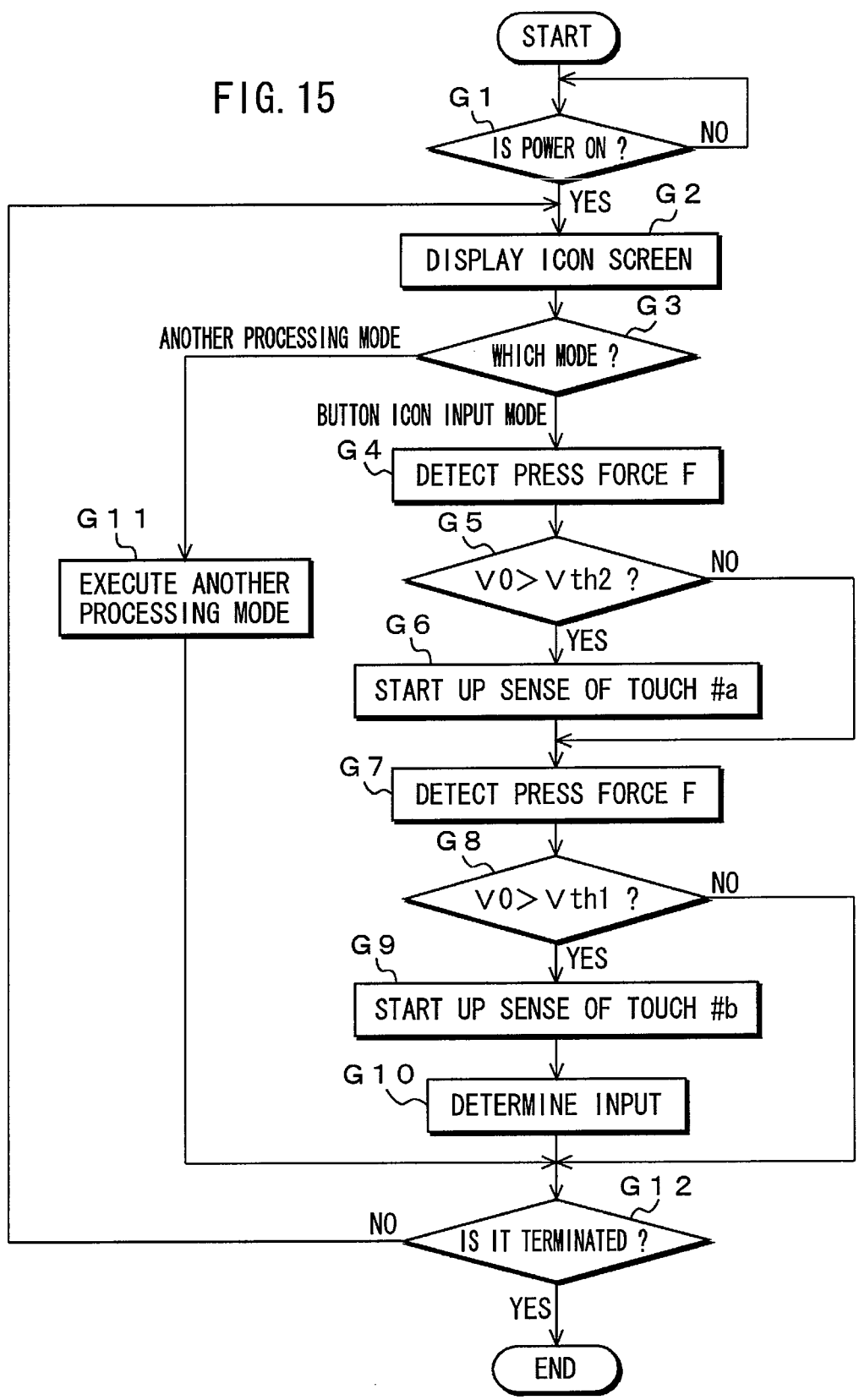
FIG. 15 is a flowchart showing an information-processing example in the mobile phone 200 relating to the second embodiment.

The following will describe an information processing example in the mobile phone 200. FIG. 15 shows an information processing example in the mobile phone 200 relating to the second embodiment. In this embodiment, it is assumed that information is inputted by pressing down the input detection surface on the display screen of the mobile phone 200 by means of the operator's finger 30a. The mobile phone 200 is provided with a function (algorithm) for processing a waveform using the press force F by the operator's finger 30a or the like as parameter in the same vibration mode. The CPU 32 reads an output voltage Vo showing the press force F from the press detection information D2 and executes the judgment based on two judgment threshold voltages Vth1, Vth2 as the references, thereby enabling the sense of touch corresponding to the movement during the input operation to be generated in the same vibration mode based on the judgment result thereof with respect to any kinds of inputs.

By setting these as the information processing conditions, the CPU 32 waits for power ON in step G1 of a flowchart shown in FIG. 15. For example, the CPU 32 detects power-ON information and starts up the system. The power-ON information is generated normally when a power switch of the mobile phone or the like which is in a sleeping state is turned on under a situation that a time function or the like is in operation.

Then, the process shifts to step G2 where the CPU 32 controls the display unit 29 so as to display the icon screen. For example, the CPU 32 supplies the display information D4 to the display unit 29 which displays input information such as ten-keys and icon images on the display screen thereof. The input information displayed on the display screen may be seen by the operator's eyes through the input detection unit 45 having the input detection surface. Then, the process shifts to step G3 where the CPU 32 branches its control into a button icon input mode or another process mode. The button icon input mode is refereed to as an input operation for pushing down a button icon on the input detection surface when selecting an icon image.

In case of setting the button icon input mode, a button icon or the like is pushed down, so that the process shifts to step G4 where the CPU 32 reads the output voltage Vo showing the press detection information D2 (press force F) out of the press detection unit 50 and detects the press force F based on this output voltage Vo. At that time, the press detection unit 50 detects the press force F at the pressed position by the operator's finger 30a in the input detection surface and outputs the press detection signal S2 to the A/D-driver 31. The A/D-driver 31 converts the press detection signal S2 from analog signal to digital data and transfers the converted digital press detection information D2 to the CPU 32.

Then, the process shifts to step G5 where the CPU 32 compares the output voltage Vo of the press detection unit 50, which the press detection information D2 denotes, with the judgment threshold voltage Vth2 and judges whether or not these relation becomes Vo>Vth2. If these relation becomes Vo>Vth2, then the process shifts to step G6 where the sense of touch #a is started up. The sense of touch #a is obtained by vibrating the input detection surface based on the vibration pattern Pa corresponding to the press force F by the operator's finger 30a by means of the speaker 36b with actuator function. For example, when a frequency is set as fx, an amplitude is set as Ax and the number of times is set as Nx, with respect to this, the sense of touch #a is obtained by vibration according to a vibration pattern [fx, Ax, Nx]=[50, 5, 2] during a time period of approximately 0.1 second and in next step, a vibration pattern [fx, Ax, Nx]=[100, 10, 2] during a time period of approximately 0.1 second. By doing in this manner, it is possible to generate the different vibration patterns in conformity with the "press force" of the operator.

Thereafter, the process shifts to step G7 where the CPU 32 further detects the press force F. The press force F is detected by the press detection unit 50 under a state where the finger 30a of the operator is apart from the button icon after the button icon is pressed down. At that time, the press detection unit 50 detects the press force F when leaving the operator's finger 30a from the pressed position thereof in the input detection surface and outputs a press detection signal S2 to the A/D-driver 31. The A/D-driver 31 converts the press detection signal S2 from analog signal to digital data and transfers the converted digital press detection information D2 thereof to the CPU 32.

Then, the process shifts to step G8 where the CPU 32 compares the output voltage Vo of the press detection unit 50, which the press detection information D2 denotes, with the judgment threshold voltage Vth1 and judges whether or not these relation is Vo>Vth1. If these relation becomes Vo>Vth1, the sense of touch #b is started up. The sense of touch #b is obtained by vibrating the input detection surface based on the vibration pattern Pb corresponding to the press force F by the operator's finger 30a by means of the speaker 36b with actuator function. The sense of touch #b when the button icon thereof is released is obtained by vibration according to, for example, a vibration pattern [fx, Ax, Nx]=[80, 8, 2] during a time period of approximately 0.1 second and in next step, a vibration pattern [fx, Ax, Nx]=[40, 8, 2] during a time period of approximately 0.1 second. By doing in this manner, it is possible to generate the different vibration patterns in conformity with the "press force" by the operator.

Thereafter, the process shifts to step G10 where the input is determined. At that time, the input detection unit 45 inputs the input information displayed on the pressed position. Then, the process shifts to step G12. It should be noted that if another processing mode is selected in the step G3, then the process shifts to step G11 where the above-mentioned another processing mode is executed. The above-mentioned another processing mode includes a telephone mode, a mail making mode, and a transmission display mode. The telephone mode contains an operation for transmitting calls to the partner. The button icon includes a character input item when selecting telephone mode. After the above-mentioned another processing mode is executed, the process shifts to the step G12.

The CPU 32 makes termination-judgment at the step G12. For example, the power OFF information is detected and the information processing is terminated. If the power-OFF information is not detected, then the process returns to the step G2 where an icon screen of the menu or the like is displayed and the above-mentioned processing is repeated.

In this manner, according to the mobile phone 200 as the second embodiment, the embodiment of the press detection sensor 100 or 100A relating is included in the press detection unit 50, so that when the information is inputted with respect to the press operation by the operator's finger 30a into the input detection surface on the display screen, it is possible to reliably detect the information relating to a position at which the conductors of the electrode pattern 51 and the electrode pattern 52 are electrically coupled. Further, it is possible to detect the press force F (press-down force) corresponding to a period of time when electrically coupling the elastic electric conductor 53 to the conductors of the electrode pattern 51 and the electrode pattern 52 in response to the press operation.

Furthermore, though the press detection unit 50 has a simple structure, the press force detection function is stabilized without depending on the pushdown position. The press detection unit 50 is near the operation surface as compared with the input device of past system, so that it is possible to reduce the number of parts intervening between the press detection unit 50 and the operation surface. Also, the press detection unit 50 is constituted by a single variable resistor and there is employed a structure in which the resistor is formed in a frame shape and adhered to the concave portion frame of the upper operation frame body 41, so that at any position of the input plain, it is possible to detect the press force F stably and also accurately.

Further, the press detection unit 50 is not affected by the circumferential illumination environment as compared with the input device of past system, and when the press-down operation is executed after touching the front surface by the operation body (object) of the finger 30a or the like, any change occurs reliably in the press detection data so that it is possible to detect the press force F stably.

Also, in the press detection system, there is no driver IC of past system because when judging the press force F, the press detection information D2 that the output voltage Vo of the press detection unit 50 is digitalized is outputted to the CPU 32 and when judging the press force F, the CPU 32 compares only the output voltage Vo and the judgment threshold voltage Vth1 or Vth2. There is no driver IC, so that it is possible to attempt the cost down.

Further, the input device 90 including the press detection unit 50 can be provided cheaply as compared with the input device including the display device with image pickup element relating to past system, so that it is possible to realize the cost down of the input device and the electronic apparatus including the input device.

Also, the input device 90 has the display unit 29 of the air-tight structure which is completely shut off from the outside. In the above-mentioned embodiments, the press detection unit 50 has adhered the upper operation frame body 41 itself, not the display unit 29, and the input detection unit 45 so that it is possible to realize such an air-tight structure that an inside of the operation surface member such as the touch panel in which the front surface plate and the resistive film are incorporated, the display unit 29 and the like have no gap from the outside. This enables the waterproof property and the dustproof property to be improved. Thus, it is possible to assemble the mobile phone 200 excellent in the waterproof property and the dustproof property.

The upper operation frame body 41 employs a structure for supporting the transparent input detection unit 45. In the input device of past system which is not equipped with a press detection function, a surface member is provided at the upper portion of the display unit 29 through an adhesive tape, but in this embodiment, it is possible to replace at this position the press detection unit 50 including a function of an adhesive tape concurrently, so that assembling of the input device 90 becomes also easy as compared with the constitution of the input device of past system.

Thus, it is possible to reduce numbers of the components positioned at the upper portion of the press detection unit 50 as compared with those of the input device of past system, so that the design for avoiding the load imposed on the press detection unit 50 from the other members can be omitted. Consequently, it is possible to increase the degree of freedom in the design of the input device 90. This enables assembling of the mobile phone 200 to be made easy as compared with those of past system. Consequently, it becomes possible to provide the mobile phone 200 with a touch-sensitive input function having the frame shaped press detection unit 50 with a thin-shaped and simple structure while it has an air-tight structure in which the invasion of the dust, water or the like is preventable.

Embodiment 3

Figure 16:
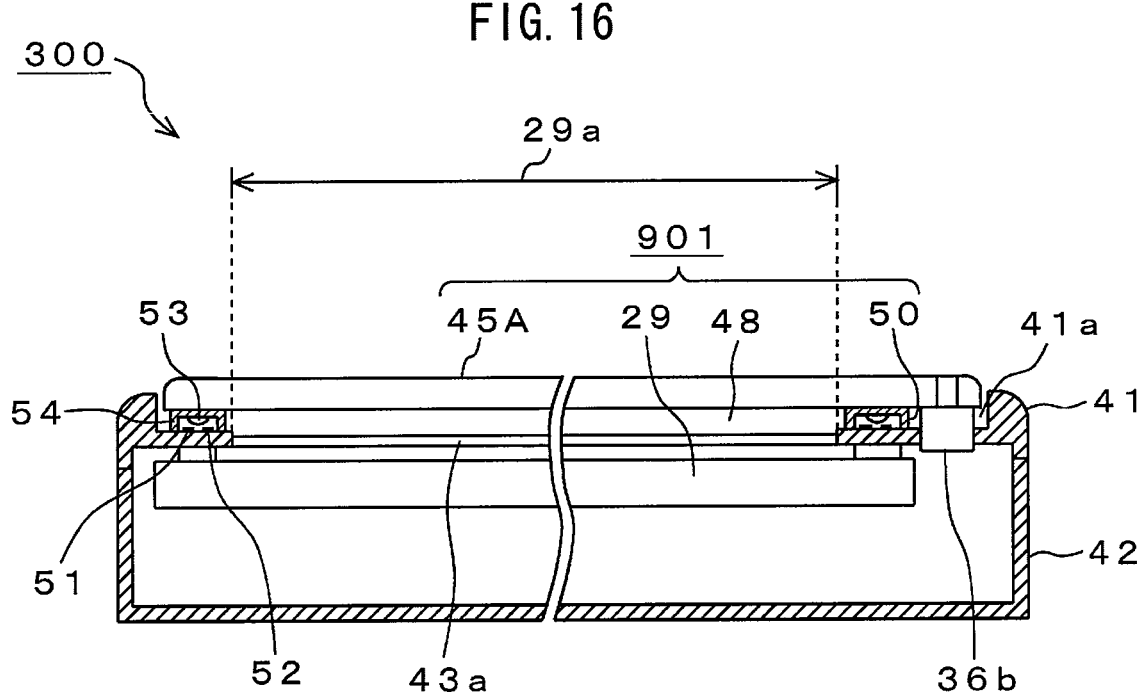
FIG. 16 is a cross-sectional view of a mobile phone 300 as a third embodiment for showing a configuration thereof.

FIG. 16 shows a configuration of a mobile phone 300 as a third embodiment. In this embodiment, it is constituted such that a capacitive touch panel 48 is used under the front surface plate 45A.

The mobile phone 300 shown in FIG. 16, similarly as the second embodiment, is mounted so that the upper operation frame body 41 forming a lid can be fitted into the lower housing 42 forming a box body with a bottom plate. Also in this embodiment, the press detection unit 50 having flexibility and/or elasticity as explained in the first embodiment is arranged on the step-shaped surface of the concave portion 41a of the upper operation frame body 41.

At the upper portion of the press detection unit 50, the front surface plate 45A is provided. The front surface plate 45A is an upper portion of a display unit 29 and is provided on the frame shaped press detection unit 50. As the front surface plate 45A, the touch-sensitive input sheet for icon touch, which is described in Japanese Patent Application No. 2007-308089, may be used. It is needless to say that it is not limited to the touch-sensitive input sheet, and a transparent member, for example, an acrylic system transparent resin film may be used.

The front surface plate 45A is adhered to, for example, the frame shaped region of the press detection unit 50 through an adhesive agent. On the downward (rear surface side) of the front surface plate 45A, the touch panel 48 is provided and has the input detection surface on the display unit 29, and it is constituted such that a contact position of the operation body in the input detection surface can be detected. For the touch panel 48, a capacitive touch panel with the thickness of around 1.1 mm to 1.5 mm is used. It should be noted that components in the third embodiment having the same name and the same numeral as those of the second embodiment have the same function and the same material as those of the second embodiment, so that the explanation thereof will be omitted.

Figure 17:
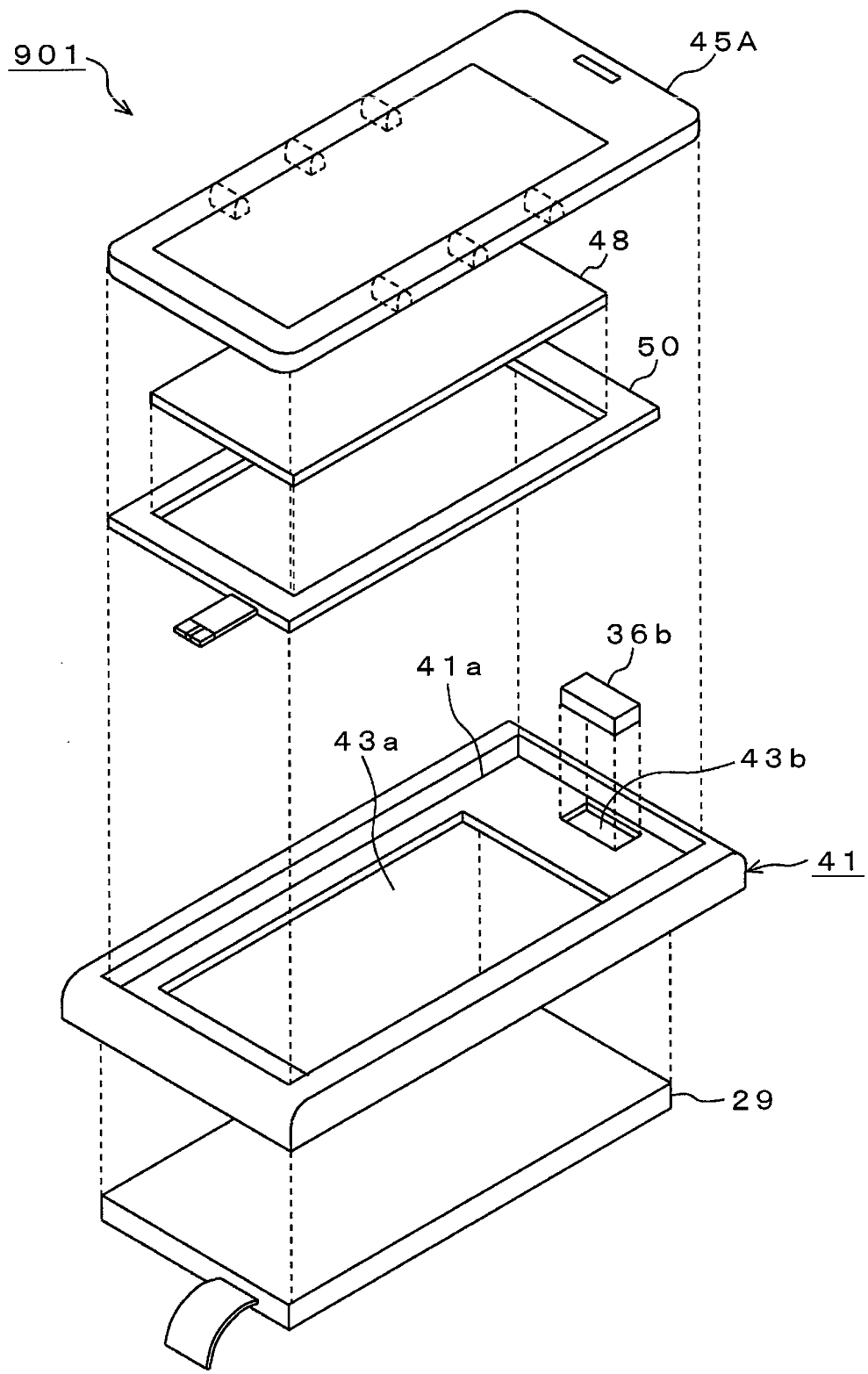
FIG. 17 is an exploded perspective view of an input device 901 for showing an assembled example thereof.

FIG. 17 shows an assembled example of an input device 901. According to the input device 901 shown in FIG. 17, the display unit 29, the speaker 36b with actuator function, the upper operation frame body 41, a front surface plate 45A, the capacitive touch panel 48, and the press detection unit 50 are prepared. For the upper operation frame body 41, an injection die molded one explained in the second embodiment is used.

First, as explained in the second embodiment, the press detection unit 50 is mounted on the upper operation frame body 41. For the press detection unit 50, the press detection sensor 100 explained in the first embodiment is used. Then, the front surface plate 45A is mounted on the press detection unit 50. For the front surface plate 45A, for example, an adhesive agent is coated on the frame shaped region of the press detection unit 50. Thereafter, the front surface plate 45A is position-aligned with respect to the concave portion 41a and the front surface plate 45A is adhered on the press detection unit 50 in a manner so as to be fallen into the concave portion 41a thereof. As the front surface plate 45A, a touch-sensitive input sheet for icon touch, which is described in Japanese Patent Application No. 2007-308089, may be used. The touch-sensitive input sheet may include protrusion blocks each having cylindrical shape or conical shape for presenting a concavity and convexity feeling, which are distributed so as to be provided standingly in the vertical direction with respect to a sheet surface of the base sheet forming the base material.

For example, there is prepared a base member in which a transparent silicon rubber member of the hardness 20° to 40° is formed in a sheet shape. The base member is obtained by molding a silicon rubber member in the thickness t=0.01 [mm] to 5 [mm] around, by using a heat roll molding or by an injection die molding. Next, on the base member, there are formed aperture portions or hole portions for demarcating the region in which a concavity and convexity for the sense of touch feeling is formed. The aperture portions or the hole portions are formed on the positions corresponding to key-images on the icon screen. The aperture portions are formed by a punch process. It is needless to say that a core and a cavity in which reversal patterns of the aperture portions or the hole portions are modeled are made so that the base member and the hole portions or the like can be molded at once when injection die molding.

Thereafter, components for the sense of touch are buried into the aperture portions or the hole portions. For the components, for example, there is used a transparent silicon rubber member of the hardness 60° to 80°. A method of burying the components into the aperture portions or the hole portions is executed by a two-colors mold (double mold) depending on the injection die molding or by a coating process. According to the two-colors mold, the different material properties (materials) forming a base member and a component are combined together and the base member and the component are molded in one body. Thus, the touch-sensitive input sheet, which is not shown. is obtained.

Next, the front surface plate 45A is installed with the speaker 36b with actuator function. The speaker 36b, similarly as the second embodiment, is arranged at a predetermined position of the front surface plate 45A through the opening portion 43b of the upper operation frame body 41 and is fixed thereto through an adhesive agent.

Further, the display unit 29 is mounted on the rear side of the upper operation frame body 41, similarly as the second embodiment. For example, an adhesive agent is coated on the rear surface side of the upper operation frame body 41 along a periphery portion of the opening portion 43a. Thereafter, the display area 29a of the display unit 29 is position-aligned relative to the opening portion 43a and the display unit 29 is fixed to the upper operation frame body 41 with the display unit 29 being hung down on the rear surface side of the upper operation frame body 41 at the periphery portion of the opening portion 43a thereof by adhesion and/or by screw fixation. For the display unit 29, a color liquid crystal display device is used.

On the other hand, similarly as the second embodiment, the lower housing 42, which is not shown, is prepared. On the lower housing 42, a circuit board, a memory and the like are mounted. Then, when the upper operation frame body 41 including the front surface plate 45A, the capacitive touch panel 48, and the press detection unit 50 is engaged with the lower housing 42 so as to be fitted to each other, the mobile phone 300 with the input device as shown in FIG. 16 is completed.

In this manner, according to the mobile phone 300 as the third embodiment, the capacitive touch panel 48 is provided on the downward side of the front surface plate 45A and at the same time, the embodiment of the press detection unit 50 is provided, so that when information is inputted in response to the press operation by the operator's finger 30a into the input detection surface on the display screen, it is possible to detect information of the pressed position on the touch panel 48 surely. Further, it is possible to reliably detect the press forces F (press-down force) of the position at which the elastic electric conductor 53 is electrically connected with the electrode pattern 51 and the electrode pattern 52 in response to the press operation.

Also, the input device 901 has the display unit 29 of the air-tight structure which is completely shut off from the outside, so that it is possible to assemble the mobile phone 300 excellent in the waterproof property and the dustproof property. The upper operation frame body 41 has a structure for supporting the front surface plate 45A such as a transparent touch-sensitive input sheet, so that the assembly easiness of the mobile phone 300 is improved. Thus, it is possible to provide the mobile phone 300 with a touch-sensitive input function having the frame shaped press detection unit 50 with a thin-shaped and simple structure while it has an air-tight structure in which the invasion of the dust, water or the like is preventable.

Embodiment 4

Figure 18:
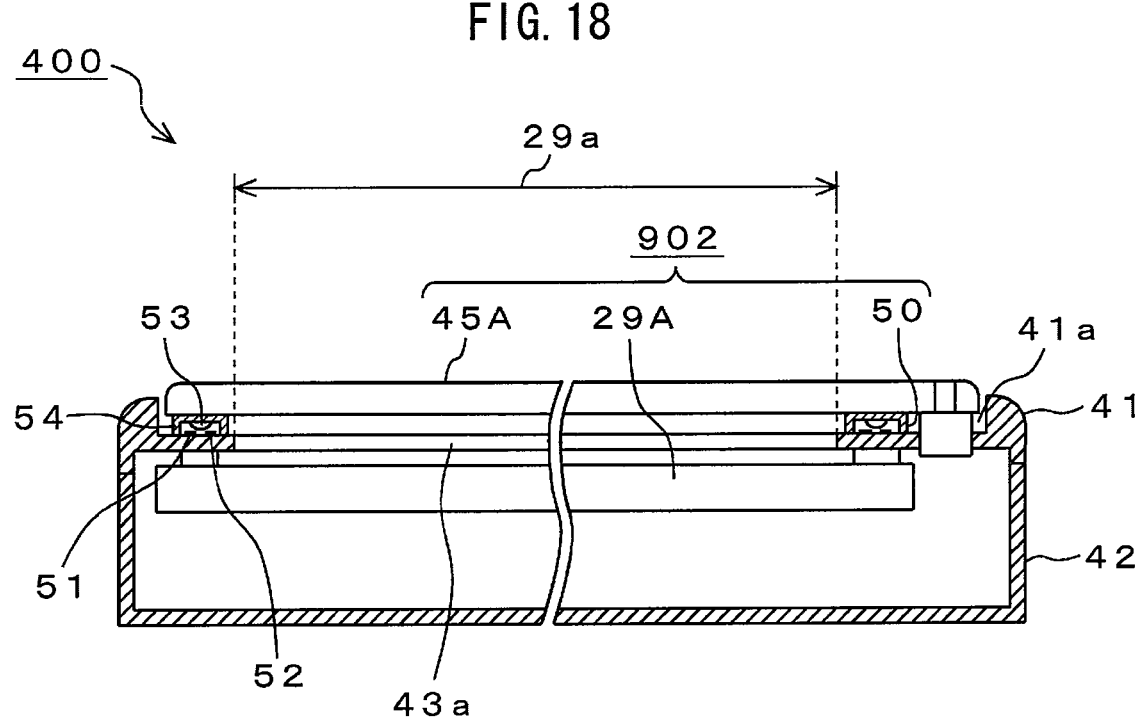
FIG. 18 is a cross-sectional view of a mobile phone 400 as a fourth embodiment for showing a configuration thereof.

FIG. 18 shows a configuration of a mobile phone 400 including an input device 902 as a fourth embodiment. In this embodiment, as the display unit 29A, a liquid crystal display device equipped with a touch panel is used.

The mobile phone 400 shown in FIG. 18, similarly as the second and third embodiments, is mounted so that the upper operation frame body 41 forming a lid can be fitted into the lower housing 42 forming a box body with a bottom plate. In this embodiment, a press detection unit 50 having flexibility and/or elasticity as explained in the first embodiment is also arranged on the step-shaped surface of the concave portion 41a of the upper operation frame body 41.

At the upper portion of the press detection unit 50, the front surface plate 45A is provided. The front surface plate 45A is an upper portion of a display unit 29A and is provided on the frame shaped press detection unit 50. As the front surface plate 45A, the touch-sensitive input sheet for icon touch, which is described in Japanese Patent Application No. 2007-308089, may be used as explained in the third embodiment. Instead of the touch-sensitive input sheet, an acrylic system transparent resin film may be used. The front surface plate 45A is adhered to the frame shaped region of the press detection unit 50 through an adhesive agent.

On the downward (rear surface side) of the front surface plate 45A, the display unit 29A is mounted. As the display unit 29A, the liquid crystal display device equipped with the touch panel is used. The display unit 29A has a touch panel portion 29b in the upper layer region of the liquid crystal display device and it is constituted such that a contact position of an operation body is detected in the input detection surface of the touch panel portion 29b. For the display unit 29A, a color liquid crystal display device having the thickness of around 1.5 mm to 2.0 mm is used. It should be noted that components in the fourth embodiment having the same name and the same numeral as those of the second and third embodiments have the same function and the same material as those of the second and third embodiments, so that the explanation thereof will be omitted.

Figure 19:
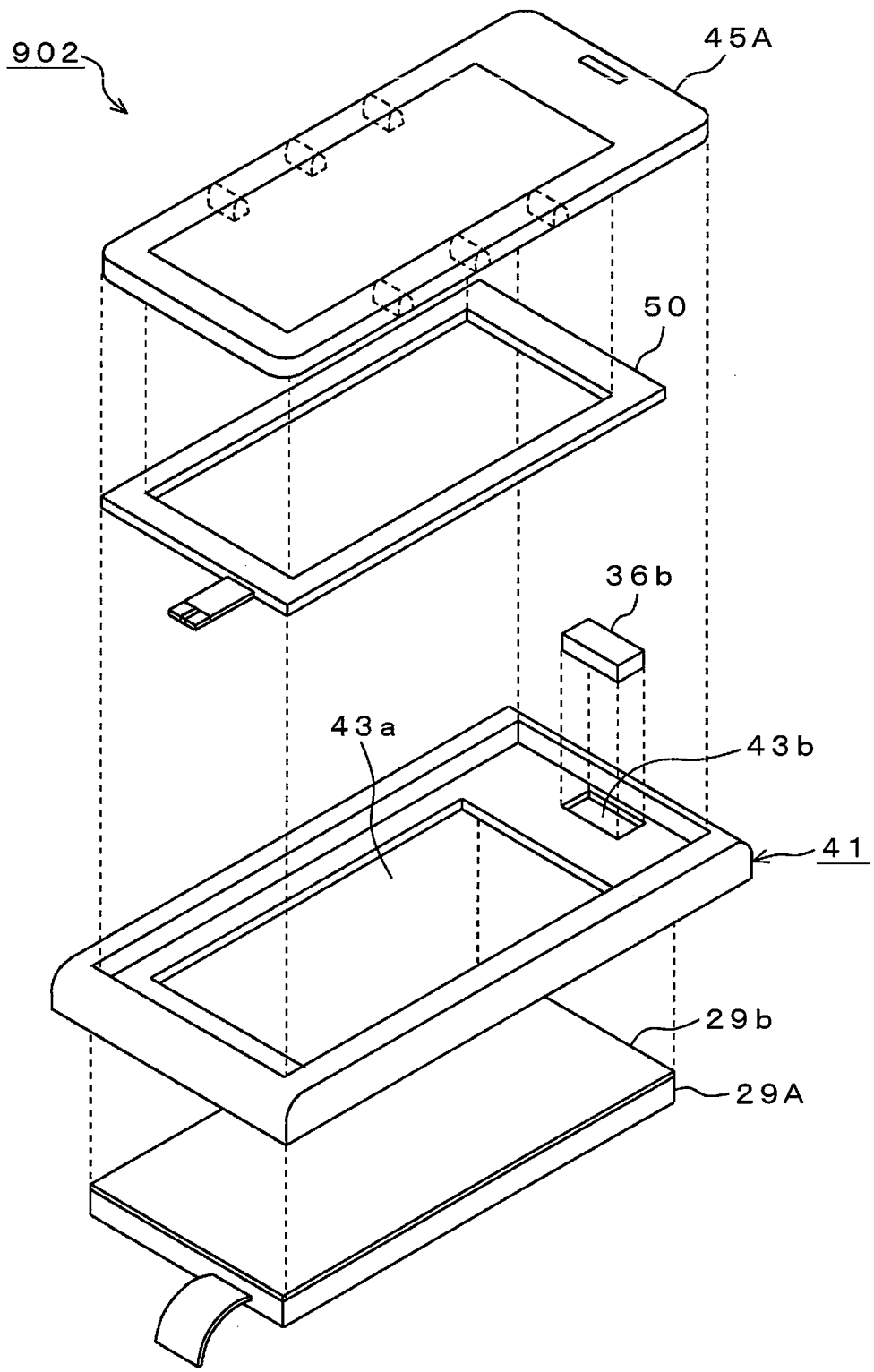
FIG. 19 is an exploded perspective view of an input device 902 for showing an assembled example thereof.

FIG. 19 shows an assembled example of the input device 902. According to the input device 902 shown in FIG. 19, the touch panel built-in type display unit 29A, the speaker 36b with actuator function, the upper operation frame body 41, the front surface plate 45A and the press detection unit 50 are prepared. As the upper operation frame body 41, an injection die molded one explained in the second or third embodiment is used.

First, as explained in the second and third embodiments, the press detection unit 50 is mounted on the upper operation frame body 41. For the press detection unit 50, the press detection sensor 100 or 100A or the like explained in the first embodiment is used. Then, the front surface plate 45A is mounted on the press detection unit 50. F of example, an adhesive agent is coated on the frame shaped region of the press detection unit 50 and thereafter, the front surface plate 45A is position-aligned with respect to the concave portion 41a and the front surface plate 45A is adhered to the press detection unit 50 in a manner so as to be fallen into the concave portion 41a thereof. As the front surface plate 45A, a touch-sensitive input sheet for icon touch, which is described in Japanese Patent Application No. 2007-308089, may be used. The touch-sensitive input sheet may include protrusion blocks each having cylindrical shape or conical shape for presenting a concavity and convexity feeling, which are distributed so as to be provided standing in the vertical direction with respect to a sheet surface of the base sheet forming the base material.

Next, the front surface plate 45A is installed with the speaker 36b with actuator function. The speaker 36b, similarly as the second and third embodiments, is arranged at a predetermined position of the front surface plate 45A through the opening portion 43b of the upper operation frame body 41 and is fixed to the upper operation frame body 41 through an adhesive agent. Further, the touch panel built-in type display unit 29A is attached to the rear side of the upper operation frame body 4. For example, an adhesive agent is coated the rear surface side of the upper operation frame body 41 along a periphery portion of the opening portion 43a. Thereafter, the display area 29a of the display unit 29A is position-aligned relating to the opening portion 43a and the display unit 29A is fixed to the upper operation frame body 41 with the display unit 29A being hung down on the rear surface side of the upper operation frame body 41 at the periphery portion of the opening portion 43a thereof by adhesion and/or by screw fixation. For the display unit 29A, a color liquid crystal display device is used.

On the other hand, similarly as the second and third embodiments, a lower housing 42, which is not shown, is prepared. On the lower housing 42, a circuit board, a memory and the like are mounted. Then, when the upper operation frame body 41 including the touch panel built-in type display unit 29A, the front surface plate 45A and the press detection unit 50 is engaged with the lower housing 42 so as to be fitted to each other, the mobile phone 400 with the input device as shown in FIG. 18 is completed.

In this manner, according to the mobile phone 400 as the fourth embodiment, the touch panel built-in type display unit 29A is provided on the downward side of the front surface plate 45A and at the same time, the embodiment of the press detection unit 50 is provided, so that when information is inputted in response to the press operation by the operator's finger 30a into the input detection surface on the display screen, it is possible to detect information of the pressed position by the touch panel portion 29b of the display unit 29A. Further, it is possible to reliably detect the press forces F (press-down force) of the position at which the elastic electric conductor 53 is electrically connected with the electrode pattern 51 and the electrode pattern 52 in response to the press operation.

Also, the input device 902 has the display unit 29A of the air-tight structure which is completely shut off from the outside, so that it is possible to assemble the mobile phone 400 excellent in the waterproof property and the dustproof property. The upper operation frame body 41 has a structure for supporting the front surface plate 45A of a transparent touch-sensitive input sheet or the like, so that the assembly easiness of the mobile phone 400 is improved. Thus, it is possible to provide the mobile phone 400 with a touch-sensitive input function having the frame shaped press detection unit 50 with a thin-shaped and simple structure while it has an air-tight structure in which the invasion of the dust, water or the like is preventable.

Embodiment 5

Figure 20:
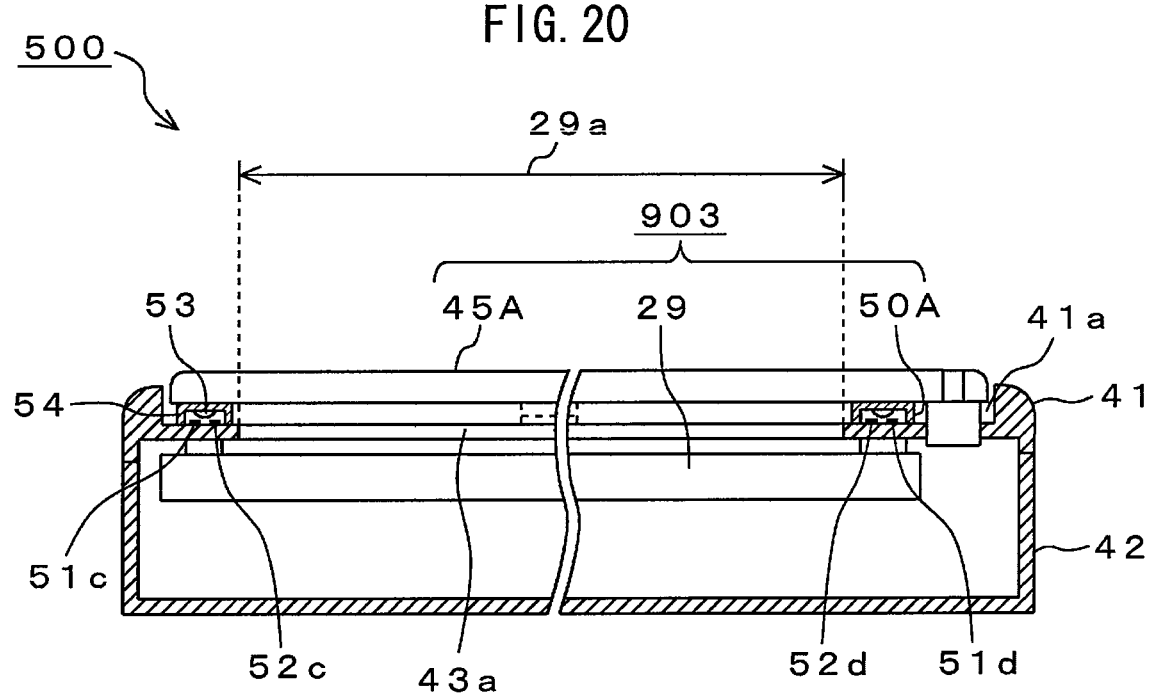
FIG. 20 is a cross-sectional view of a mobile phone 500 as a fifth embodiment for showing a configuration thereof.

FIG. 20 shows a configuration of a mobile phone 500 including an input device 903 as a fifth embodiment. In this embodiment, the input device 903 includes a press detection unit 50A provided with a programmable electrode pattern structure and changes position information detection and press detection function. In this embodiment, it is possible to judge the press force F individually with respect to the input operations of a plurality of points by linking a connection program of electrode patterns of the press detection unit 50A with applications.

The mobile phone 500 shown in FIG. 20, similarly as the second and third embodiments, is mounted so that the upper operation frame body 41 forming a lid can be fitted into the lower housing 42 forming a box body with a bottom plate. In this embodiment, a press detection unit 50A having a structure that is different from those of the first to fourth embodiments is arranged on the step-shaped surface of the concave portion 41a of the upper operation frame body 41. The press detection unit 50A has flexibility and/or elasticity similarly as the press detection units 50 of the first to fourth embodiments.

At the upper portion of the press detection unit 50A, the front surface plate 45A is provided. The front surface plate 45A is an upper portion of a display unit 29 and is provided on the frame shaped press detection unit 50A. As the front surface plate 45A, the touch-sensitive input sheet for icon touch, which is described in Japanese Patent Application No. 2007-308089, may be used as explained in the third embodiment. Instead of the touch-sensitive input sheet, an acrylic system transparent resin film may be used. The front surface plate 45A is adhered to the frame shaped region of the press detection unit 50A through an adhesive agent. On the downward (rear surface side) of the front surface plate 45A, the display unit 29 is mounted. As the display unit 29, a liquid crystal display device is used. For the display unit 29, a color liquid crystal display device having the thickness of around 1.1 mm to 1.7 mm is used.

The above-mentioned press detection unit 50A includes a programmable electrode pattern structure and has a position information detection function and a press detection function. The press detection unit 50A includes the input operation surface and detects a contact position of an operation body in the input operation surface. It should be noted that the configuration explained in the second embodiment can be applied to a constitution example of an appearance shape and a control system of the mobile phone 500 as it is, so that the explanation thereof will be omitted.

Figure 21:
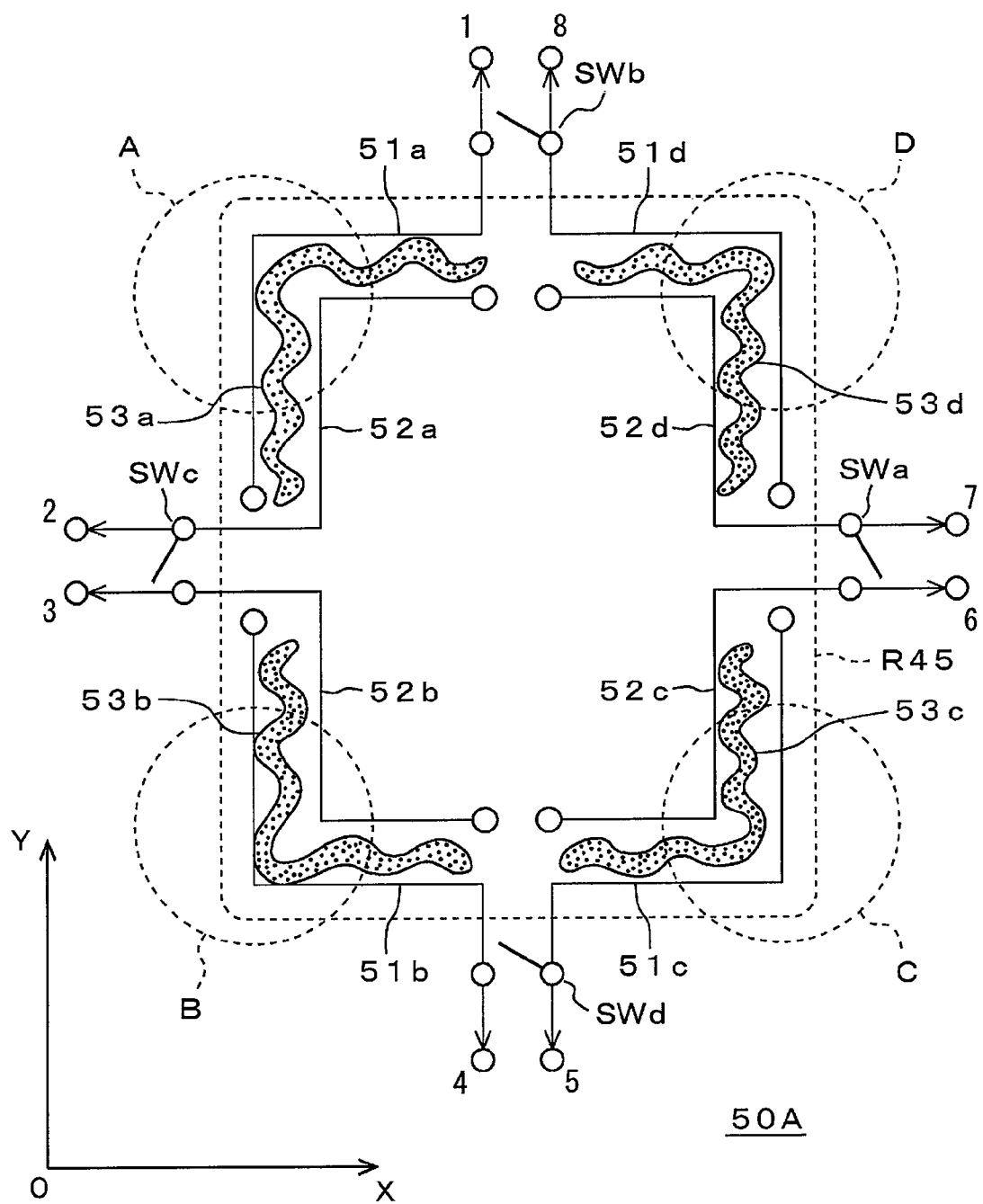
FIG. 21 is a plan view of a press detection unit 50A for showing a configuration of electrode patterns therein and a function example (Part one) thereof.
Figure 22:
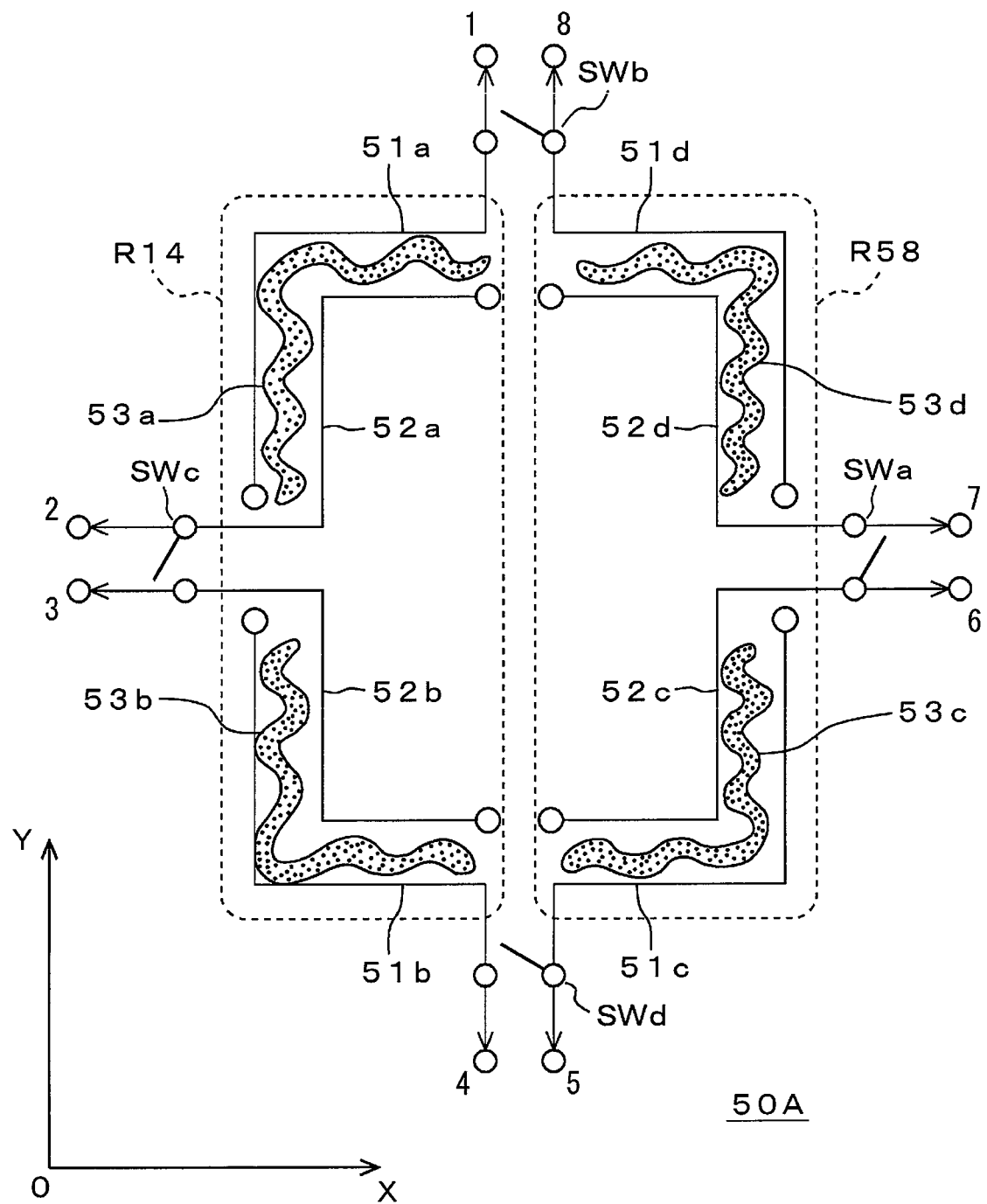
FIG. 22 is a plan view of a press detection unit 50A for showing a configuration of electrode patterns therein and a function example (Part two) thereof.
Figure 23:
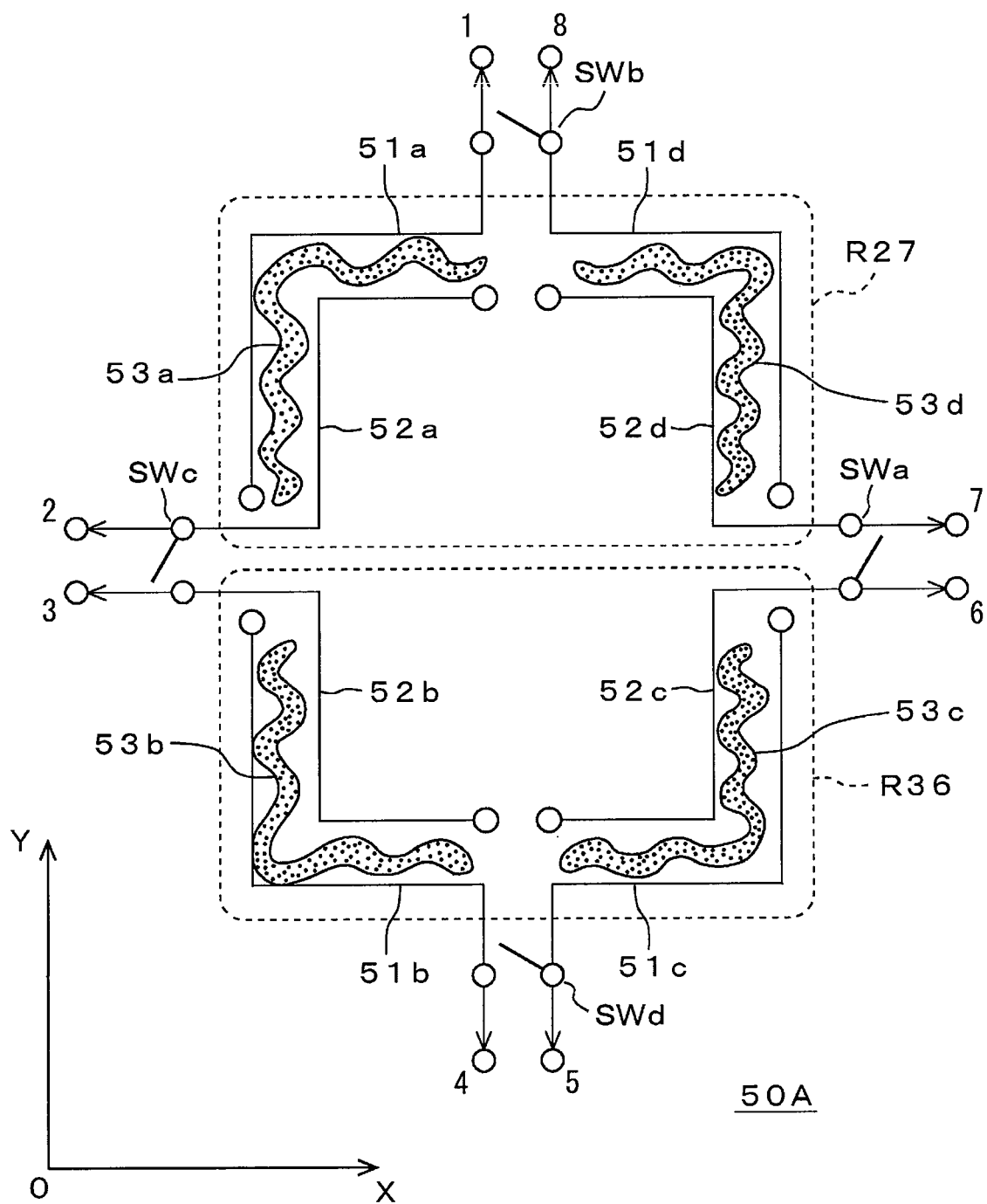
FIG. 23 is a plan view of a press detection unit 50A for showing a configuration of electrode patterns therein and a function example (Part three) thereof.

The following will describe a configuration and the function example of the press detection unit 50A with reference to FIG. 21 to FIG. 23.

FIG. 21 to FIG. 23 show the configuration and the function example (part one to three) of the electrode patterns in the press detection unit 50A.

According to the configuration of the press detection unit 50A shown in FIG. 21, in L-shaped regions A, B, C, D each for equally dividing one side of the four sides of a frame shaped substrate, which is not shown, there are arranged electrode patterns 51a, 51b, 51c, 51d constituting one example of a first conductor, electrode patterns 52a, 52b, 52c, 52d constituting one example of a second conductor and elastic electric conductors 53a, 53b, 53c and 53d. For example, in the region A, there are arranged the electrode patterns 51a, 52a and the elastic electric conductor 53a. In the region B, there are arranged the electrode patterns 51b, 52b and the elastic electric conductor 53b. In the region C, there are arranged the electrode patterns 51c, 52c and the elastic electric conductor 53c. In the region D, there are arranged the electrode patterns 51d, 52d and the elastic electric conductor 53d.

One end of the electrode pattern 51a is opened and the other end thereof is connected to a terminal 1. One end of the electrode pattern 51b is opened and the other end thereof is connected to a terminal 4. One end of the electrode pattern 51c is opened and the other end thereof is connected to a terminal 5. One end of the electrode pattern 51d is opened and the other end thereof is connected to a terminal 8. Also, one end of the electrode pattern 52a is opened and the other end thereof is connected to a terminal 2. One end of the electrode pattern 52b is opened and the other end thereof is connected to a terminal 3. One end of the electrode pattern 52c is opened and the other end thereof is connected to a terminal 6. One end of the electrode pattern 52d is opened and the other end thereof is connected to a terminal 7.

In this embodiment, a switch SWa is positioned between two neighboring electrode patterns 52c and 52d, namely, it stays between the terminals 6 and 7, a switch SWb is positioned between two neighboring electrode patterns 51a and 51d, namely, it stays between the terminals 1 and 8, a switch SWc is positioned between two neighboring electrode patterns 52a and 52b, namely, it stays between the terminals 2 and 3, and a switch SWd is positioned between two neighboring electrode patterns 51b and 51c, namely, it stays between the terminals 4 and 5. In this embodiment, it is constituted such that the press detection function varies by controlling these switches SWa to SWd to switch ON or OFF based on a sampling frequency.

Here, an XY coordinates system is set in an arrangement plain of the electrode patterns 51a, 51b, 51c, 51d and the electrode pattern 52a, 52b, 52c, 52d which are shown in FIG. 21. When the pushdown (press) direction of the press detection unit 50A is defined in the Z-direction perpendicular to the XY coordinates, in case of reading the press force F in the Z-direction, the switch Swa between the terminals 6 and 7 is turned on, the electrode patterns 52c and 52d are connected in series, the switch SWb between the terminals 1 and 8 is turned on and the electrode patterns 51a and 51d are connected in series, the switch SWc between the terminals 2 and 3 is turned on and the electrode pattern 52a and 52b are connected in series. The switch SWc between the terminals 4 and 5 is, however, turned off.

When executing the press operation, the elastic electric conductor 53a is connected to the electrode patterns 51a, 52a and becomes an ON-state, the elastic electric conductor 53b is connected to the electrode patterns 51b, 52b and becomes an ON-state, the elastic electric conductor 53c is connected to the electrode patterns 51c, 52c and becomes an ON-state or the elastic electric conductor 53d is connected to the electrode patterns 51d, 52d and becomes an ON-state. It is possible to detect the press force F of the Z-direction by measuring a resistance value R45 between the terminals 4 and 5 in any of these four ON-states.

The press force F in the Z-direction is obtained by reading out the resistance value R45 (4→3→2→1→8→7→6→5), but in this embodiment, the content of the resistance value detected by the press detection unit 50A comes to be changed by the ON-OFF control based on the sampling frequency of the switches SWa, SWb, SWc, SWd by the CPU 32 shown in FIG. 14 or by turning on or off those switches SWa, SWb, SWc, SWd depending on kinds of the application or situation.

Also, in case of reading the press force F in the X-direction by the press detection unit 50A shown in FIG. 22, the switch SWc between the terminals 2 and 3 is turned on, the electrode patterns 52a, 52b are connected in series, and the switch Swa between the terminals 7 and 6 is turned on and the electrode patterns 52c and 52d are connected in series. However, the switch SWb between the terminals 1 and 8 and the switch SWd between the terminals 4 and 5 are turned off. In this manner, when the electrode patterns 51a, 51b, 51c, 51d and the electrode patterns 52a, 52b, 52c, 52d are divided into two press detection regions, it is possible to detect position information in the X-direction.

When executing the press operation, the elastic electric conductor 53a is connected to the electrode patterns 51a, 52a and becomes an ON-state, the elastic electric conductor 53b is connected to the electrode patterns 51b, 52b and becomes an ON-state, the elastic electric conductor 53c is connected to the electrode patterns 51c, 52c and becomes an ON-state or the elastic electric conductor 53d is connected to the electrode patterns 51d, 52d and becomes an ON-state. It is possible to detect the press force F in the X-direction by measuring a resistance value R14 between the terminals 1 to 4 and a resistance value R58 between the terminals 5 to 8 in any of these four ON-states. In this manner, the press force F in the X-direction is obtained by reading-out the resistance value R14 (1→2→3→4) and also by reading-out the resistance value R58 (5→6→7→8).

In this embodiment, a left end point, which is defined on a product of the mobile phone 500 or the like on the X-axis in the XY coordinates system shown in FIG. 22, is made as a starting point, the coordinate thereof is set as "0", the coordinate of a right end point is set as an Xmax and also when a constant is set as $\alpha$, a position detection coordinate Xd is calculated by the following formula (1).

$$Xd = Xmax \times \alpha \times R14/(R14+R58) \qquad (1)$$

The formula (1) is calculated by the CPU 32 or the exclusive driver IC.

Also, in case of reading the press force F in the Y-direction by the press detection unit 50A shown in FIG. 23, the switch SWb between the terminals 1 and 8 is turned on and the electrode patterns 51a, 51d are connected in series, and the switch SWd between the terminals 4 and 5 is turned on and the electrode patterns 51b and 51c are connected in series. The switch SWc between the terminals 2 and 3 and the switch SWa between the terminals 6 and 7 are turned off. In this manner, when the electrode patterns 51a, 51b, 51c, 51d and the electrode patterns 52a, 52b, 52c, 52d are divided into two press detection regions, it is possible to detect position information in the Y-direction.

When executing the press operation, the elastic electric conductor 53a is connected to the electrode patterns 51a, 52a and becomes an ON-state, the elastic electric conductor 53b is connected to the electrode patterns 51b, 52b and becomes an ON-state, the elastic electric conductor 53c is connected to the electrode patterns 51c, 52c and becomes an ON-state or the elastic electric conductor 53d is connected to the electrode patterns 51d, 52d and becomes an ON-state. It is possible to detect the press force F in the Y-direction by measuring an electric conductive resistance R36 between the terminals 3 and 6 and an electric conductive resistance value R27 between the terminals 2 and 7 in any of these four ON-states. In this manner, the press force F in the Y-direction is obtained by reading-out the resistance value R36 (3→4→5→6) and also by reading-out the resistance value R27 (2→1→8→7).

In this embodiment, a lower end point, which is defined on a product of the mobile phone 500 or the like on the Y axis in the XY coordinates system shown in FIG. 22, is made as a starting point, the coordinate thereof is set as "0", the coordinate of an upper end point is set as a Ymax and also when a constant is set as $\beta$, a position detection coordinate Yd is given by the following formula (2).

$$Yd = Ymax \times \beta \times R36/(R36+R27) \qquad (2)$$

The formula (2) is calculated by the CPU 32 or the exclusive driver IC.

It should be noted that if two or more points of the press operation are detected (multi points press-down mode), two kinds of the press detection data can be obtained by reading two items of press detection data obtained from the press detection unit 50A individually with respect to the X and Y directions. It is needless to say that it is also allowed to obtain four or more kinds of the press detection data by further reading-out the press detection data individually.

For example, when reading the press force F in the XY-directions by the press detection unit 50A, while all four of the switch Swa between the terminals 6 and 7, the switch SWb between the terminals 1 and 8, the switch SWc between the terminals 2 and 3 and the switch SWd between terminals 4 and 5 are turned off, there is detected the ON-state of each pair of the electrode patterns 51a, 52a, the electrode patterns 51b, 52*b*, the electrode patterns 51*c*, 52*c* and the electrode patterns 51*d*, 52*d*. In this manner, when the electrode patterns 51*a*, 51*b*, 51*c*, 51*d* and the electrode patterns 52*a*, 52*b*, 52*c*, 52*d* are divided into four press detection regions, it is possible to detect position information in the X and Y directions.

When executing the press operation, the elastic electric conductor 53*a* is connected to the electrode patterns 51*a*, 52*a* and becomes an ON-state, the elastic electric conductor 53*b* is connected to the electrode patterns 51*b*, 52*b* becomes an ON-state, the elastic electric conductor 53*c* is connected to the electrode patterns 51*c*, 52*c* becomes an ON-state or the elastic electric conductor 53*d* is connected to the electrode patterns 51*d*, 52*d* and becomes an ON-state. It is possible to detect the press force F in the X and Y directions by measuring a resistance value R12 between the terminals 1 and 2, a resistance value R34 between the terminals 3 and 4, a resistance value R56 between the terminals 5 and 6 and a resistance value R78 between the terminals 7 and 8 respectively in these four ON-states. It should be noted that ones of the fifth embodiment having the same name and the same numeral as the ones of the second to fourth embodiments have the same function and the same material as those of the second to fourth embodiments, so that the explanation thereof will be omitted.

Figure 24:
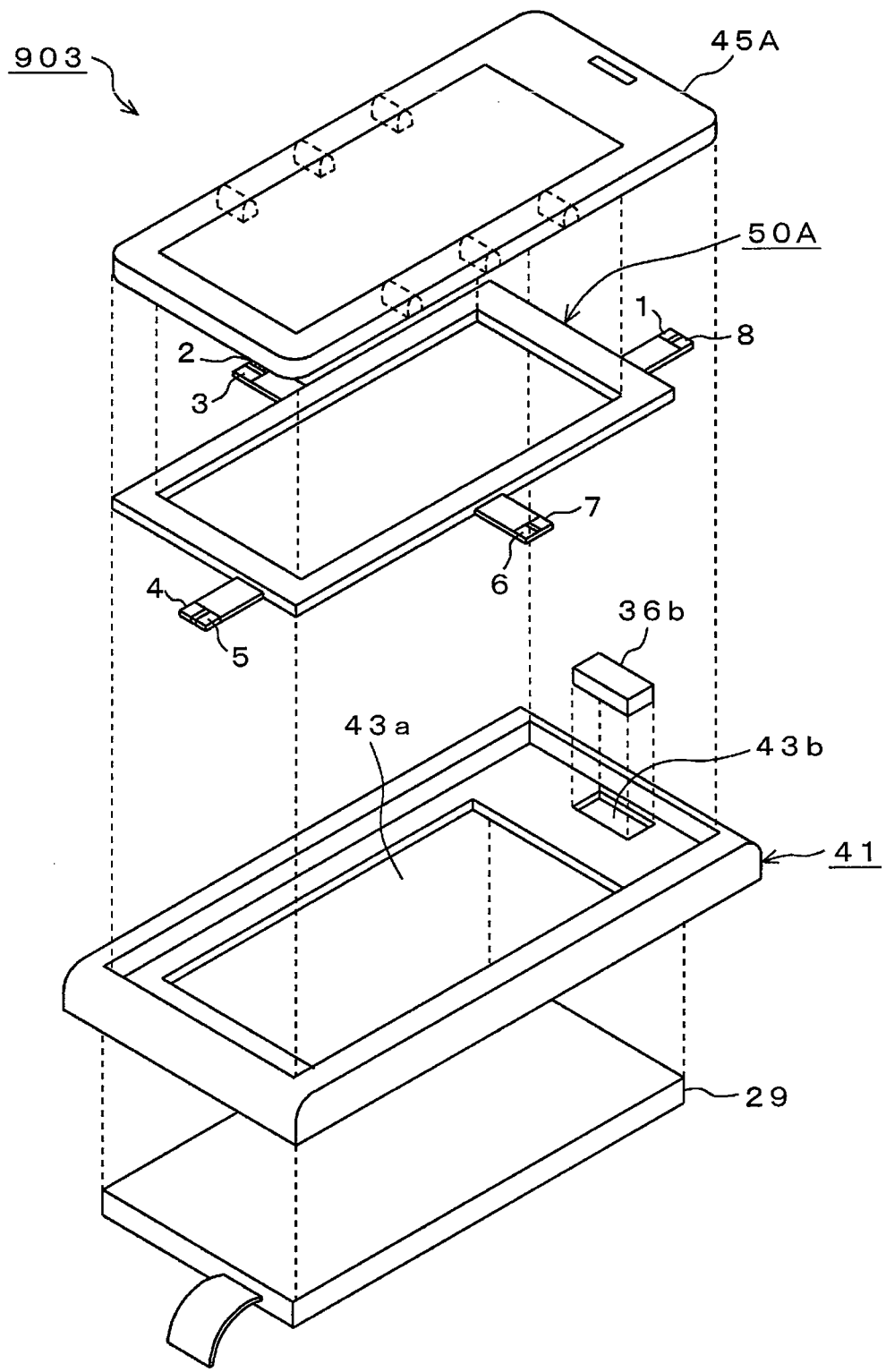
FIG. 24 is an exploded perspective view of an input device 903 for showing an assembled example thereof.

The following will describe an assembled example of an input device 903. FIG. 24 shows an assembled example of the input device 903. According to the input device 903 shown in FIG. 24, there are prepared the display unit 29, the speaker 36*b* with actuator function, the upper operation frame body 41, the front surface plate 45A and the press detection unit 50A. As the upper operation frame body 41, the injection-die-molded ones as explained in the second to fourth embodiments is used.

First, as explained in the second to fourth embodiments, the press detection unit 50A is mounted on the upper operation frame body 41. As the press detection unit 50A, a unit having the electrode pattern structure explained in the FIG. 21 to FIG. 23 is used. Then, on the press detection unit 50A, the front surface plate 45A is mounted. For example, an adhesive agent is coated on the frame shaped region of the press detection unit 50A and thereafter, the front surface plate 45A is position-aligned with respect to the concave portion 41*a* and the front surface plate 45A is adhered to the press detection unit 50A in a manner so as to be fallen into the concave portion 41*a* thereof. As the front surface plate 45A, the touch-sensitive input sheet for icon touch, which is described in Japanese Patent Application No. 2007-308089, may be used. The touch-sensitive input sheet may include protrusion blocks each having cylindrical shape or conical shape for presenting a concavity and convexity feeling, which are distributed so as to be provided standing in the vertical direction with respect to a sheet surface of the base sheet forming the base material.

Next, the front surface plate 45A is installed with the speaker 36*b* with actuator function. The speaker 36*b*, similarly as the second to fourth embodiments, is arranged at a predetermined position of the front surface plate 45A through the opening portion 43*b* of the upper operation frame body 41 and is fixed thereto through an adhesive agent. Further, the display unit 29 is mounted on the rear side of the upper operation frame body 41. For example, an adhesive agent is coated on the rear surface side of the upper operation frame body 41 along a periphery portion of the opening portion 43*a*. Thereafter, the display area 29*a* of the display unit 29 is position-aligned relative to the opening portion 43*a* and the display unit 29 is fixed to the upper operation frame body 41 with the display unit 29 being hung down on the rear surface side of the upper operation frame body 41 at the periphery portion of the opening portion 43*a* thereof by adhesion and/or by screw fixation. As the display unit 29, a color liquid crystal display device is used.

On the other hand, similarly as the second to fourth embodiments, the lower housing 42, which is not shown, is prepared. On the lower housing 42, a circuit board, a memory and the like are mounted. Then, when the upper operation frame body 41 including the touch panel built-in type display unit 29, the front surface plate 45A and the press detection unit 50A is engaged with the lower housing 42 so as to be fitted to each other, the mobile phone 500 with the input device as shown in FIG. 19 is completed.

Figures 25, 26:
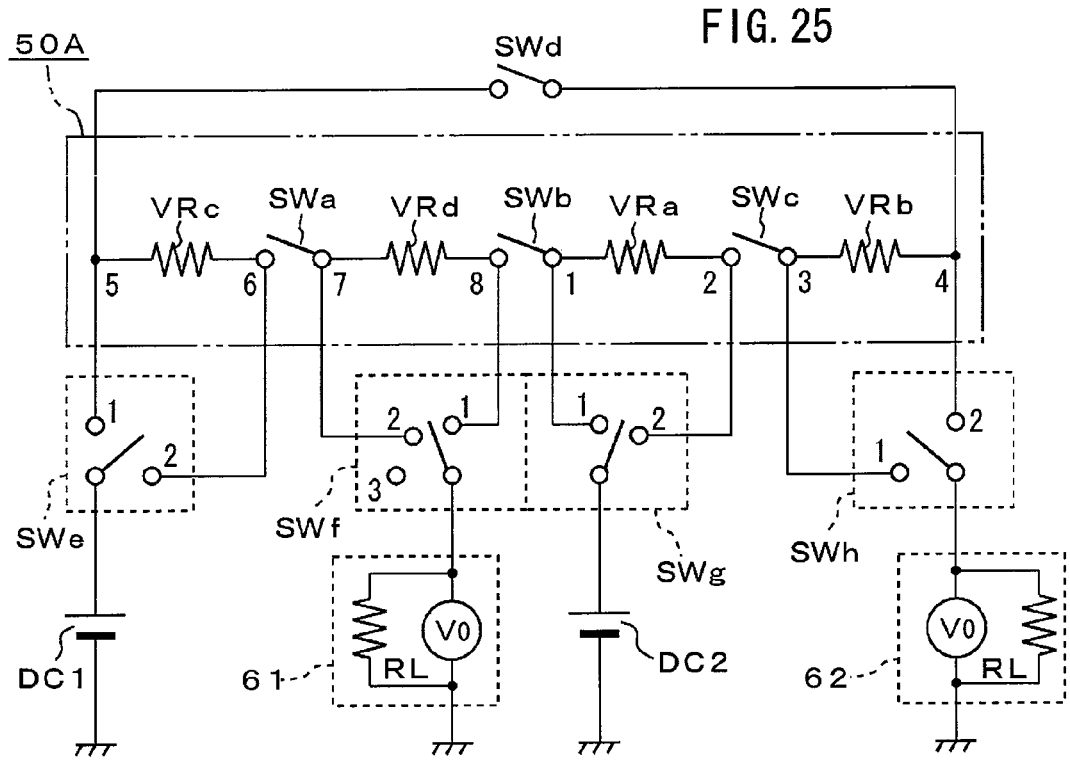
FIG. 25 is a circuit diagram showing an equivalent circuit example of the press detection unit 50A and a detection example of an output voltage Vo thereof.
FIG. 26 is a graph showing a characteristic example of a resistance value Rv in the press detection unit 50A at a time of shipment and at a time of calibration.

The following will describe an example for detecting a change in the resistance as an output voltage Vo when executing a press operation in the press detection unit 50A. FIG. 25 shows an example of an equivalent circuit example of the press detection unit 50A and a detection example of the output voltage Vo thereof.

The equivalent circuit example of the press detection unit 50A shown in FIG. 25 includes four variable resistors VRa, VRb, VRc, VRd and four switches SWa, SWb, SWc, SWd for turning on/off. These are connected to the terminals 4 and 5 in series in order of the variable resistor VRc, the switch SWa, the variable resistor VRd, the switch SWb, the variable resistor VRa, the switch SWc and the variable resistor VRb, and the switch SWd and a switch SWd is connected to the terminals 4 and 5.

The variable resistor VRa is constituted by the electrode patterns 51*a*, 52*a* and the elastic electric conductor 53*a* in between the terminals 1 and 2, the variable resistor VRb is constituted by the electrode patterns 51*b*, 52*b* and the elastic electric conductor 53*b* in between the terminals 3 and 4, the variable resistor VRc is constituted by the electrode patterns 51*c*, 52*c* and the elastic electric conductor 53*c* in between the terminals 5 and 6 and the variable resistor VRd is constituted by the electrode patterns 51*d*, 52*d* and the elastic electric conductor 53*d* in between the terminals 7 and 8.

Also, according to the voltage detection example of the press detection unit 50A, it is constituted by including the four switches SWe to SWh for changeovers, two direct current power supplies DC1 and DC2 and two voltage detection circuits 61, 62. The terminals 5 and 6 are connected with, for example, the switch SWe for changeover. For the switch SWe, there is used a two-circuits-one-selection switch. A mid point of the switch SWe is connected to the direct current power supply DC1. The contact point 1 thereof is connected to the terminal 5 and a contact point 2 is connected to the terminal 6, respectively.

To the terminals 7 and 8, the switch SWf for changeover is connected. For the switch SWf, a three-circuits-one-selection switch is used. A mid point of the switch SWf is connected to the first voltage detection circuit 61. The contact point 1 thereof is connected to the terminal 8 and a contact point 2 is connected to the terminal 7, respectively. The contact point 3 thereof is a vacancy, that is, a non-connection OFF.

To the terminals 1 and 2, the switch SWg for changeover is connected. For the switch SWg, a two-circuits-one-selection switch is used. A mid point of the switch SWg is connected to the direct current power supply DC2. The contact point 1 thereof is connected to the terminal 1 and a contact point 2 is connected to the terminal 2, respectively.

To the terminals 3 and 4, the switch SWh for changeover is connected. For the switch SWh, a two-circuits-one-selection switch is used. A mid point of the switch SWh is connected to the second voltage detection circuit 62. The contact point 1 thereof is connected to the terminal 3 and a contact point 2 is connected to the terminal 4, respectively. The above-mentioned voltage detection circuit 61 is constituted by a load resistance RL and a voltage detector Va, and the voltage detection circuit 62 is constituted by a load resistance RL and a voltage detector Vb. The respective voltage detectors Va, Vb measures a voltage drop generated in the load resistance RL.

The following will describe the voltage detection example when executing the press operation in the press detection unit 50A shown in FIG. 25 with reference to table 1.

TABLE 1

| Switch | When Reading Z | When Reading X | When Reading Y |
|---|---|---|---|
| SWa | ON | ON | OFF |
| SWb | ON | OFF | ON |
| SWc | ON | ON | OFF |
| SWd | OFF | OFF | ON |
| SWe | 1 | 1 | 2 |
| SWf | 3(OFF) | 2 | 1 |
| SWg | 3(OFF) | 1 | 2 |
| SWh | 2 | 2 | 1 |

According to the table 1, in case of reading the press force F in the Z-direction by the press detection unit 50A, the switches SWa, SWb, SWc are turned on and the switch SWd is turned off. The switch SWe selects the "1" side and connects the terminal 5 with the direct current power supply DC1. The switch SWf selects the "3" side and is turned off. The switch SWg selects the "3" side and is turned off. The switch SWh selects the "2" side and connects the terminal 4 with the voltage detection circuit 62. Thus, it is possible to read-out the resistance value R45 (4→3→2→1→8→7→6→5) and it is possible to judge a change in the resistance value R45 from the output voltage Vo of the voltage detection circuit 62.

Also, in case of reading the press force F in the X-direction by the press detection unit 50A, the switches SWa, SWc are turned on and the switch SWb, SWd are turned off. The switch SWe selects the "1" side and connects the terminal 5 with the direct current power supply DC1. The switch SWf selects the "2" side and connects the terminal 8 with the voltage detection circuit 61. The switch SWg selects the "1" side and connects the terminal 1 with the direct current power supply DC2. The switch SWh selects the "2" side and connects the terminal 4 with the voltage detection circuit 62.

Thus, it is possible to read-out the resistance value R14 (1→2→3→4) and the resistance value R58 (5→6→7→8). It is possible to judge the change of the resistance value R14 from the output voltage Vo of the voltage detection circuit 62 and it is possible to judge the change of the resistance value R58 from the output voltage Vo of the voltage detection circuit 61.

Further, in case of reading the press force F in the Y-direction by the press detection unit 50A, the switches SWa, SWc are turned off and the switch SWb, SWd are turned on. The switch SWe selects the "2" side and connects the terminal 6 with the direct current power supply DC1. The switch SWf selects the "1" side and connects the terminal 7 with the voltage detection circuit 61. The switch SWg selects the "2" side and connects the terminal 2 with the direct current power supply DC2. The switch SWh selects the "1" side and connects the terminal 3 with the voltage detection circuit 62. Thus, it is possible to read-out the resistance value R36 (3→4→5→6) and the resistance value R27 (2→1→8→7). It is possible to judge the change of the resistance value R36 from the output voltage Vo of the voltage detection circuit 62 and it is possible to judge the change of the resistance value R27 from the output voltage Vo of the voltage detection circuit 61.

FIG. 26 shows a characteristics example of a resistance value Rv at a time of calibration in the press detection unit 50A. In this embodiment, an OFF-mode is provided for updating a resistance value Rs1 for the judgment threshold level in the press detection unit 50A judgment threshold voltage Vth is also allowed).

A vertical axis shown in FIG. 26 is the resistance value Rv in the press detection unit 50A and is any of the values of the variable resistors VRa, VRb, VRc, VRd or the like which are constituted by the electrode patterns 51a, 51b, 51c, 51d, the electrode patterns 52a, 52b, 52c, 52d and the elastic electric conductors 53a, 53b, 53c and 53d. A horizontal axis shown in FIG. 26 is the press force F and is the external force added to any of the elastic electric conductors 53a, 53b, 53c and 53d when executing the press operation.

A solid line indicates a resistance value versus press characteristic curve Ia at a time of shipment. A broken line indicates a resistance value versus press characteristic curve IIb at a time of calibration. In this embodiment, the resistance value versus press characteristic curve IIb at a time of calibration is shifted to the downward side of the graph thereof as compared with the resistance value versus press characteristic curve Ia at the time of shipment. Such a shift of the resistance value versus press characteristic curve IIb at the time of calibration to the downward side in the graph is because the electrode patterns 51a, 52a and the elastic electric conductor 53a or the like could be plastic deformed when keeping the product in the long time in a state in which the load is added on the press detection unit 50A constantly, and in a state before operation, the resistance value Rv is lowered in the certain amount.

Consequently, the resistance value Rs1 for judgment threshold level is updated by executing the OFF-mode in the press detection unit 50A. In the OFF-mode, for example, at a time of factory shipment, when the resistance between the terminals at the no-load is made as Rv, the resistance value for judgment threshold level of the ON/OFF of the input function decided on the application side (side) is also made as Rs, the resistance value between the terminals at a time of execution of the OFF-mode is made as Rn and the resistance value for judgment threshold level after updating is made as Rs1, the value of Rs1 is calculated and updated by a following calculation formula (3).

$$Rs1 = Rs \times Rn/Rv \qquad (3)$$

However, it is constituted such that the resistance value Rn between the terminals is obtained by measuring the resistance value between the respective terminals 1 and 2, 3 and 4, 5 and 6, 7 and 8 at a time of execution of the OFF-mode.

In this manner, by updating the resistance value Rs for judgment threshold level to the resistance value Rs1 by the calibration, even if it is a case in which the resistance value Rn thereof is less than the resistance value Rs for judgment threshold level provided on the application side, the miss-operation does not occur. Thus, it is possible to prevent for unreasonable input, shifted input position or the like. It should be noted that the resistance value update process at a time of calibration is not executed in every time. Also, the update is not limited to the resistance value Rs for judgment threshold level, but the update can be subject to the judgment threshold voltage Vth1, Vth2 or the like.

Figure 27:
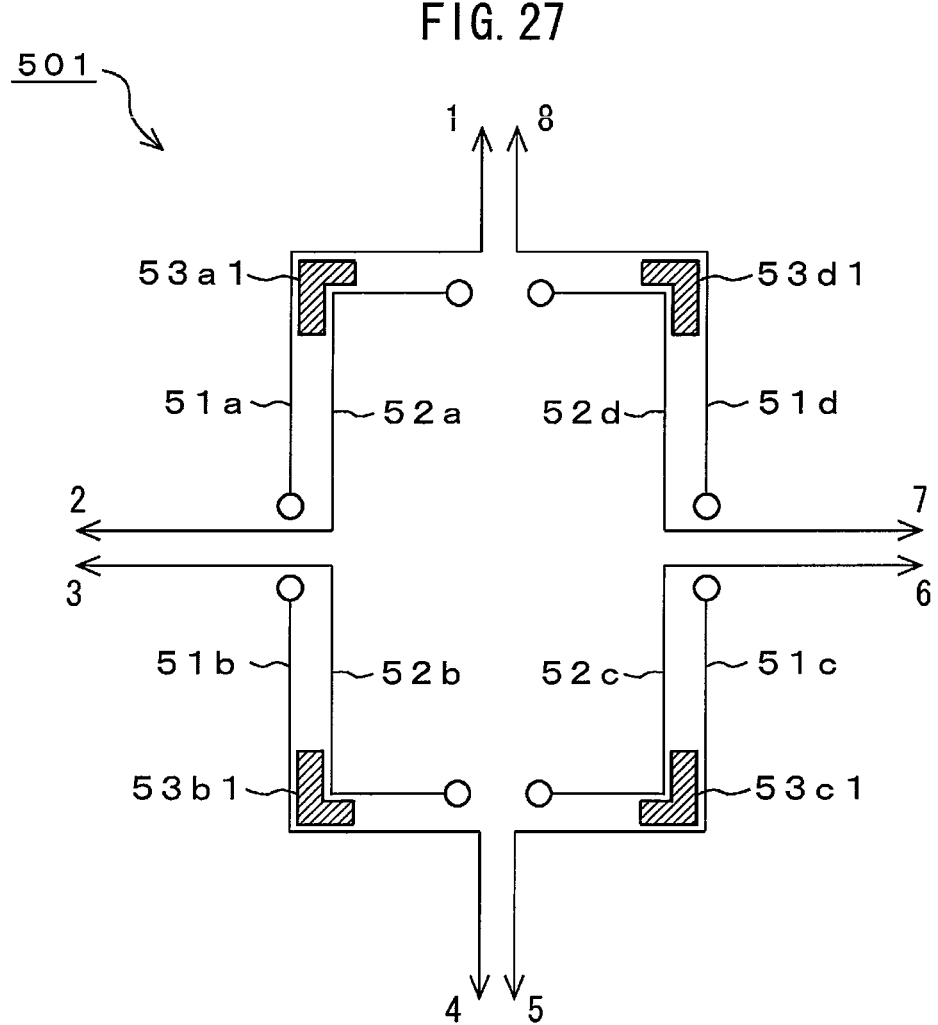
FIG. 27 is a plan view of the press detection unit 50A for showing an arrangement example of elastic electric conductors 553a to 553d therein.

FIG. 27 shows an arrangement example of the elastic electric conductor 53a1 to 53d1 in a press detection unit 501. In the following variations, the press detection unit 501 of every variation has a frame shape (picture frame shape) and the arrangement position thereof in the electronic apparatus does not change.

According to the arrangement example of the elastic electric conductors 53a1 to 53d1 shown in FIG. 27, wirings of the electrode patterns 51a, 52a, the electrode patterns 51b, 52b, the electrode patterns 51c, 52c and the electrode patterns 51d, 52d are eight pieces and the press detection regions are four or more and the elastic electric conductors 53a1, 53b1, 53c1, 53d1 are arranged only at the four corners. When the elastic electric conductors 53a1 to 53d1 are made by patterning in this manner, it is possible to omit the conductive rubber member as compared with the elastic electric conductors 53a to 53d shown in FIG. 21 and also, it is possible to improve press detection accuracy at a time of execution of the X and Y mode input function.

Figure 28:
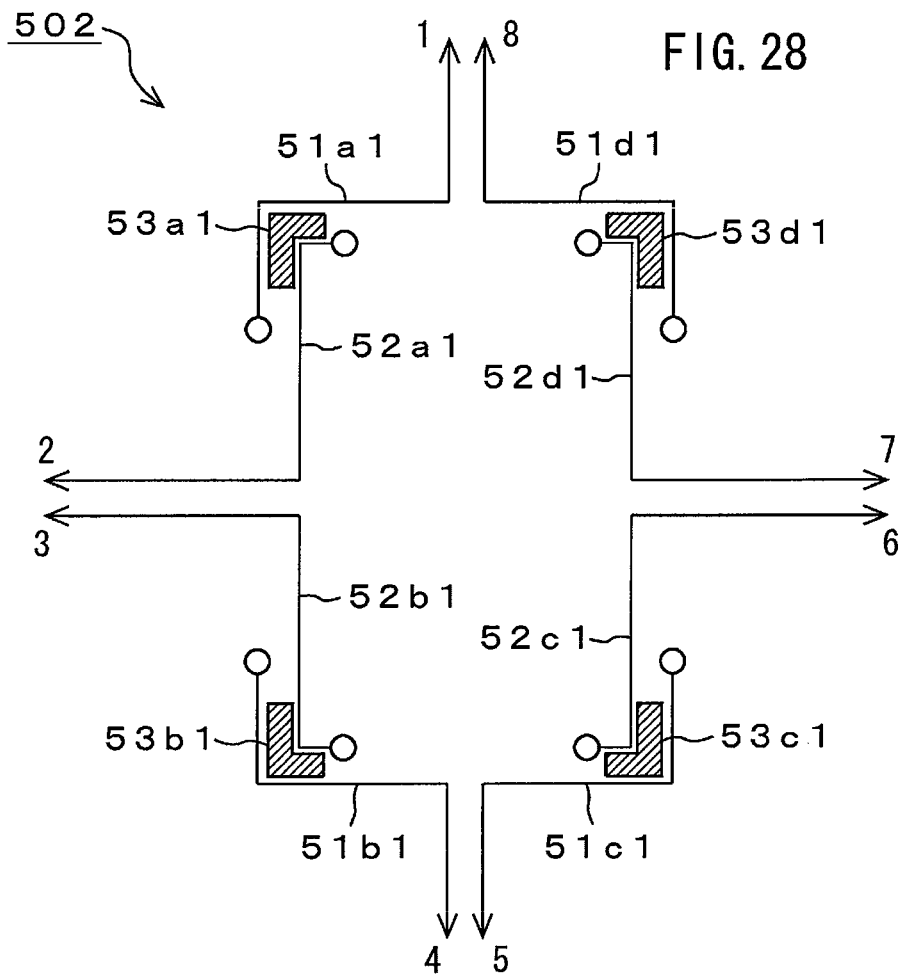
FIG. 28 is a plan view of the press detection unit 50A for showing an arrangement example of electrode patterns 551a to 551d and electrode patterns 552a to 552d therein.

FIG. 28 shows an arrangement example of the electrode patterns 51a1 to 51d1 and the electrode patterns 52a1 to 52d1 in a press detection unit 502. According to the arrangement example of the electrode patterns shown in FIG. 28, the electrode patterns 51a1, 51b1, 51c1, 51d1, the electrode patterns 52a1, 52b1, 52c1, 52d1 and the elastic electric conductors 53a1, 53b1, 53c1, 53d1 are arranged only in the periphery of each of the four corners.

When the electrode patterns 51a1 to 51d1, the electrode patterns 52a1 to 52d1 and the elastic electric conductors 53a1 to 53d1 are made by patterning in this manner, it is possible to omit the conductive rubber member as compared with the elastic electric conductors 53a to 53d shown in FIG. 21 and also, it is possible to improve press detection accuracy at a time of execution of the X-and-Y mode input function of the electrode patterns 51a1 to 51d1 and the electrode patterns 52a1 to 52d1.

The following will describe eight operation modes when executing the press operation in the mobile phone 500. In the following examples, there is cited a case in which the operation mode when executing the press operation and the application are made corresponding therebetween beforehand.

Figure 29:
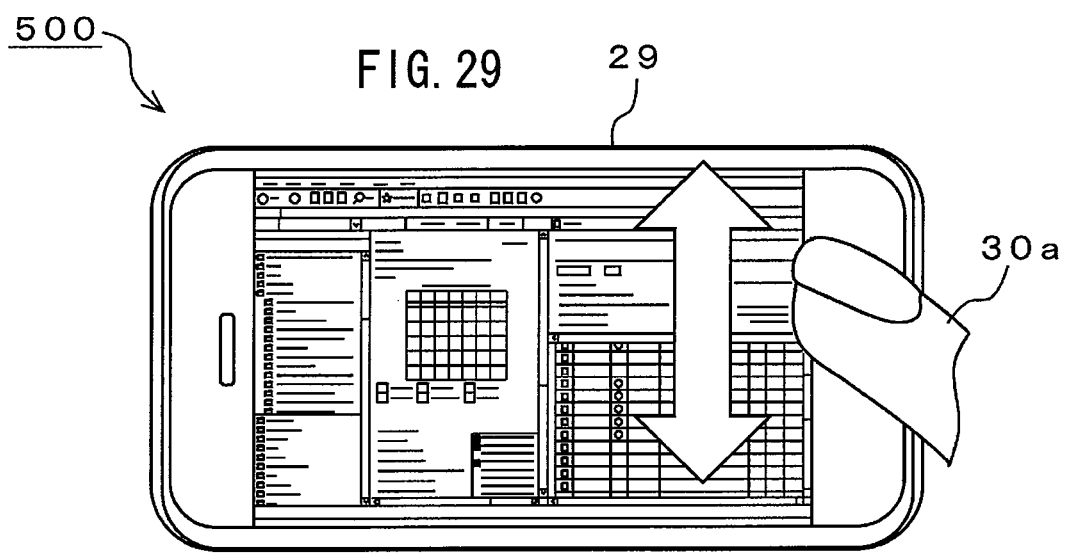
FIG. 29 is a plan view of the mobile phone 500 for showing an X-mode input function example thereof.

FIG. 29 shows an X-mode input function example in the mobile phone 500. According to the X-mode input function example shown in FIG. 29, the display unit 29 is displayed in the horizontally wide by placing the mobile phone 500 in the horizontally long or by holding it in the horizontally long (horizontally wide style). When executing a WEB circulation application in this horizontally wide style, the press detection unit 50A executes the sliding detection operation in the X-direction as a vertical scroll function. When the CPU 32 or the exclusive driver IC executes the X-mode, it is constituted such that the coordinate state in the X-direction is read-in in every sampling frequency. An operation example of the press detection unit 50A should be referred to FIG. 22 and FIG. 25 and the description concerning them.

Figure 30A:
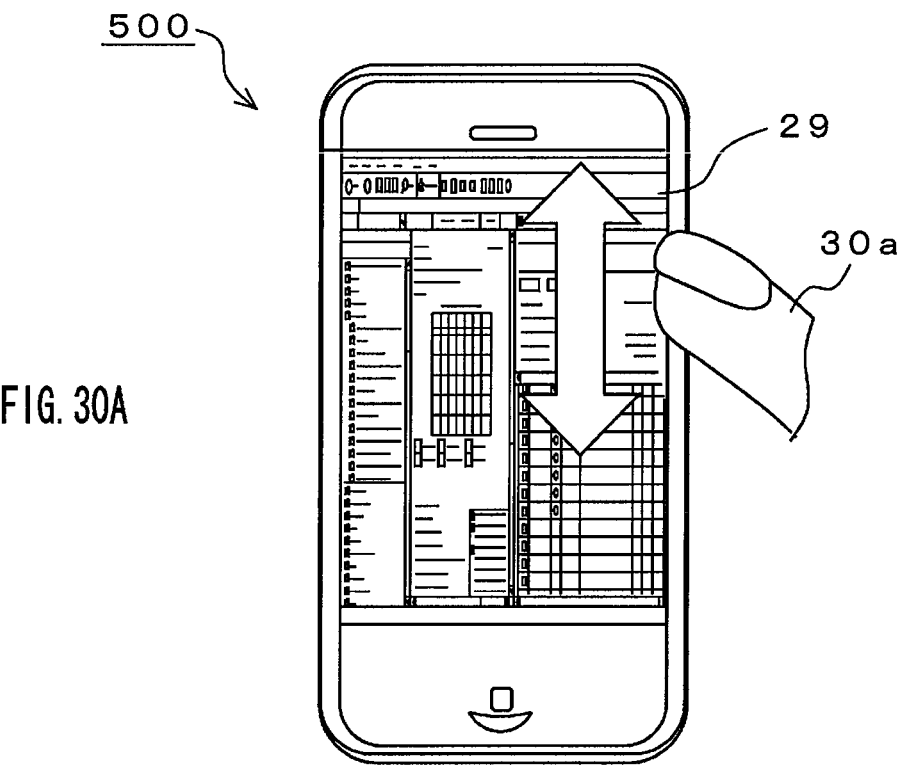
FIGS. 30A and 30B are plan views of the mobile phones 500 for showing Y-mode input function examples thereof.
Figure 30B:
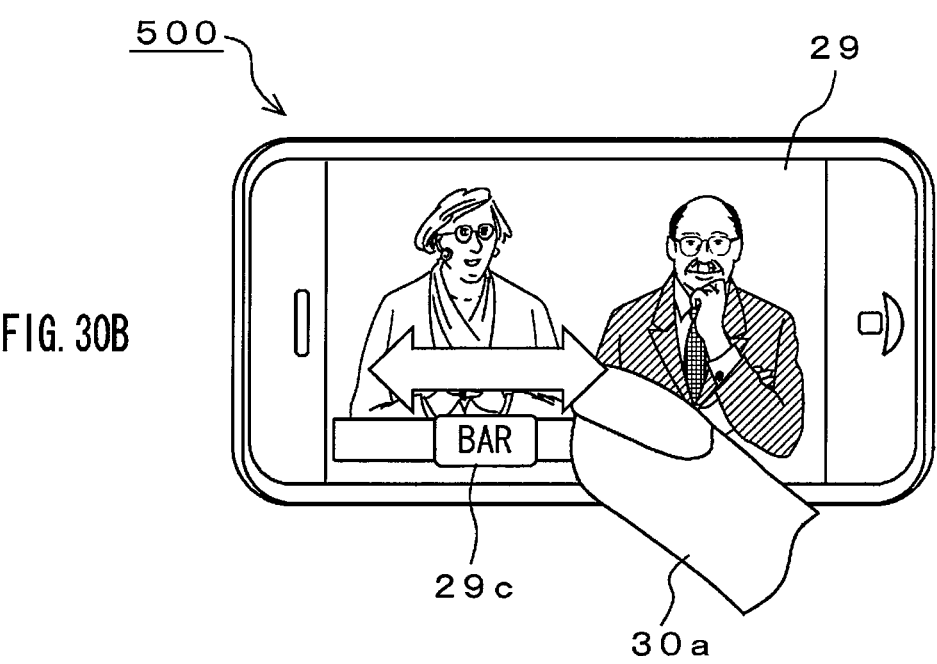

FIGS. 30A and 30B show Y-mode input function examples in the mobile phone 500. According to the Y-mode input function example shown in FIG. 30A, the display unit 29 is displayed in the vertically wide by placing the mobile phone 500 in the vertically long or by holding it in the vertically long (vertically wide style). When executing the WEB circulation application in the vertically wide style, the press detection unit 50A executes a vertical scroll function thereof.

Alternatively, as shown in FIG. 30B, the display unit 29 is displayed in the horizontally wide by placing the mobile phone 500 in the horizontally long or by holding it in the horizontally long. At a time of execution of an image reproduction application in this horizontally wide style, the press detection unit 50A executes the sliding detection operation in the Y-direction as a reproduction position operation function. On the display unit 29, for example, a bar 29c for audio volume adjustment is displayed and when the user slides this bar 29c from the left to the right, the sound volume is increased and reversely, when the user slides this bar 29c from the right to the left, the sound volume is decreased. In either case, when the CPU 32 or the exclusive driver IC executes the Y-mode, it is constituted such that the coordinate state in the Y-direction is read-in in every sampling frequency. An operation example of the press detection unit 50A should be referred to FIG. 23 and FIG. 25 and the description concerning them.

Figure 31:
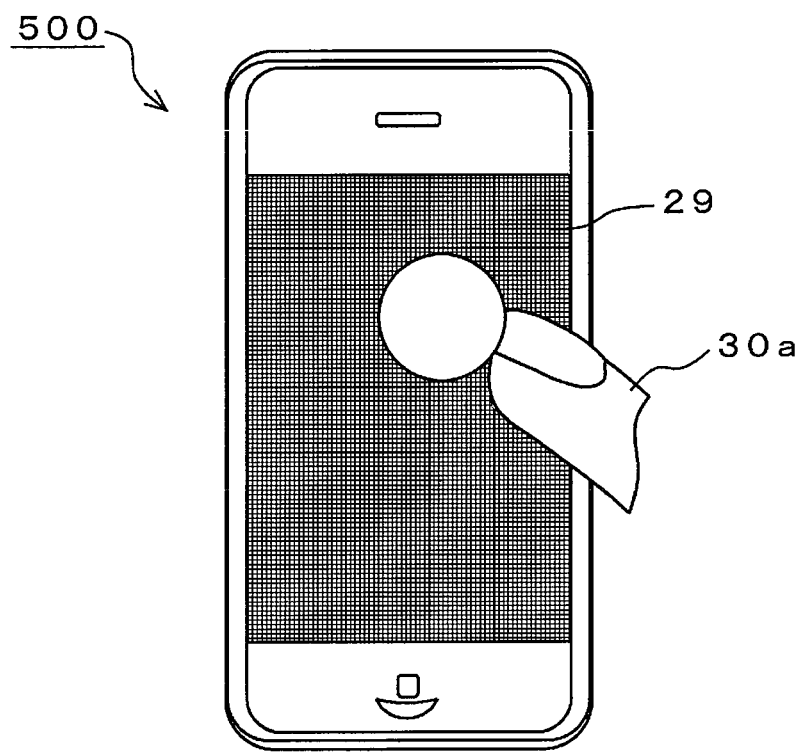
FIG. 31 is a plan view of the mobile phone 500 for showing a Z-mode input function example thereof.

FIG. 31 shows a Z-mode input function example in the mobile phone 500. According to the Z-mode input function example shown in FIG. 31, by placing the mobile phone 500 in the vertically long or by holding it in the vertically long, the press detection unit 50A executes the detection operation of the press force F in the Z-direction as a start-up switch function from a waiting state thereof. When the CPU 32 or the exclusive driver IC executes the Z-mode, it is constituted such that the coordinate state in the Z-direction is read-in in every sampling frequency. An operation example of the press detection unit 50A should be referred to FIG. 21 and FIG. 25 and the description concerning them.

Figure 32:
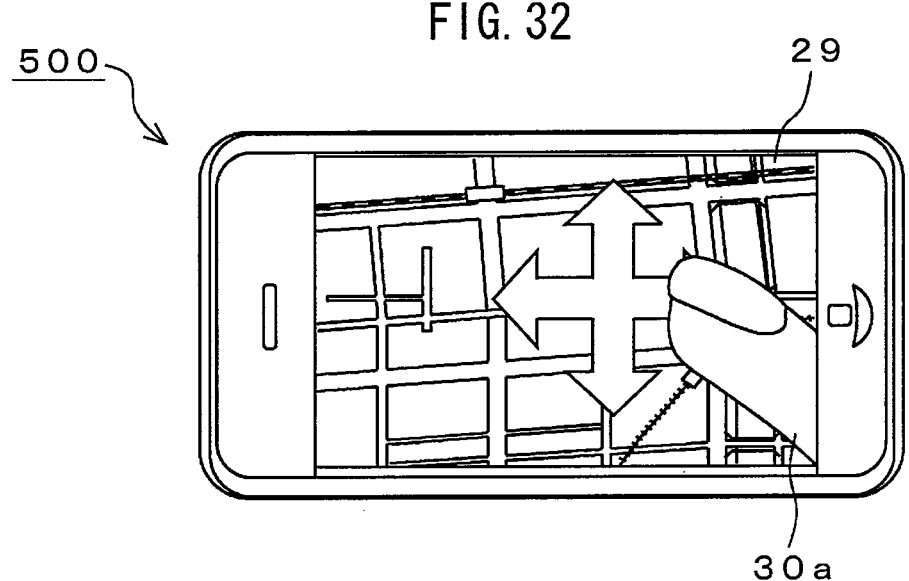
FIG. 32 is a plan view of the mobile phone 500 for showing an X+Y-mode input function example thereof.

FIG. 32 shows an X+Y-mode input function example in the mobile phone 500. According to the X+Y-mode input function example shown in FIG. 32, the display unit 29 is displayed in the horizontally wide by placing the mobile phone 500 in the horizontally long or by holding it in the horizontally long. In the horizontally wide style, for example, when executing a map circulation application, the press detection unit 50A executes the detection operation of the sliding and the press force F in the X and Y directions as a cross scroll function in the X and Y directions for the position movement operation or the like. When the CPU 32 or the exclusive driver IC executes the X+Y-mode, the coordinate state in the X-direction and the coordinate state in the Y-direction are read-in in every sampling frequency.

Figure 33:
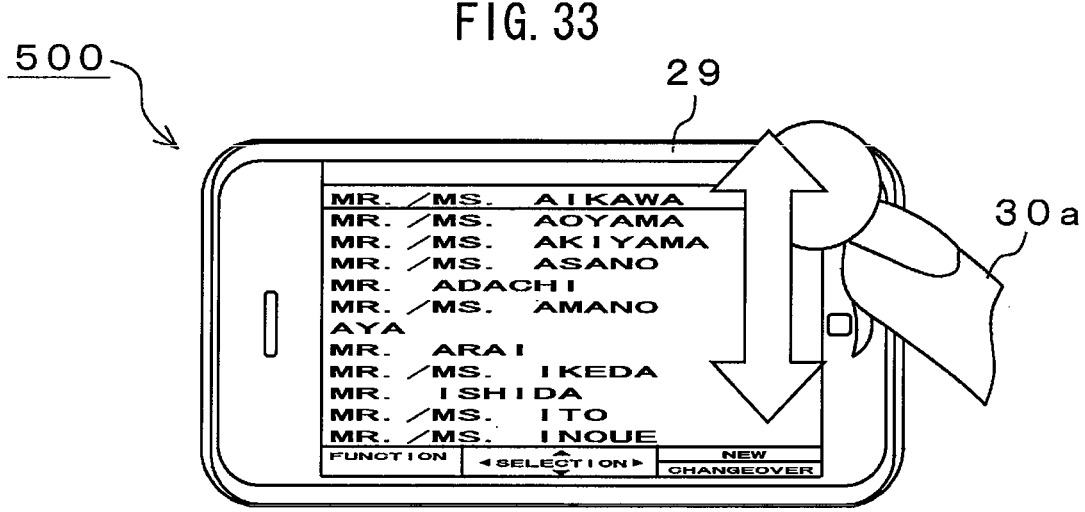
FIG. 33 is a plan view of the mobile phone 500 for showing an X+Z-mode input function example thereof.

FIG. 33 shows an X+Z-mode input function example in the mobile phone 500. According to the X+Z-mode input function example shown in FIG. 33, the display unit 29 is displayed in the horizontally wide by placing the mobile phone 500 in the horizontally long or by holding it in the horizontally long. In the horizontally wide style, for example, when executing a selection application of various kinds of items (application for selecting a musical piece from a list display by a phone book or a music creation function), the press detection unit 50A executes the detection operation of the sliding in the X-direction and the press force F in the Z-direction as a selection determination function. When the CPU 32 or the exclusive driver IC executes the X+Z-mode, the coordinate state in the X-direction and the coordinate state in the Z-direction are read-in in every sampling frequency.

Figure 34:
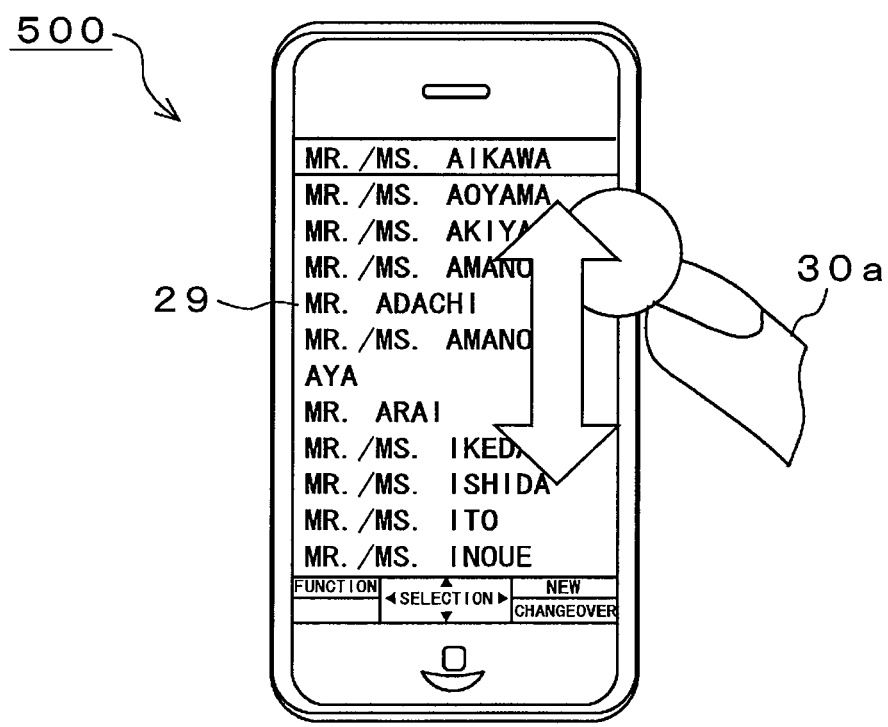
FIG. 34 is a plan view of the mobile phone 500 for showing a Y+Z-mode input function example thereof.

FIG. 34 shows a Y+Z-mode input function example in the mobile phone 500. According to the Y+Z-mode input function example shown in FIG. 34, by placing the mobile phone 500 in the vertically long or by holding it in the vertically long, when executing the selection application of various kinds of items in the vertically wide style (application for selecting a musical piece from a list display by a phone book or a music creation function), the press detection unit 50A executes the detection operation of the sliding in the Y direction and the press force F in the Z-direction as the selection determination function. When the CPU 32 or the exclusive driver IC executes the Y+Z-mode, the coordinate state in the Y-direction and the coordinate state in the Z-direction are read-in in every sampling frequency.

Figure 35:
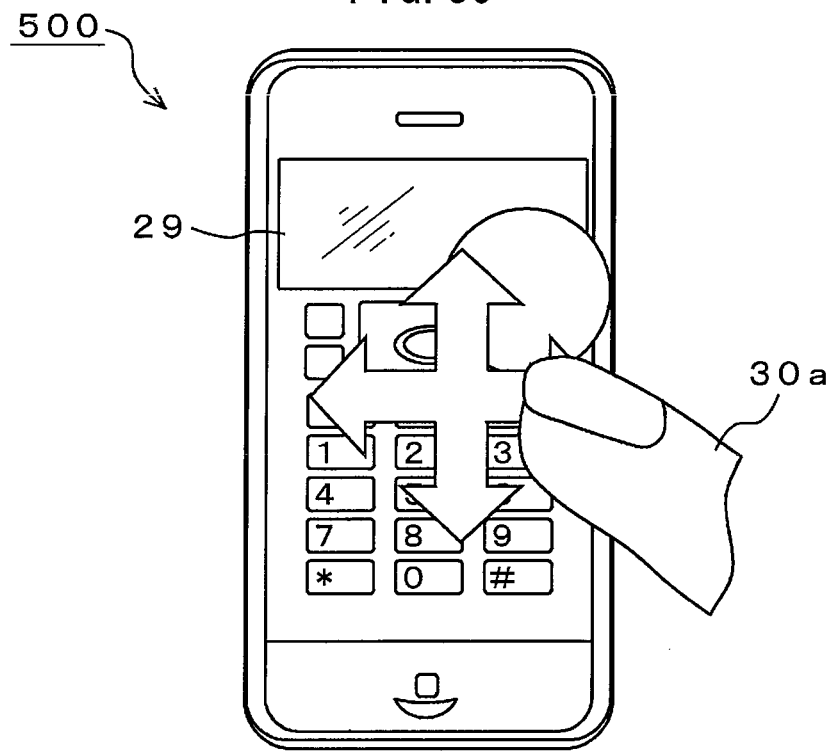
FIG. 35 is a plan view of the mobile phone 500 for showing an X+Y+Z-mode input function example thereof.

FIG. 35 shows an X+Y+Z-mode input function example in the mobile phone 500. According to the X+Y+Z-mode input function example shown in FIG. 35, by placing the mobile phone 500 in the vertically long or by holding it in the vertically long, the press detection unit 50A executes the detection operation of the sliding in the X and Y directions and the press force F in the Z-direction as the operation function of the ten-key, the cross key or the like in the vertically wide style. When the CPU 32 or the exclusive driver IC executes the X+Y+Z-mode, the coordinate state in the X-direction, the coordinate state in the Y-direction and the coordinate state in the Z-direction are read-in in every sampling frequency.

Figure 36:
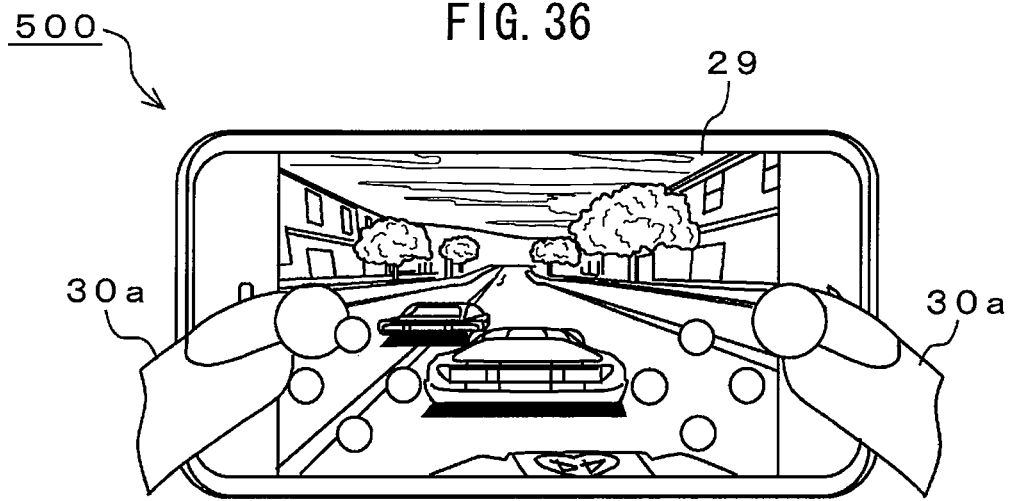
FIG. 36 is a plan view of the mobile phone 500 for showing a multi-point mode input function example thereof.

FIG. 36 shows a multi-point mode input function in the mobile phone 500. According to the multi-point mode input function shown in FIG. 36, by placing the mobile phone 500 in the horizontally long or by holding it in the horizontally long, when executing a game application in the horizontally wide style, the press detection unit 50A executes the detection operation of the press force F in the Z-direction on the right/left as a both-hands-selection operation function. When the CPU 32 or the exclusive driver IC executes the multi-point mode, each individual resistance value is read-in in every sampling frequency.

Figure 37:
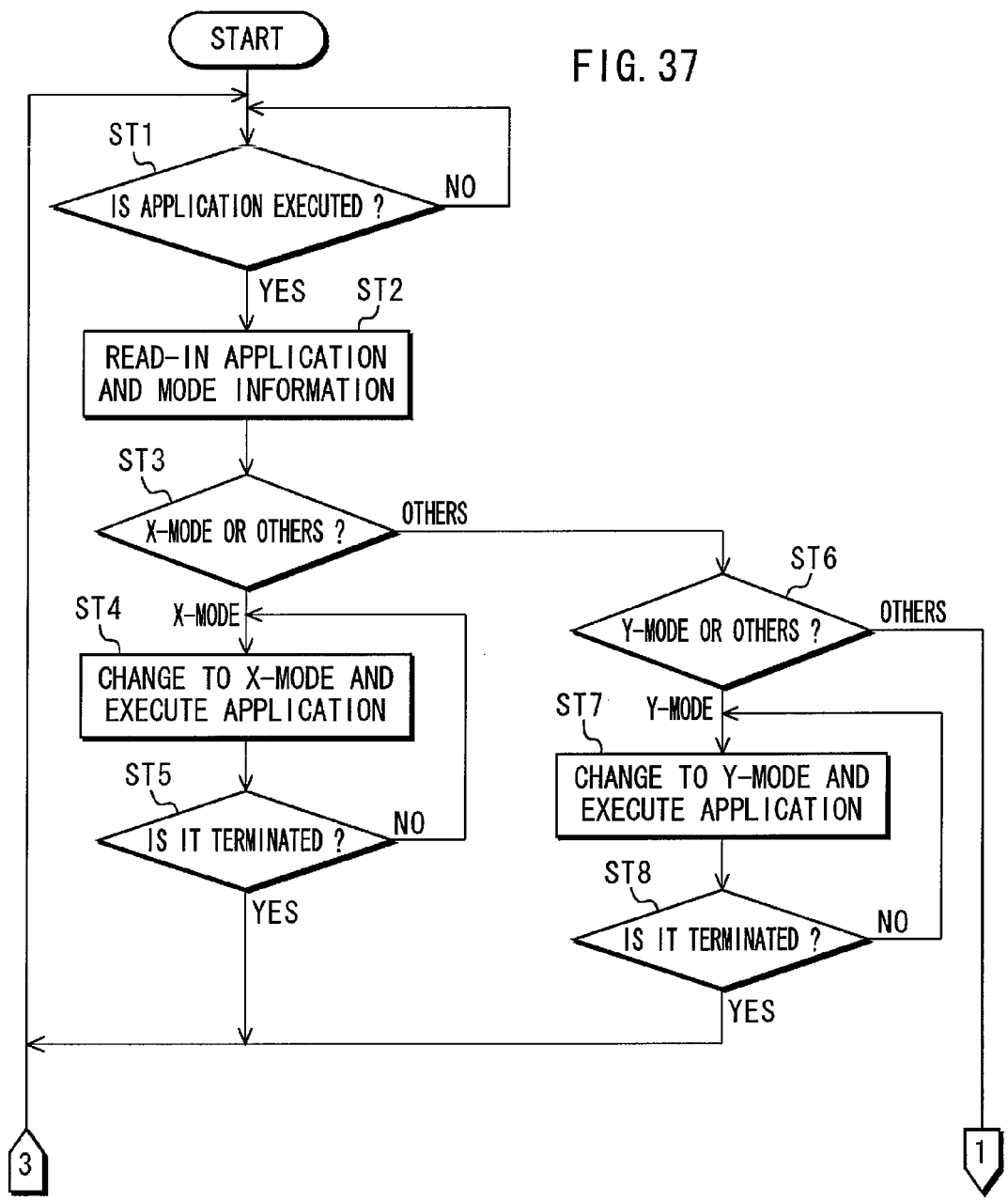
FIG. 37 is a flowchart showing an operation mode changeover example (Part one) in the mobile phone 500.
Figure 38:
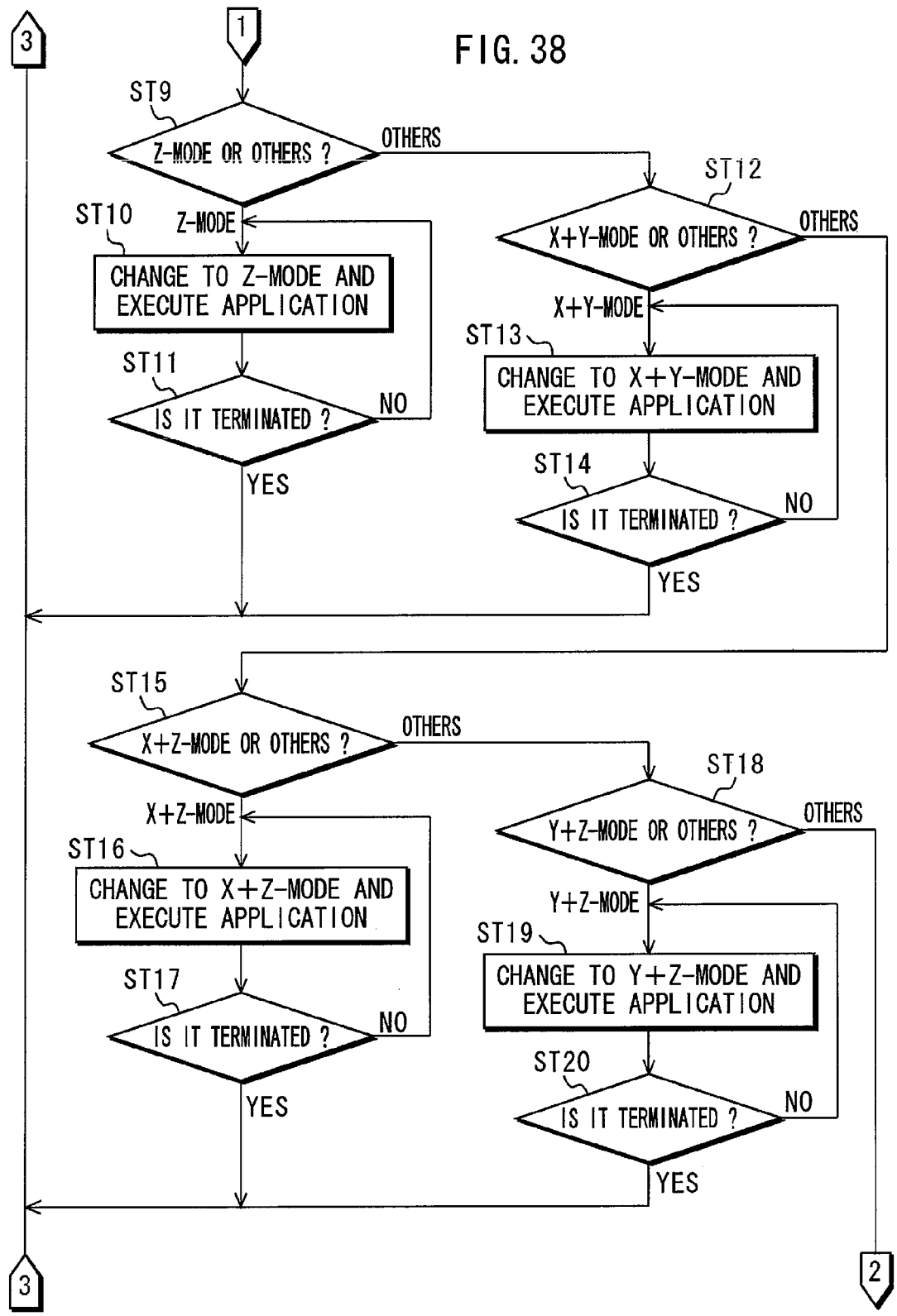
FIG. 38 is a flowchart showing an operation mode changeover example (Part two) in the mobile phone 500.
Figure 39:
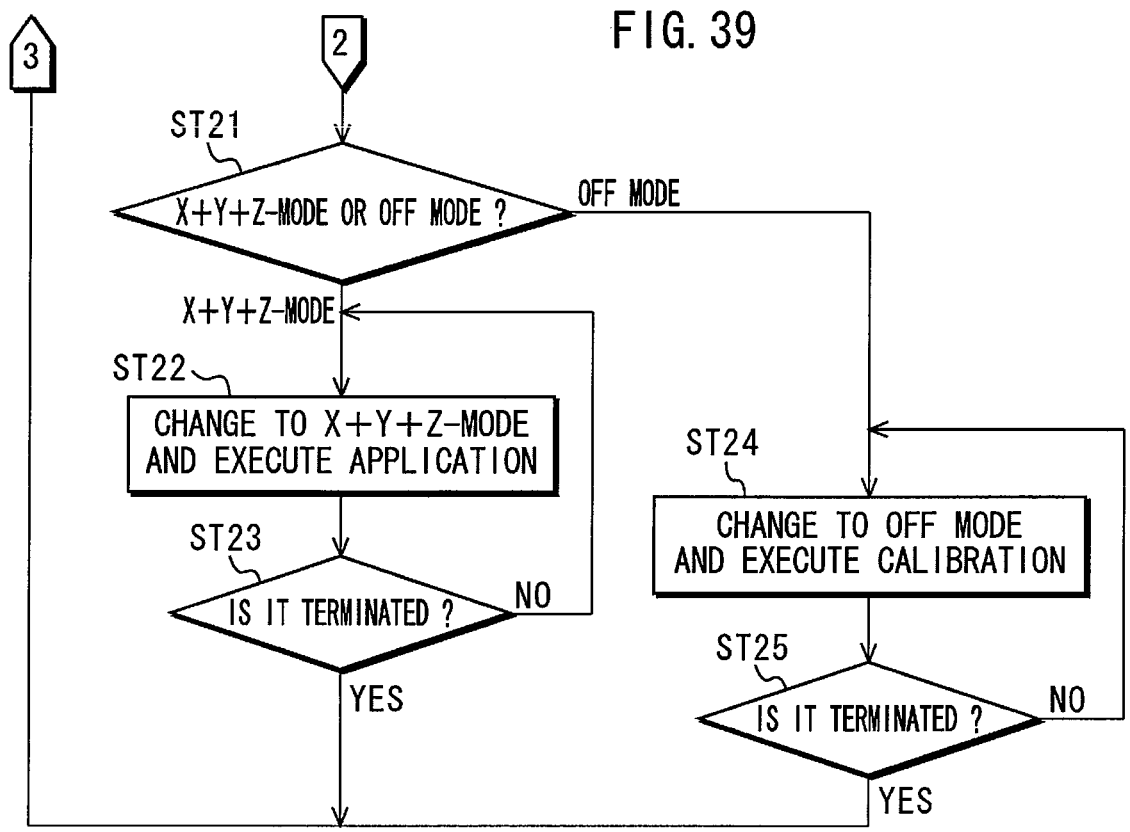
FIG. 39 is a flowchart showing an operation mode changeover example (Part three) in the mobile phone 500.

The following will describe an operation mode changeover example in the mobile phone 500. FIG. 37 to FIG. 39 show the operation mode changeover example (part one to three thereof) in the mobile phone 500. In this embodiment, a case is illustrated in which if there is an execution instruction of the application, a selection candidate is changed over in order of the X-mode→the Y-mode→the Z-mode→the X+Y-mode→the X+Z-mode→the Y+Z-mode→the X+Y+Z-mode→an OFF mode, with respect to the operation mode.

Under these changeover conditions, the execution instruction of the application is waited at step ST1 in the flowchart shown in FIG. 37. when obtaining an execution instruction of the application, the process shifts to step ST2 where the corresponding application and the operation mode information are read-in. The operation mode information is made corresponding to the application beforehand. When obtaining an execution instruction, it is constituted such that operation mode information which is made corresponding to this application can be judged.

Thereafter, the process shifts to step ST3 where the control is branched according to whether an X-mode or the other mode is set. If the operation mode information of the corresponding application is an X-mode, the process shifts to step ST4 where the CPU 32 changes over the operation mode to an X-mode and the display unit 29 executes the corresponding application. For example, according to the X-mode input function example shown in FIG. 29, the display unit 29 displays the image in the horizontally wide by placing the mobile phone 500 in the horizontally long or by holding it in the horizontally long. The CPU 32 executes the WEB circulation application in this horizontally wide style. The press detection unit 50A executes the sliding detection operation in the X-direction as the vertical scroll function. The CPU 32 or the exclusive driver IC reads-in the coordinate state of X-direction in every sampling frequency.

Then, the process shifts to step ST5 where the CPU 32 judges an end of the corresponding application. When obtaining no end instruction of the corresponding application, the process returns to the step ST4 where the display unit 29 continues the corresponding application. When obtaining an end instruction of the corresponding application, the process returns to the step ST1 where the display unit 29 waits an execution instruction of the next application.

If a mode other than X-mode is set at the above-mentioned step ST3, the process shifts to step ST6 where the CPU 32 branches the control thereof depending on the Y-mode or the other mode, except for the X-mode. If the operation mode information of the corresponding application is the Y-mode, the process shifts to step ST7 where the CPU 32 changes over the operation mode to the Y-mode and the display unit 29 executes the corresponding application.

For example, according to the Y-mode input function example shown in FIG. 30A, the display unit 29 displays the image in the vertically wide style by placing the mobile phone 500 in the vertically long or by holding it in the vertically long. The CPU 32 executes the WEB circulation application in this vertically wide style. The press detection unit 50A executes the sliding detection operation in the Y-direction as the vertical scroll function. Alternatively, the CPU 32 executes the image reproduction application in the horizontally wide style shown in FIG. 30B. The press detection unit 50A executes the sliding detection operation in the Y-direction as the reproduction position operation function. In both of cases, the CPU 32 or the exclusive driver IC reads-in the coordinate state in the Y-direction in every sampling frequency.

Then, the process shifts to step ST8 where the CPU 32 judges an end of the corresponding application. When obtaining no an end instruction of the corresponding application, the process returns to the step ST7 where the display unit 29 continues the display based on the corresponding application. When obtaining an end instruction of the corresponding application, the process returns to the step ST1 where the display unit 29 waits an execution instruction of the next application.

If a mode other than X and Y modes is set at the above-mentioned step ST6, the process shifts to step ST9, shown in FIG. 38, where the CPU 32 branches the control depending on the Z-mode or the other mode, except for X and Y modes. If the operation mode information of the corresponding application is a Z-mode, the process shifts to step ST10 where the CPU 32 changes over the operation mode to a Z-mode and the display unit 29 executes the corresponding application.

For example, according to the Z-mode input function example shown in FIG. 31, the press detection unit 50A executes the detection operation of the press force F in the Z-direction as a start-up switch function from a waiting state in the vertically wide style of the mobile phone 500. The CPU 32 or the exclusive driver IC reads-in the coordinate state in the Z-direction in every sampling frequency.

Then, the process shifts to step ST11 where the CPU 32 judges an end of the corresponding application. When obtaining no end instruction of the corresponding application, the process returns to the step ST10 where the corresponding application is continued. When obtaining an end instruction of the corresponding application, the process returns to the step ST1 where an execution instruction of the next application is waited.

If a mode other than the X, Y, and Z modes is set at the above-mentioned step ST9, the process shifts to step ST12 where the CPU 32 branches the control thereof depending on the X+Y-mode or the other mode, except for the X, Y, and Z modes, is set. If the operation mode information of the corresponding application is the X+Y-mode, the process shifts to step ST13 where the CPU 32 changes over the operation mode to the X+Y-mode and the display unit 29 executes the corresponding application.

For example, according to the X+Y-mode input function example shown in FIG. 32, when the CPU 32 executes the map circulation application in the horizontally wide style of the mobile phone 500, the press detection unit 50A executes the detection operation of the sliding and the press force F in the X and Y directions as the cross scroll function in the X and Y directions of the position movement operation or the like. The CPU 32 or the exclusive driver IC reads-in the coordinate state in the X-direction and the coordinate state in the Y-direction in every sampling frequency.

Then, the process shifts to step ST14 where the CPU 32 judges an end of the corresponding application. When obtaining no end instruction of the corresponding application, the process returns to the step ST13 where the display unit 29 continues the corresponding application. When obtaining an end instruction of the corresponding application, the process returns to the step ST1 where the display unit 29 waits an execution instruction of the next application.

If a mode other than the X, Y, Z, and X+Y-modes is set at the above-mentioned step ST12, the process shifts to step ST15 where the CPU 32 branches the control thereof depending on the X+Z-mode or the other mode, except for the X, Y, Z, X+Y-modes. If the operation mode information of the corresponding application is the X+Z-mode, the process shifts to step ST16 where the CPU 32 changes over the operation mode to the X+Z-mode and the display unit 29 executes the corresponding application.

For example, according to the X+Z-mode input function example shown in FIG. 33, when the CPU 32 executes the selection application of various kinds of item in the horizontally wide style of the mobile phone 500, the press detection unit 50A executes the detection operation of the sliding in the X-direction and the press force F in the Z-direction as the selection determination function. The CPU 32 or the exclusive driver IC reads-in the coordinate state in the X-direction and the coordinate state in the Z-direction in every sampling frequency.

Then, the process shifted to step ST17 where the CPU 32 judges an end of the corresponding application. When obtaining no end instruction of the corresponding application, the process returns to the step ST16 where the display unit 29 continues the display based on the corresponding application. When obtaining an end instruction of the corresponding application, the process returns to the step ST1 where the display unit 29 waits an execution instruction of the next application.

If a mode other than the X, Y, Z, X+Y, and X+Z-modes is set at the above-mentioned step ST15, the process shifts to step ST18 where the CPU 32 branches the control thereof depending on the Y+Z-mode or the other mode, except for the X, Y, Z, X+Y, and X+Z-modes. If the operation mode information of the corresponding application is the Y+Z-mode, the process shifts to step ST19 where the CPU 32 changes over the operation mode to the Y+Z-mode and executes the corresponding application. For example, according to the Y+Z-mode input function example shown in FIG. 34, when the CPU 32 executes the selection application of various kinds of items in the vertically wide style of the mobile phone 500, the press detection unit 50A executes the detection operation of the sliding in the Y-direction and the press force F in the Z-direction as the selection determination function. The CPU 32 or the exclusive driver IC reads-in the coordinate state in the Y-direction and the coordinate state in the Z-direction in every sampling frequency.

Then, the process shifts to step ST20 where the CPU 32 judges an end of the corresponding application. When obtaining no end instruction of the corresponding application, the process returns to the step ST19 where the display unit 29 continues the display based on the corresponding application. When obtaining an end instruction of the corresponding application, the process returns to the step ST1 where the display unit 29 waits an execution instruction of the next application.

If a mode other than the X, Y, Z, X+Y, X+Z, and Y+Z-modes is set at the above-mentioned step ST18, the process shifts to step ST21, shown in FIG. 39, where the CPU 32 branches the control thereof depending on the X+Y+Z-mode or the other mode, except for the X, Y, Z, X+Y, X+Z, and Y+Z-modes. If the operation mode information of the corresponding application is the X+Y+Z-mode, the process shifts to step ST22 where the CPU 32 changes over the operation mode to the X+Y+Z-mode and the display unit 29 executes the corresponding application.

For example, according to the X+Y+Z-mode input function example shown in FIG. 35, in the vertically wide style of the mobile phone 500, the press detection unit 50A executes the detection operation of the sliding in the X and Y directions and the press force F in the Z-direction as the operation function of the ten-key, the cross key or the like. The CPU 32 or the exclusive driver IC reads-in the coordinate state in the X-direction, the coordinate state in the Y-direction and the coordinate state in the Z-direction in every sampling frequency.

Then, the process shifts to step ST23 where the CPU 32 judges an end of the corresponding application. When obtaining no end instruction of the corresponding application, the process returns to the step ST22 where the display unit 29 continues the corresponding application. When obtaining an end instruction of the corresponding application, the process returns to the step ST1 where the display unit 29 waits an execution instruction of the next application.

If an OFF-mode other than the X, Y, Z, X+Y, X+Z, Y+Z, and X+Y+Z-modes is set at the above-mentioned step ST18, the process shifts to step ST24 where the CPU 32 changes over the operation mode to the OFF mode and executes the calibration. For example, the resistance value Rn between terminals is obtained by measuring the resistance value between the respective terminals 1 and 2, 3 and 4, 5 and 6, 7 and 8 of the press detection unit 50A. Then, according to the update example of the resistance value Rs1 for judgment threshold level at time of the calibration shown in FIG. 26, at a time of factory shipment, the resistance value Rs1 for judgment threshold level after updating is calculated by substituting the resistance value Rv between terminals in the no-load, the resistance value Rs for judgment threshold level of the ON/OFF of the input function decided on the application side and the resistance value Rn between the terminals when executing the OFF mode for the formula (3).

Then, the process shifts to step ST25 where the CPU 32 judges an end of the calibration. When obtaining no end instruction of the calibration, the process returns to the step ST24 where the CPU 32 continues the calibration. When obtaining an end instruction of the calibration, the process returns to the step ST1 where the CPU 32 waits an execution instruction of the next application.

In this manner, according to the mobile phone 500 as the fifth embodiment, the display unit 29 is provided on the downward side of the front surface plate 45A and at the same time, the embodiment of the press detection unit 50A is provided, so that when the information is inputted with respect to the press operation by the operator's finger 30a in the input detection surface on the display unit, it is possible to reliably detect information of the pressed position by the press detection unit 50A. Further, it is possible to reliably detect the press forces F (press-down force) at the positions where the elastic electric conductor 53a electrically connects the electrode pattern 51a and the electrode pattern 52a, the elastic electric conductor 53b electrically connects the electrode pattern 51b and the electrode pattern 52b, the elastic electric conductor 53c electrically connects the electrode pattern 51c and the electrode pattern 52c or/and the elastic electric conductor 53d electrically connects the electrode pattern 51d and the electrode pattern 52d in response to the press operation.

Also, the input device 903 has the display unit 29 of the air-tight structure which is completely shut off from the outside, so that it is possible to assemble the mobile phone 500 excellent in the waterproof property and the dustproof property. The upper operation frame body 41 has a structure for supporting the front surface plate 45A such as a transparent touch-sensitive input sheet, so that the assembly easiness of the mobile phone 500 is improved. Thus, it is possible to provide the mobile phone 500 with a touch-sensitive input function having the frame shaped press detection unit 50A of a thin-shaped and simple structure while it has an air-tight structure by which the invasion of the dust, water or the like is preventable.

Although, in the above-mentioned embodiments, the mobile phones 200 to 500 have been described as the electronic apparatus, the electronic apparatus is not limited to this; if an electronic apparatus such as a digital camera, a video camera, a game machine, a personal computer, an auto teller machine, which includes any one of the input devices 90, 901 to 903, is employed, the similar effect is obtained.

The embodiments may be very preferably applied to a mobile phone or an information mobile terminal which inputs the information by sliding and/or pressing the input detection surface on the display unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A press detection sensor comprising:
   a base member having predetermined length and width and also having a predetermined shape along a periphery of a display unit;
   a first conductor having predetermined length and being arranged on the base member, the first conductor linearly extending along the periphery in a longitudinal direction of the base member;
   a second conductor that is arranged on the base member with the second conductor being faced to the first conductor, the second conductor linearly extending along the periphery in the longitudinal direction of the base member;
   a continuous conductive contact body that is arranged between the first conductor and the second conductor and linearly extending continuously around a corner of the base member along the periphery in the longitudinal direction of the base member, the continuous conductive contact body connecting the first and second conductors electrically in response to an external force; and
   a covering member that includes the contact body on the inside thereof, the covering member covering a top of the base member which includes the first and second conductors,
   wherein the covering member has at least one of flexibility and elasticity.

2. The press detection sensor according to claim 1, wherein one terminal of the first conductor is connected to a first terminal,
   one terminal of the second conductor is connected to a second terminal, and
   both of the other terminals of the first and second conductors are opened.

3. The press detection sensor according to claim 1, wherein the base member on which the first conductor and the second conductor are arranged has a frame shape.

4. The press detection sensor according to claim 1, wherein an adhesive agent is arranged on at least one of a lower surface of the base member and an upper surface of the covering member.

5. The press detection sensor according to claim 1, wherein the contact body contains a conductive rubber member.

6. The press detection sensor according to claim 1, wherein at least one of the first conductor and the second conductor is formed in a comb shape.

7. An input device that inputs information in response to a press operation of an operation body, the input device comprising:
   a display-and-detection unit that displays the input information and contains an input detection surface, the display-and-detection unit detecting a contact position of the operation body in the input detection surface; and
   a press detection unit that detects a press by the operation body, the press detection unit being provided along a periphery of the display unit,
   wherein the press detection unit includes:
   a base member having predetermined length and width and also having a predetermined shape;
   a first conductor having predetermined length and being arranged on the base member,
   the first conductor linearly extending around a corner of the base member along the periphery in a longitudinal direction of the base member;
   a second conductor that is arranged on the base member with the second conductor being faced to the first conductor, the second conductor linearly extending along the periphery in the longitudinal direction of the base member;
   a continuous conductive contact body that is arranged between the first conductor and the second conductor and linearly extending continuously along the periphery in the longitudinal direction of the base member, the continuous conductive contact body connecting the first and second conductors electrically in response to an external force; and
   a covering member that includes the contact body on the inside thereof, the covering member covering a top of the base member which includes the first and second conductors, and
   wherein the covering member has at least one of flexibility and elasticity.

8. The input device according to claim 7, wherein the display-and-detection unit contains a display subunit that displays the input information and a detection subunit that contains an input detection surface on the display subunit, the detection subunit detecting a contact position of the operation body in the input detection surface.

9. The input device according to claim 8, wherein the base member on which the first conductor and the second conductor are arranged has a frame shape.

10. The input device according to claim 9, wherein the first and second conductors are arranged at each L-shaped region which equally divides each side of the four sides of the frame shaped base member and a switching device connects the first and second conductors which are adjacent to each other, and
    wherein the input device has a programmable configuration that changes a press detection function by switching the switching device on or off.

11. The input device according to claim 8, wherein the detection subunit contains a resistive touch panel.

12. The input device according to claim 8, wherein the detection unit contains a capacitive touch panel.

13. The input device according to claim 8 wherein a touch-sensitive sheet member is provided on the press detection unit, and wherein the touch-sensitive sheet member includes a base member for a base material of the touch-sensitive sheet member and the base member for the base material of the touch-sensitive sheet member contains a protrusion block that presents a concavity and convexity feeling, the protrusion block having a predetermined shape.

14. The input device according to claim 7, wherein the display-and-detection unit contains a touch panel built-in liquid crystal display device.

15. An electronic apparatus that is provided with an input device which inputs information in response to a press operation of an operation body, the input device:

a display unit that displays the input information;

a detection unit that includes an input detection surface on the display unit, the detection unit detecting a contact position of the operation body in the input detection surface; and a press detection unit that detects a press by the operation body, the press detection unit being provided along a periphery of the display unit, wherein the press detection unit includes:

a base member having predetermined length and width and also having a predetermined shape;

a first conductor having predetermined length and being arranged on the base member, the first conductor linearly extending around a corner of the base member along the periphery in a longitudinal direction of the base member;

a second conductor that is arranged on the base member with the second conductor being faced to the first conductor, the second conductor linearly extending along the periphery in the longitudinal direction of the base member;

a continuous conductive contact body that is arranged between the first conductor and the second conductor and linearly extending continuously along the periphery in the longitudinal direction of the base member, the continuous conductive contact body connecting the first and second conductors electrically in response to an external force; and a covering member that includes the contact body on the inside thereof, the covering member covering a top of the base member which includes the first and second conductors, and wherein the covering member has at least one of flexibility and elasticity.

\* \* \* \* \*